US005555101A

United States Patent [19]
Larson et al.

[11] Patent Number: 5,555,101
[45] Date of Patent: Sep. 10, 1996

[54] FORMS CREATION AND INTERPRETATION SYSTEM

[75] Inventors: Joseph C. Larson, Rancho Santa Fe; J. Joel Faul, Encinitas, both of Calif.

[73] Assignee: Cardiff Software, Inc., San Marcos, Calif.

[21] Appl. No.: 84,767

[22] Filed: Jun. 29, 1993

Related U.S. Application Data

[63] Continuation-in-part of Ser. No. 824,035, Jan. 22, 1992, abandoned, which is a continuation-in-part of Ser. No. 733,942, Jul. 22, 1991, abandoned.

[51] Int. Cl.$^6$ ........................................ H04N 1/00
[52] U.S. Cl. .................. 358/403; 358/400; 358/442; 358/468; 382/287
[58] Field of Search .................. 358/400, 403, 358/442, 468; 379/100, 400, 403, 442, 468; 382/287

[56] References Cited

U.S. PATENT DOCUMENTS

| | | | |
|---|---|---|---|
| 4,941,170 | 7/1990 | Herbst | 379/100 |
| 5,060,980 | 10/1991 | Johnson et al. | 283/70 |
| 5,068,888 | 11/1991 | Scherk et al. | 379/100 |
| 5,084,769 | 1/1992 | Miura | 379/100 |
| 5,099,340 | 3/1992 | Kamada et al. | 358/403 |
| 5,109,252 | 4/1992 | Schott, Jr. | 355/202 |
| 5,153,744 | 10/1992 | Nobuta | 358/400 |
| 5,161,037 | 11/1992 | Saito | 358/468 |
| 5,231,510 | 7/1993 | Worthington | 379/100 |
| 5,267,303 | 11/1993 | Johnson et al. | 358/468 |
| 5,282,052 | 1/1994 | Johnson et al. | 358/468 |

FOREIGN PATENT DOCUMENTS

| | | | |
|---|---|---|---|
| 4604283 | 1/1984 | Australia | 379/98 |
| 2211698 | 5/1989 | United Kingdom | 379/100 |

OTHER PUBLICATIONS

"Xerox Software Marries Faxes and Computers", Wash Post, Mar. 24, 1992.

*Primary Examiner*—Scott A. Rogers
*Assistant Examiner*—Thomas L. Stoll
*Attorney, Agent, or Firm*—Knobbe, Martens, Olson & Bear

[57] ABSTRACT

A system and method for interactively creating forms including displaying the forms during creation, and interpreting completed forms received via a facsimile device. The system includes the following features: automated reminder, automated data export, suspense processing, and automated confirmation. Analog objects can be created and interpreted. Screen definitions for forms can be converted to the type of form defined by the present invention.

31 Claims, 52 Drawing Sheets

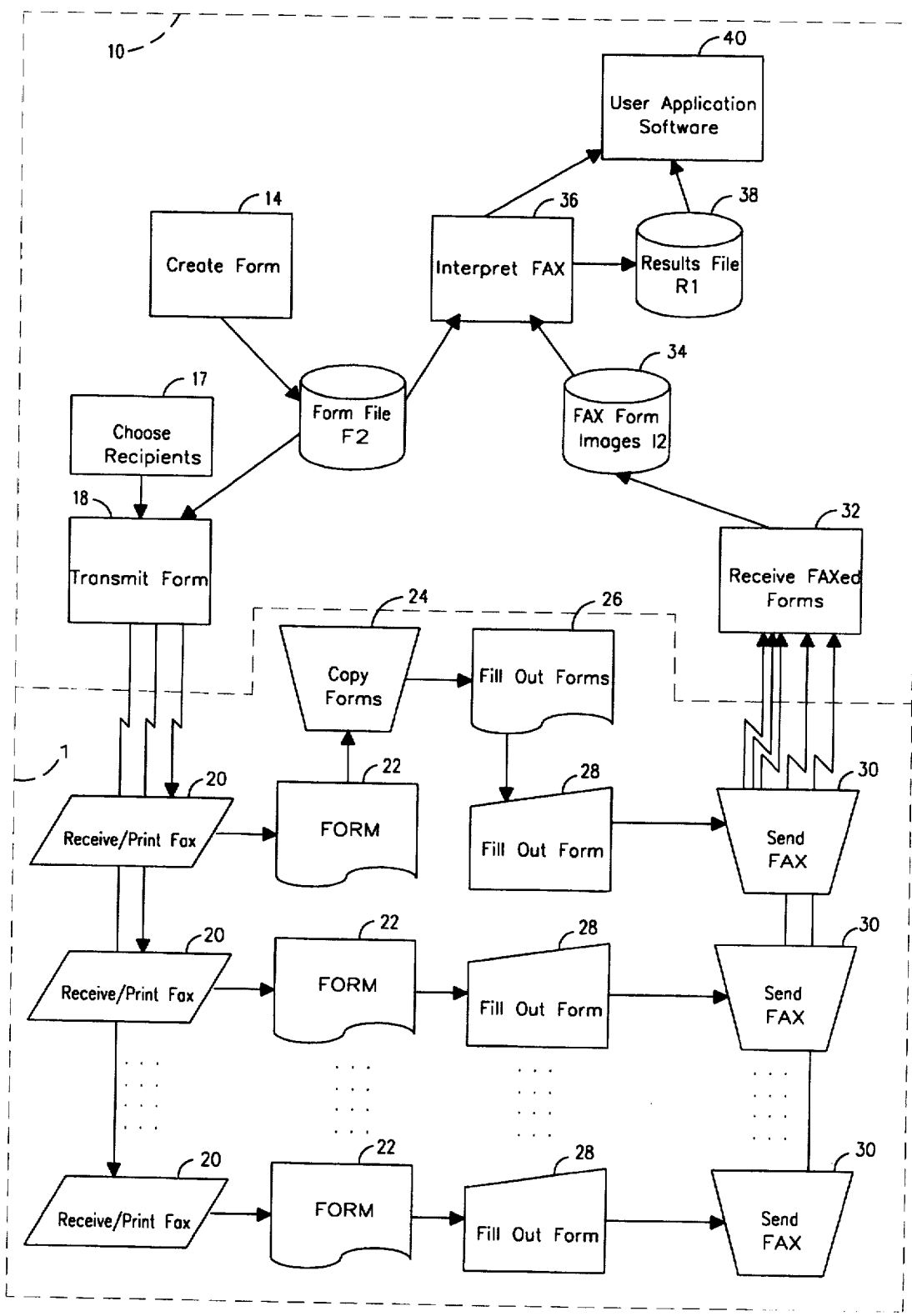
Fig. 1 TopChart

TRADE SHOW FAX REGISTRATION FORM

41426

TO REGISTER:

A B C D E F G H I J K L M
N O P Q R S T U V W X Y Z
1 2 3 4 5 6 7 8 9 0

CONFERENCE AND EXHIBIT REGISTRATION FEES

*Fig. 2B*

Create Form

Form Interpretation

Create Object

*Save Form*

Open Form

*Read Form*

Send Form

Send Fax

*Transmit Form*

Render Reference Marks

Render ID

Draw Constrained Print

Draw Entry Field

Draw Choice Field

Receive Faxes

*Interpret Fax*

*Interpret ID*

Interpret Marking Field

*Interpret Choice Field*

*Interpret Entry Field*

Interpret Constrained Print

Draw Image Zone

*Draw Analog Field*

Interpret Image Zone

*Interpret Analog Field*

Suspended Faxes

*Correct Constrained Print*

*Correct Entry Field*

Correct Choice Field

Correct Image Zone

Correct Analog Field

Auto Export Setup

Export Dialog

*Auto Export*

*WriteRecord*

XYZ Book Ordering Company

DRAFT

Buyer Information

Name: |J|O|H|N| |D|O|E| | | | |

Fax Number: |1|2|3| |4|5|6|-|7|8|9|0|

Enter Name and Address to Ship to:

Mr. John Doe
1 Main Street
Best City, CA. 92075

Select the credit card you wish to charge this order to:

Expiration Date: |1|2|/|9|2|

○ Master Card    ○ Discover
● Visa    ○ American Express

Card Number:
|0|0|0|0| |1|2|3|4| |5|6|7|8| |9|0|1|2|

Item: | |2|3|

Quantity: | | |2|

Unit Price: | |4|3|.|0|0|

Extended Price: | | |8|6|.|0|0|

*Fig. 39*

DRAFT

XYZ Book Order Confirmation

Buyer Information

Name: J O H N  D O E

Fax Number: 1 2 3  4 5 6 - 7 8 9 0

Your order will be shipped to the following address:

*Mr. John Doe*
*1 Main Street*
*Best City, CA. 92075*

Credit Card Information:  Expiration Date: 1 2 / 9 2

○ Master Card   ○ Discover
● Visa          ○ American Express

Card Number:
0 0 0 0  1 2 3 4  5 6 7 8  9 0 1 2

Your order has been accepted.
Shipping via UPS Ground.
You should receive your books in one week.

Note Price Change:

Item:  2 3    Quantity: 2    Unit Price: 4 3 . 9 5    Extended Price: 8 7 . 9 0

Book Title:
S O F T W A R E  D E V E L O P M E N T

*Screen Conversion*

*Process Records*

Build Constrained Print Field

*Build Multi Choice Field*

Build Single Choice Field

*Place Field*

FORMS CREATION AND INTERPRETATION SYSTEM

This application is a continuation-in-part of application Ser. No. 07/824,035, filed Jan. 22, 1992, abandoned, which is a continuation-in-part of Ser. No. 733,942, filed Jul. 22, 1991, abandoned.

BACKGROUND OF THE INVENTION

1. Field of the Invention

This invention relates generally to the creation and interpretation of fax forms.

2. Description of the Prior Art

Facsimile, or fax, machines are widely used and virtually essential pieces of business equipment used to conduct daily business efficiently and quickly. Typically, forms are manually fed into a fax machine at an originating location and transmitted to a receiving location. A user at the receiving location typically completes the forms and transmits the completed forms back to the originating location via fax. The received completed fax form is subsequently manually processed where requested information or confirmations of orders are faxed back to the user. This manual processing of fax forms is relatively time-consuming and inefficient. The process of being an operator manually involved in the loop of processing a fax does not realize a full potential of modern-day fax machines or recognition algorithms executable by computers to recognize printed material.

The quality of fax transmissions has greatly improved in recent years. By recognizing the capacity of modern-day computers to process printed documents, the human intervention in processing completed forms via fax can be substantially reduced.

On such attempt to reduce human intervention is taught in U.S. Pat. No. 4,893,333 to Baran, et al. Baran, et al. discusses an interactive facsimile system and method of information retrieval incorporating markings on transmitted faxes and readable by a receiving fax server. The receiving fax server responds to received faxes by identifying the markings and retrieves prestored information from a database corresponding to the markings and subsequently transmits the prestored information back to the requesting end. In lieu of the markings, information incorporated onto the received fax can be mechanically read and recognized to interpret the information desired from the requestor.

This method of information retrieval is suited to respond to subscribers wishing further information on products advertised in trade magazines. The reader transmits the bar code portions of advertisements of interest or makes marks on a form whereupon the receiving fax server processes the request and pulls prestored information from a database and subsequently transmits the information sought possibly on the same telephone call. This system is limited to simply responding to requests for data already stored in a previously set up database. Baran, et al. assumes fax forms already exist and that a template or other means exists elsewhere to interpret such sheets. Baran, et al. is silent on the process of creation of forms or the processing thereof.

SUMMARY OF THE INVENTION

The present invention provides an integrated system and method for unifying the forms creation process and the creation of the template used for interpreting the completed received fax form. A fax form is created for transmission by executing a forms creation module. The created form is also simultaneously stored into computer memory and has integral template information used for form interpretation by comparing against received completed fax forms.

BRIEF DESCRIPTION OF THE DRAWINGS

FIG. 1 is a block diagram of a system for creating and interpreting forms, communicating via fax to a branch location, in accordance with the present invention;

FIGS. 2b and 2c are sample forms having a mixture of choice fields and constrained print fields which are used in the form template;

FIG. 39 is a sample order form which is used in conjunction with automatic confirmation of the present invention;

FIG. 40 is a sample acknowledgement form which is used in conjunction with automatic confirmation, and which corresponds to the sample order form of FIG. 39;

DETAILED DESCRIPTION OF THE PREFERRED EMBODIMENTS

Figure 2A:
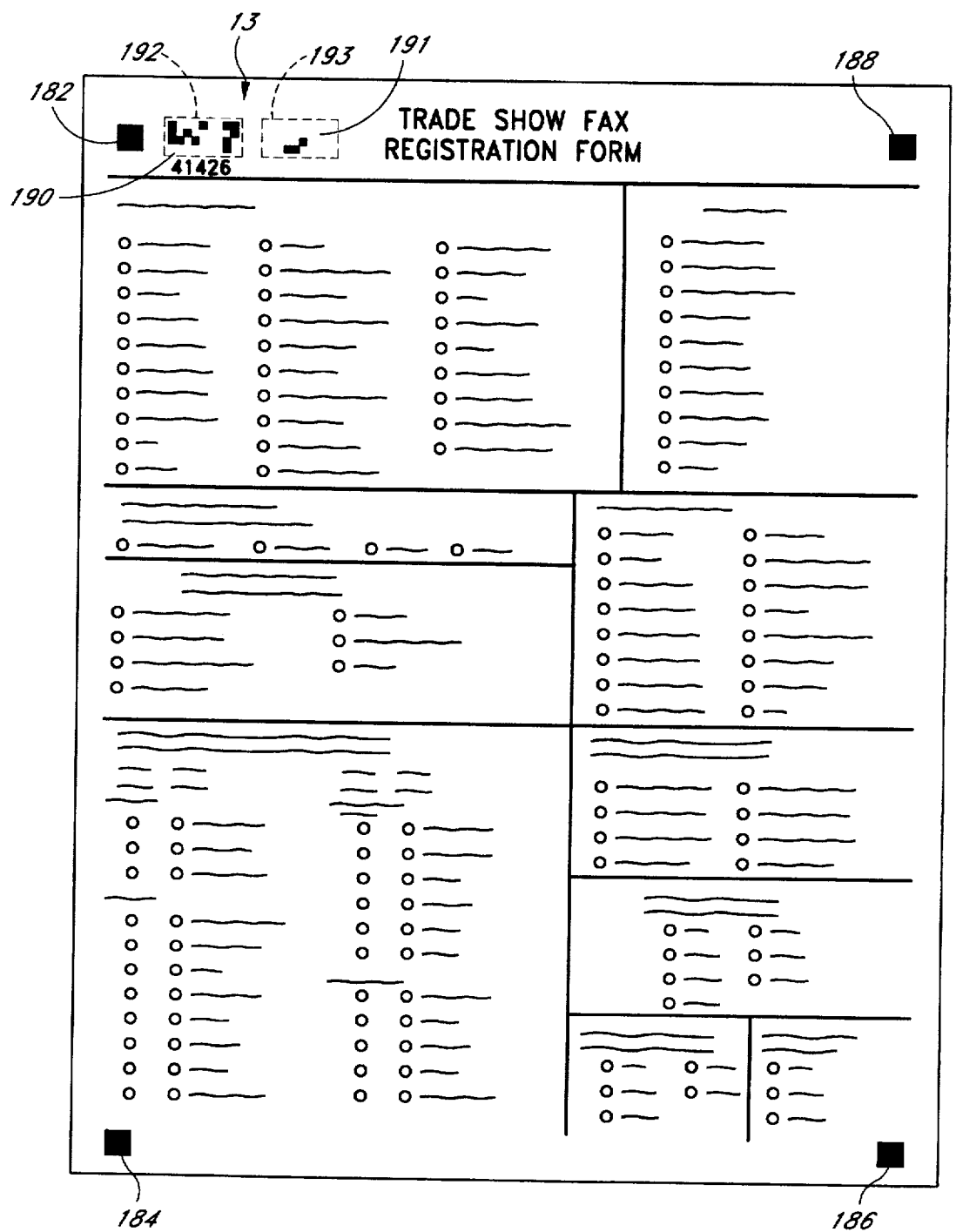
FIG. 2a is a sample of a fax form, having choice fields which can be created by a forms creation function, including machine readable identification markings and reference markings interpreted by the forms system to retrieve a corresponding template from memory for processing.

Reference is now made to the drawings wherein like numerals refer to like parts throughout.

The following detailed description of the preferred embodiments uses some notable descriptive terms. Table I provides definitions of those terms.

TABLE I

| | |
|---|---|
| Marking field | Any of several types of fields which can be marked by the recipient of a form and subsequently interpreted by the server machine. Included in the set of marking fields are entry fields, choice fields and constrained print fields. |
| Entry field | A particular type of marking field which allows the entry of numeric or alphanumeric data by checking or filling in the appropriate squares. |
| Choice | A particular type of marking field that indicates a choice among several possible choices when the square is checked or filled in. |
| Choice field | A group of choices that all belong to the same set. This can be single choice (only one of the choices in the set may be marked) or multiple choice (any number of choices in the set may be marked). |
| Constrained print field | A particular type of marking field that allows entry of numeric or alphanumeric data by drawing letters and digits in a rigid fashion (i.e., following a, specified pattern for each of the letters and digits while keeping the letters and digits constrained to specific boundaries). |
| Mark | To mark a choice or entry field square by drawing an "x" or a check mark or by filling in the square. |
| Server | The machine or location where forms are interpreted. Normally, forms will be created and sent from the server in addition to being interpreted there and the server is referred to in all of these capacities. However, it is possible to create and send forms from one machine and subsequently interpret received forms from another machine. The interpreting machine (i.e., server) needs access to all the information pertaining to the forms sent out. |
| Branch | Locations where forms are received on a fax machine, filled out and subsequently sent back to the server. Branch locations may actually have a tablet of forms for such things as ordering parts, since those types of forms will generally be static in nature. |
| Form | A document created using the forms creation module. |
| Result file | File where a form's interpretation results are recorded. Each form has a result file associated with it. |

Data Structures

The following data structures contain object specific information for generating graphical objects having a

| RECTANGULAR OBJECT | | | |
|---|---|---|---|
| typedef struct { | | | |
| CPEN | | pen; | //Pen with which to draw the border of the object |
| CBRUSH | | brush; | //Brush with which to paint the interior of object |
| } RECT_OBJ; | | | |
| LINE OBJECT | | | |
| typedef struct { | | | |
| CPEN | | pen; | //Pen to draw the border of the object with |
| LINE_ORIENT_TYPE | | orient; | //Line orientation |
| } LINE_OBJ; | | | |
| GENERAL OBJECT | | | |
| typedef struct gobj { | | | |
| int | | shape; | |
| int | | status; | //selected, repeat, etc. |
| RCT | rect; | | //Rectangle that constrains object |
| union { | | | //Type of object is determined by 'shape' |
| RECT_OBJ | | *rp; | //pointer to Rect object - incl. rectangles, circles, etc. |
| LINE_OBJ | | *lp; | //pointer to Line object |
| CONSTR_OBJ | | *pp; | //pointer to constrained Printing object |
| CHOICE_OBJ | | *cp; | //pointer to Choice object |
| ENTRY_OBJ | | *ep; | //pointer to Entry object |
| CHOICE_FLD | | *cf; | //Choice Field (part of choice object) |
| }p; | | | |
| struct gobj | | *next; | //moving front to back |
| struct gobj | | *prev; | //moving back to front |
| }GOBJ | | | |

Any given graphical object is represented by an occurrence of the GOBJ structure and a corresponding shape specific structure with the shape determining which of the union members pertains. For rectangles, circles and lines, the RECT_OBJ and LINE_OBJ structures contain the object specific information. For marking fields, the CONSTR_OBJ, CHOICE_OBJ and ENTRY_OBJ structures contain the object specific information. These structures are given below.

| CHOICE OBJECT | | |
|---|---|---|
| typedef struct { | | |
| char | objid[OBJIDLEN]; | |
| char | descr[OBJDESCRLEN]; | |
| int | range_type; | //numeric, alphanumeric |
| int | type; | //single or multi-choice |
| int | storage; | //fixed or vairable number of fields (multi only) |
| int | orientation; | //Verticle, Horizontal, Rectangular or Manual |
| BOOLEAN | must_fill; | //suspend fax if TRUE |
| struct gobj | *gp; | //pointer to (back of) group of choice fields |
| }CHOICE_OBJ; | | |
| CHOICE FIELD | | |
| typedef struct { | | |
| char | display[OBJVALLEN]; | //value to display on screen |
| char | store[OBJVALLEN]; | //value to store in file |
| int | position; | // text left, right, top bottom of mark box |
| FONT | font; | |
| } CHOICE_FLD; | | //sub-object to CHOICE_OBJ |
| ENTRY OBJECT | | |
| typedef struct { | | |
| char | objid[OBJIDLEN]; | |
| char | descr[OBJDESCRLEN]; | |
| int | range_type; | //numeric, alphanumeric |
| int | lenth; | |
| BOOLEAN | showval; | |
| BOOLEAN | showentry; | |
| int | orientation; | |
| FONT | font; | //Font used for this entry's objects |
| char | range[OBJRANGELEN]; | |

```
        char            list[OBJLISTLEN];
        char            *value;             //Value to be displayed
        int             val_len;            //Length of value string
        BOOLEAN         must_fill;          //TRUE if this field must be
                                            filled in
        float           range_low;          //Low end of allowed range
        float           range_high;         //High end of allowed range
        BOOLEAN         range_test;         //TRUE if range testing should be performed
        int             v_sep;              //Verticle seperation between bubbles
        int             h_sep;              //Horizontal    "         "       "
        char            template[20];
        BOOLEAN         store_tmpl;         //if TRUE, store template characters with data
}       ENTRY_OBJ
```

CONSTRAINED OBJECT

```
typedef struct {
        char            obdij[OBJIDLEN];
        char            descr[OBJDESCRLEN];
        int             range_type;         //numeric, alpha, alphanumeric
        int             length;             //field length
        int             val_len;            //Length of value string
        char            *value;             //Value to be displayed
        BOOLEAN         store_tmpl;         //Store template characters with data
        char            template[20];
        float           range_low;          //Low end fo allowed range
        float           range_high;         //High end of allowed range
        BOOLEAN         range_test;         //TRUE if range testing should be performed
        BOOLEAN         must-fill;          //TRUE if this field must be filled in
}       CONSTR_OBJ
```

IMAGE OBJECT

```
typedef struct {
        char            objid[OBJIDLEN];
        char            descr[OBJDESCRLEN];
        char            *value;             //Value to be displayed
        BOOLEAN         val_len;            //Length of value to be displayed
        BOOLEAN         label;              //TRUE if image is address label
        BOOLEAN         store_val;          //TRUE if ASCII value to be stored
        BOOLEAN         store_img;          //TRUE if image to be stored
        BOOLEAN         trans_box;          //TRUE if outline of zone is transparant
        BOOLEAN         perf_ocr;           //TRUE if standard OCR should be done
        BOOLEAN         must_fill;          //TRUE if this field must be filled in
        char            IName[LAB_NAME];    //Name of the label
}       IMAGE_OBJ;
```

ANALOG OBJECT

```
typedef struct {
        char            objid[OBJIDLEN];
        char            desc[OBJDESCRLEN];
        int             shape;              //Linear, circular
        int             orientation;        //Vertical or Horizontal orientation
        int             angle_low;          //Angle of low reading (circular only)
        int             angle_high;         //Angle of high reading (circular only)
        float           display_low;        //Low end of display range
        float           display_high;       //High end of display range
        char            display_units[DISPUNITLEN];
        int             num_ticks;          //Number of tick marks along the scale
        int             num_disp;           //Number of display readings along the scale
        float           store_low;          //Low end of storage range
        float           store_high;         //High end of storage range
        float           value;              //Value to be displayed
        BOOLEAN         range_test;         //TRUE if range testing should be performed
        float           range_low;          //Low end of allowed range
        float           range_high;         //High end of allowed range
        BOOLEAN         must_fill;          //TRUE if this field must
filled in
}       ANALOG_OBJ;
```

DOCUMENT RELATED STRUCTURES

```
typedef struct pagelist{
        long            offset;/* offset of this page in the
file*
        struct pagelist *next;
        struct pagelist *prev;
        GOBJ            *back;
}       PAGELIST;
/*
**      Define view preferences structure (Scale..dialog box)
*/
typedef struct {
```

```
        int                     grid_div;       /*Numer of divisions per
unit*/
        int                     units;          /*PR_IN or PR_CM for inches or
                                centimeters */
        BOOLEAN                 grid_snap;      /*True if objects snap to
grid*/
        BOOLEAN                 grid_show;      /*True if grid is shown on
                                the screen*/
        BOOLEAN                 ruler_show;     /*True if ruler is shown on
                                screen*/
}PREFERENCES;

typedef struct {
        int                     format;
        char                    seperator[SEPLIMIT];
        char                    quote[4];
        FILE_SPEC               datafile;
        unsigned                wCol, wRow;
        void                    *hCell;
        void                    *hCol;
        unsigned                tblHandel;
        unsigned                recHandle;
        int                     columns;
        char                    filemode[4];
        char                    filetype[10];
}FILEATTR;
typedef struct {
        int                     format;
        char                    seperator[SEPLIMIT];
        unsigned                flags;
        FILE_SPEC               datafile;
}THRU_ATTR;
struct current [
/*
**The following information is stored in the file
*/
        ID_TYPE                 fid;            /*ID for the current form
        */
        FILE_SPEC               file;           /*current file       */
        RCT                     floc;           /*location of fid    */
        RCT                     refloc;         /*location of reference
marks*/
        FONT                    font;           /*current font       */
        CBRUSH                  cbrush;         /*current color brush*/
        CPEN                    cpen;           /*current color pen */
        ENTRY_OBJ       eo;     /*default entry object attributes*/
        CHOICE_OBJ      co;     /*default choice object
attributes               */
        CONSTR_OBJ              po;             /*default constrained
                                                print object attributes*/
        FILEATTR                fileattr;       /*current file attributes
        */
        PREFERENCES             prefer;         /*View preferences */
        int                     view;           /*View size-Actual, Fit
                                                Sides, Fit Window   */
        PNT                     pg_size;        / * page size in
                                                thousandths of an inch*/
        int                     pr_size;        /*size of print record*/
        int                     pages;          /*Number of pages in
document*/
        BOOLEAN                 activated;/*TRUE if form is
currently                                       activated*/
        int                     review;         /*Count of fields to be
                                                reviewed.*/
        BOOLEAN         sv_ok;  /*If save interpretted normally
forms   */
        BOOLEAN         pr_ok;  /*If print  "   "   "   "   "  */
        BOOLEAN         sv_err; /*If save interpretted with error
forms*/
        BOOLEAN         pr_err; /*If print  "       "   "   "  "*/
        BOOLEAN         rem_ref;        /*If reference marks, fid removed from form.    */
        BOOLEAN         rem_uid;        /*If user id removed from form*/
        BOOLEAN         bypass_sus;     /*Bypass suspense processing */
        THRU_ATTR       thru_Param;     /*Write through parameters   */
                        /*If any fields are added here, remember to */
                        /*add the size of the field to DOCSIZE macro*/
                        /*below.          */
/*
**The following information is not stored and not needed from
the file:
```

```
*/
BOOLEAN         modified;       /*TRUE if midified since last save */
BOOLEAN         mapping;        /*curr coord system - screen, printer,
FAX */
MENU_TAG        shape:          /*current shape      */
PNT             ul;             /*coord. (scr. pix) of logical upper left
*/
PNT             org;            /*scr org relative to document org(scr
pix) */
PNT             range;          /*current scroll bar range (screen
pizels) */
BOOLEAN         paste;          /*Keep track of the pasting capability*/
PNT             last_mouse;/*Keep track of position of last mouse click*/
long            sres_h; /*Perceived src resolution in pixels per
inch*/
long            sres_v;
long            half_sres_h;    /*half of Screen resolution in
                                  pixels per inch*/
long            half_sres_v:    /*(used for rounding division
                                  operations)*/
PNT             grab_handle_size;/*Scaled version of
GRAB_HANDEL_SIZE    */
BOOLEAN         do_tx;          /*TRUE if tx_event should draw tx_edit
text*/
long            pres_h;         /*Printer resolution in pixels per
inch */
long            pres_v;
PNT             pr_offset;      /*Current offset of printer page*/
int             pagenum;        /*Current page number being
displayed      */
int             obj_repeat_type;/*last clicked on_rpt, pg_lnk, or
                                  normal*/
BOOLEAN         interp_mod;     /*TRUE if mark obj modified since
                                  last save*/
BOOLEAN         FaxMgr;         /*TRUE TeleMgr software. FALSE TeleForm.
    */
BOOLEAN         Locating;       /*True if attempting to locate an object.
*/
SLIST           rctlist;        /*List of coord. info for objects
                                  (interp.)*/
FORM_DB         *fdb:           /*Form database record       */
FAX_DEST        *fax_dest;      /*Destination of fax or printing
info */
GOBJ            *lastobj:       /*
GOBJ            *parent;        /*obj, or parent of obj if obj is
                                  chcfld*/
PAGELIST        *pagel;         /*Head of list of pages       */
PAGELIST        *curpage;       /*Current page displayed on
screen         */
SLIST           order;          /*List of marking objects in
order           */
WINDOW          win;            /*current window (accessible by a
cb_fcn)*/
PRINT_RCD       *pr;            /*pointer to a print record    */
GOBJ            *obj:           /*currently selected object (if only
one)*/
GOBJ            *front;         /*front object in list (head) */
GOBJ            *back;          /*back object in list (tail)  */
}*doc,curdoc;
```

System Overview

Figure 2C:
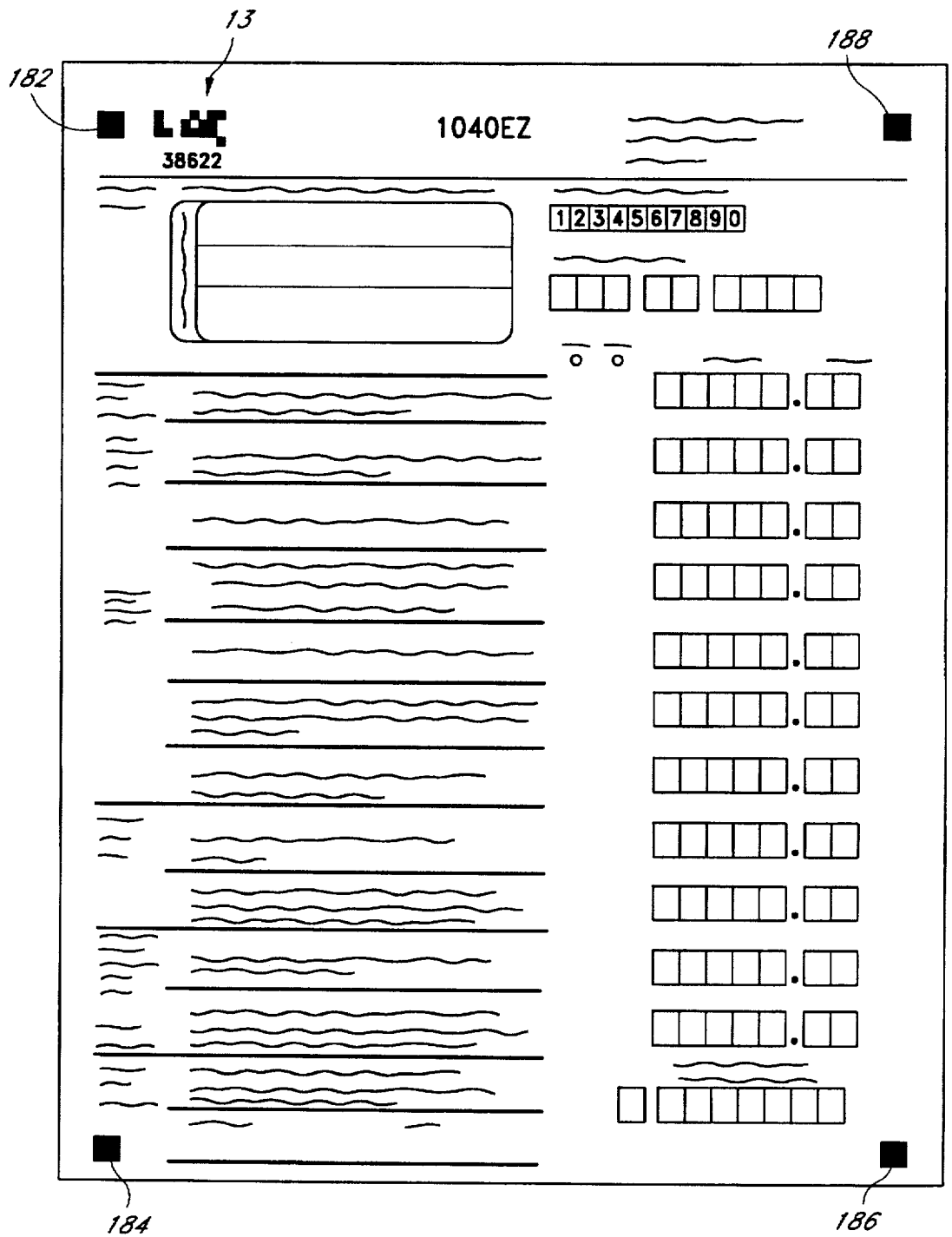

Now referring to FIG. 1, a block diagram of the forms system of the present invention is shown at location 10. Server location 10 creates fax forms 12 having machine readable markings 13, which uniquely identify a form and a customer, such as illustrated in FIG. 2a, 2b and 2c, which are both stored into memory files as templates and transmitted to selected interactive branch locations 11. Server location 10 subsequently interprets and processes received completed fax forms 12 from branch location 11 by comparing them against a corresponding fax form 12 stored in memory files and used as a template.

To provide an overview of FIG. 1, a user of the forms system at server location 10 creates the fax form 12 having template information at step 14 by executing a forms creation module on a standard desktop computer. The created fax form 12 having template information is then stored into computer memory in form file F2 represented as item 16 of the forms system at fax server location 10. A fax form 12 is selectively transmitted to multiple remote fax transceivers at step 18 by using a standard modem or fax transceiver card. The created fax form 12 can also be printed by the fax transceiver at server location 10 to physically create a hard copy for the sender. The remote fax transceivers received the transmitted fax form 12 at step 20 and physically create fax form 22. fax form 22 can be copied at step 24 to create multiple fax forms 26 if desired. Recipients complete fax forms 22 and 26 at step 28 by appropriately marking fax forms 22 and 26 and subsequently fax back the completed fax forms 22 and 26 to server location 10 at step 30. Server location 10 receives the completed fax forms 22 and 26 at step 32 via a modem or a fax transceiver to create electronic fax images at step 34. Machine readable markings 13 on received fax form images are identified and electronically compared in a known manner against a directory of form templates stored in file 16 to identify the received fax form for processing at step 36. The received fax form is processed using template information in file 16 corresponding to the identified form, and process results are stored into a memory file 38. User application software 40, available commercially or custom designed, can electronically process the information stored in files 38 or received via dynamic data exchange (DDE), such as processing orders or sending confirmations of received orders. The following descriptions will now explain the previous overview in a more detailed fashion.

Hardware Implementation

Figure 3:
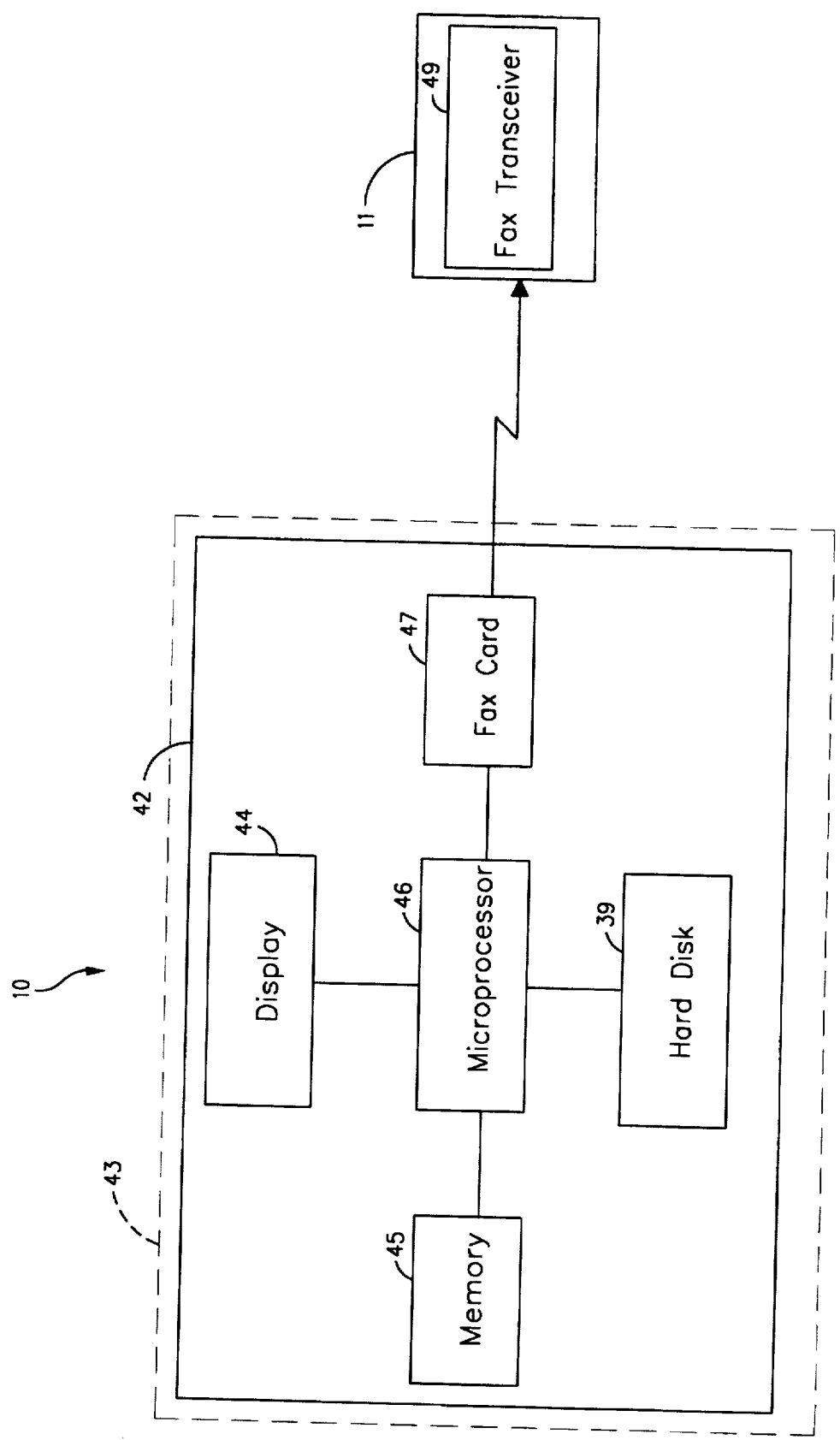
FIG. 3 is a block diagram of a forms system and branch location in accordance with the present invention.

FIG. 3 is a block diagram of forms system 43 at server location 10 capable of implementing the software of the present invention. The forms system 43 comprises a personal computer 42 such as an IBM PC compatible having a video display 44, a memory 45, a microprocessor 46 (preferably an Intel 80386 or better), a fax card 47 and a hard disk 39. The fax card 47 interactively communicates with remote fax transceiver 49 such as a fax machine at a branch location 11 via standard phone lines.

Flow Diagrams

Figure 4:
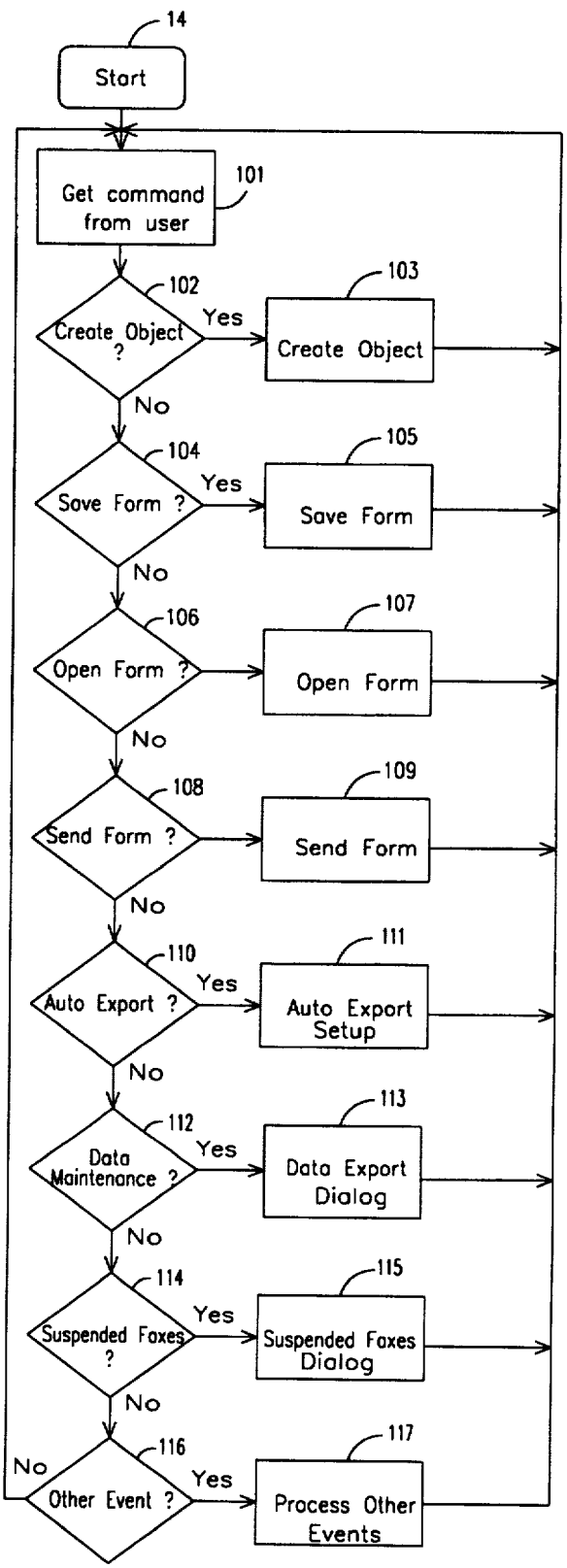
FIG. 4 is a flow diagram of the Forms Creation module as shown in FIG. 1.

Referring to FIG. 4, the forms system at server location 10 includes a forms creation module 14 containing fax forms 12. The user has several options for manipulating the files at step 101 which can be initiated at any time by clicking a mouse. The module recognizes the selected option by executing the following algorithm. First, if the user selects to create an object on a fax form 12 at step 102, function 103 is executed and will be discussed in detail later. If no object is to be presently created, the function determines if the user chose to save a file at step 104 and then executes function 105 described in detail later. Next, if no file was chosen to be saved, the function responds to a selected option to open an existing file at step 106 by executing a function 107 described in detail later. If no file is chosen to be opened presently, the function responds to a selected option to send a file at step 108 by executing function 109 described in detail later. Finally, if none of the previous options are chosen to be executed, the function executes another selected event at step 116 by executing software at step 117 to process the other events, and upon completion returns to position 100. Or else, if no other events at step 116 are desired to be executed at this time, the software returns to position 100.

Figure 5:
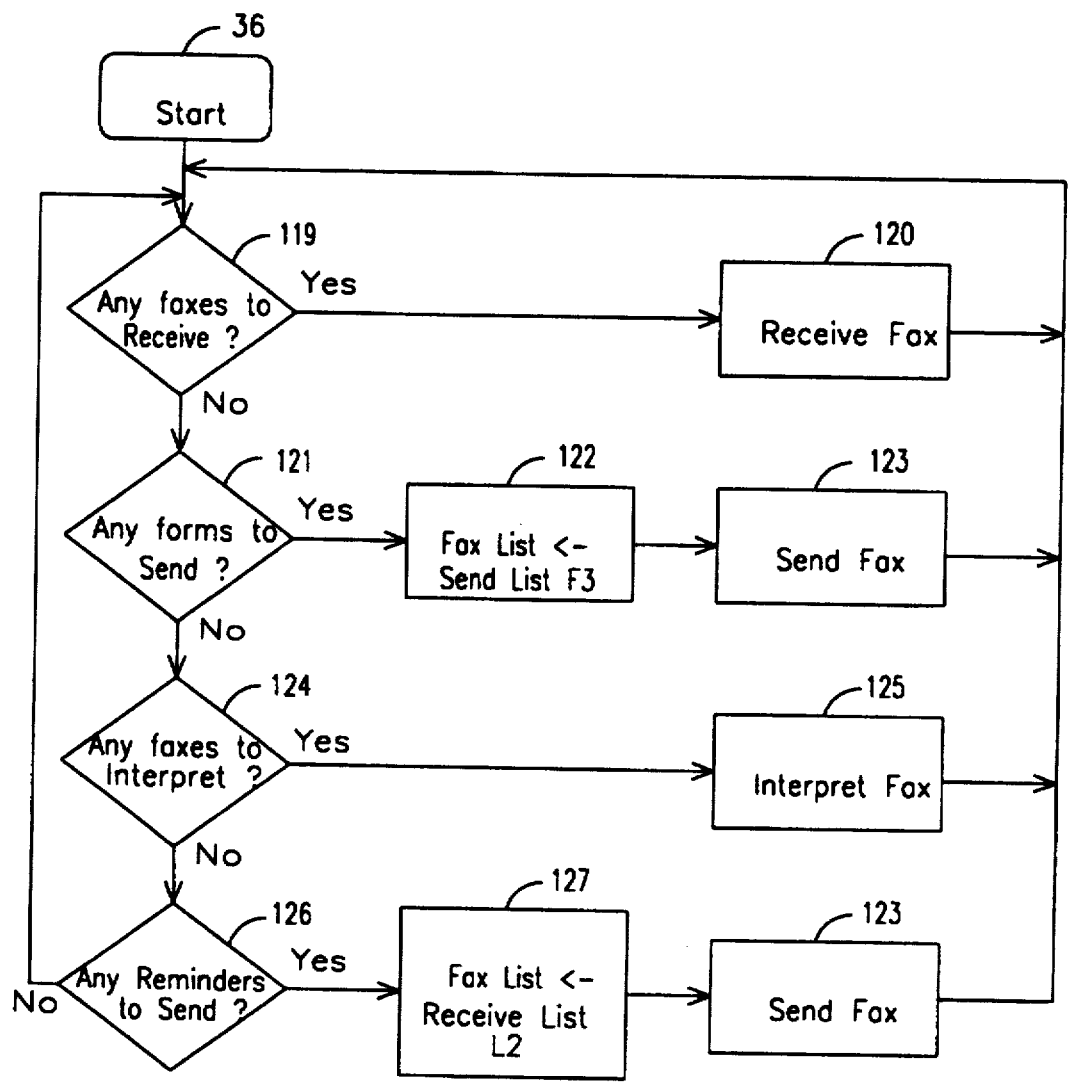
FIG. 5 is a flow diagram of the Form Interpretation module as shown in FIG. 1.

The forms system at server location 10 also includes a form interpretation module 36 or function as shown in FIG. 5. First, if the forms system detects any transmission to be received at step 119, function 120 is executed and will be described in detail later. Next if no transmissions are available for reception, queued fax forms 12 are transmitted at step 121, where function 123 is executed as will be described in detail later. Finally if the forms system has any received fax form 12 requiring interpretation at step 124, function 125 is executed as will also be described in detail later. This function is repeated indefinitely.

Presently, the preferred embodiments of the forms creation and interpretation modules 14, 36 are implemented for execution as Microsoft Windows 3.x applications and they are coded in the "C" programming language using the Microsoft "C" compiler, version 6.0. In addition, for recognition of handwritten alphanumeric characters the Nestor-Reader is licensed from Nestor of Providence, Rhode Island.

Of course, many other programming environments, programming languages and/or compilers/assemblers could be used to implement a software version of these modules.

Creating a Form

Figure 6:
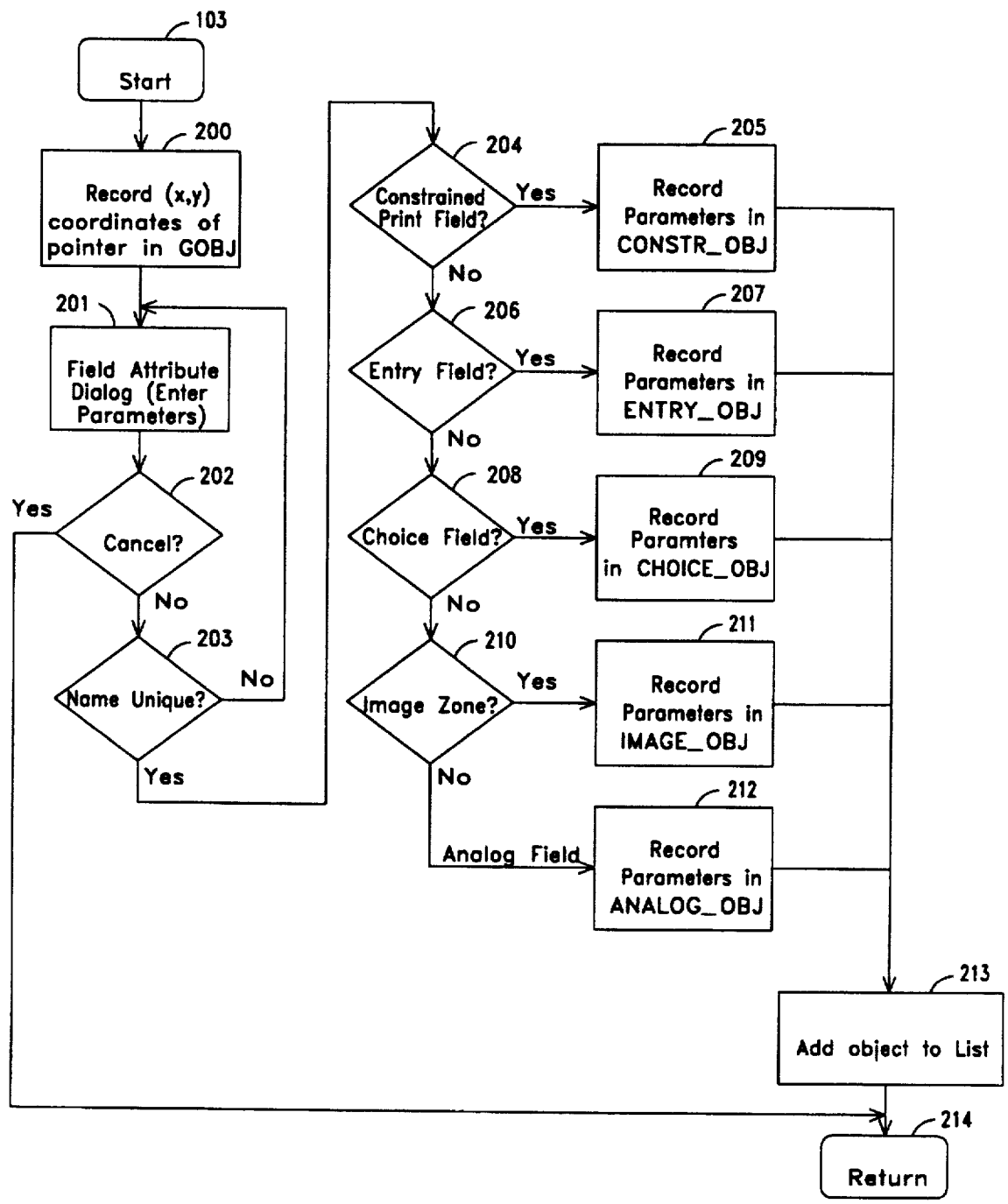
FIG. 6 is a flow diagram of the Create Object function as shown in FIG. 4.

Function 103 shown in FIG. 4 which creates an object will be described in detail. Referring to FIG. 6, to create an object on fax form 12, the user clicks the mouse thereby initiating a mouse event on a display screen with a marking field as the current object type. Function 103 first records the x,y coordinates of the mouse in a GOBJ structure at step 200. Next, the user enters parameters in the marking field dialogue that defines the object at step 201. Next, the user has the opportunity to cancel or accept changes made in the dialogue at step 202. If the user wishes to cancel changes, function 103 exits to position 100. To accept changes to the dialogue, a determination is made if the name of the marking field is unique at step 203 as each marking field must have an unique ID or name. Next, the parameters are recorded at step 205 and are contained in structures CONSTR_OBJ, ENTRY_OBJ or CHOICE_OBJ. Finally, objects are then added to the list at step 213 whereupon function 103 exits back to step 100.

Saving a File

Figure 7:
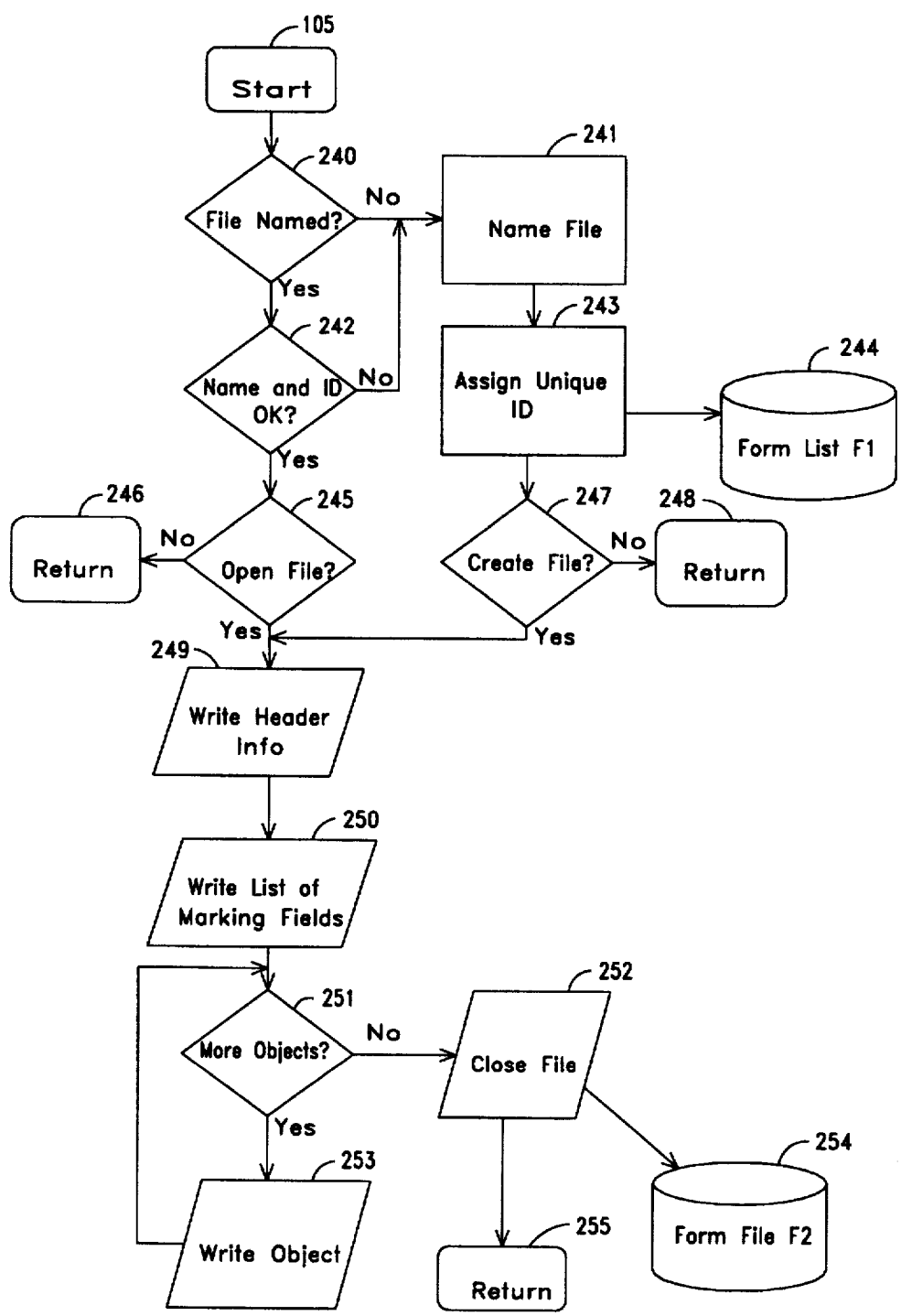
FIG. 7 is a flow diagram of the Save Form function as shown in FIG. 4.

Next, function 105 shown in FIG. 4 which saves a file, will be described in detail by referring to FIG. 7. If the file is already named at step 240, the name and ID are checked to see if they are acceptable at step 242. If a name and ID are not acceptable at step 242, or if the file is not named at step 240, the file is named at step 241 and assigned a unique ID name at step 243. This unique name is added to form list F1 shown as item 244. If a file is not able to be created at this time at step 247, or if a file was unable to be opened at step 245 where the name at step 242 was acceptable, function 105 exits to point 100; however, if a file is able to be created at step 92 or opened at step 94, function E2 proceeds to step 96 where the header information is written. Next, the list of marking fields is written at step 98, whereupon at step 100 if there are more objects in the queue, the next object is written at step 102 whereupon step 100 is executed again. When no more objects are queued to be written at step 100, the function proceeds to step 104 whereupon the file is closed. Now, the created or amended file is named template or form file F2 and the function exits to point 100.

Opening a File

Function 107 shown in FIG. 4 which opens a file, will now be described in detail by referring to FIG. 8. At step 270, the user chooses a fax form 12 from form list F1. The chosen fax form 12 is read at step 272 by retrieving from form file F2. The fax form 12 chosen is displayed on a monitor at step 274 and function 107 exits to step 100.

Figure 8:
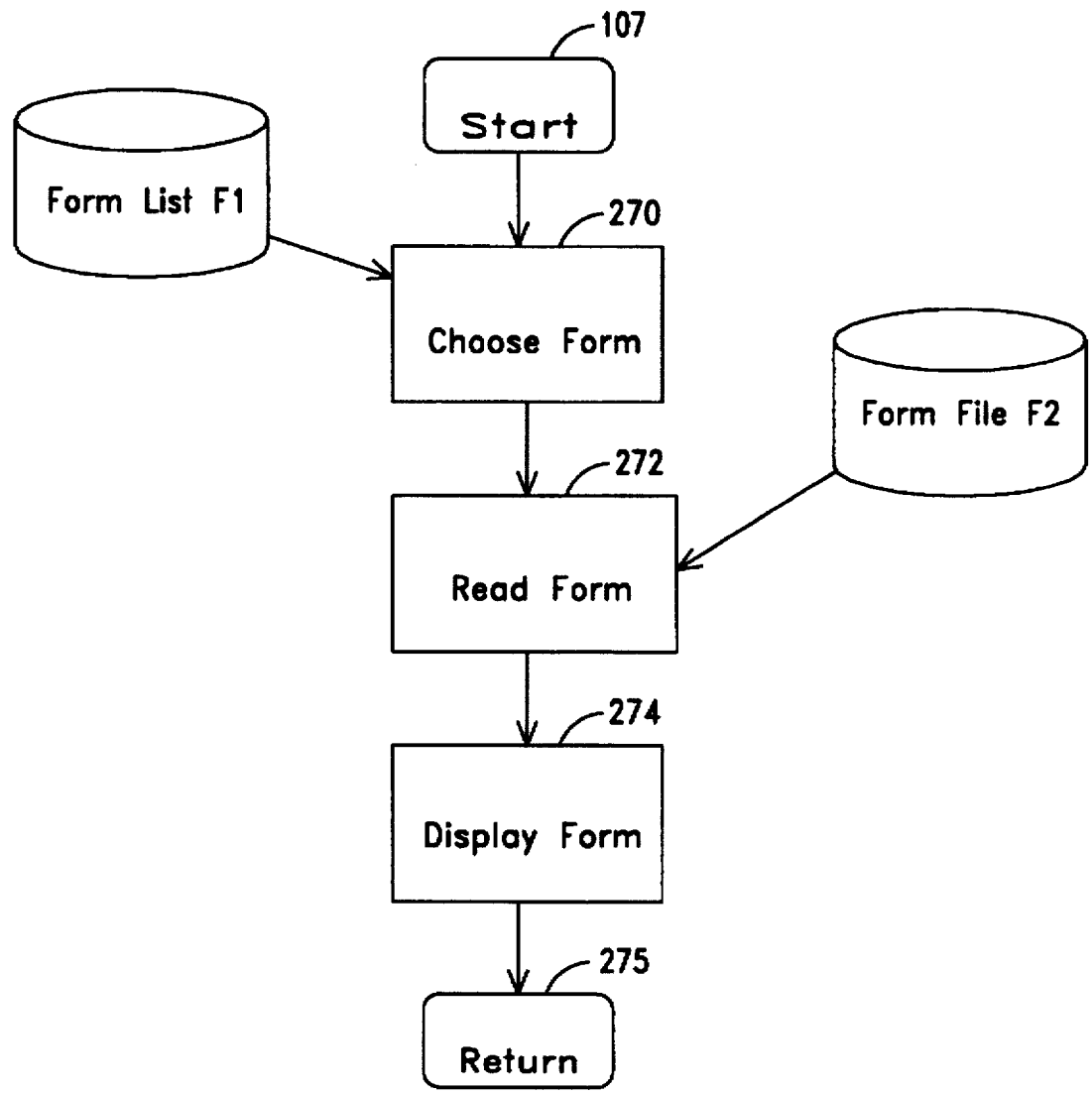
FIG. 8 is a flow diagram of the Open Form function as shown in FIG. 4.
Figure 9:
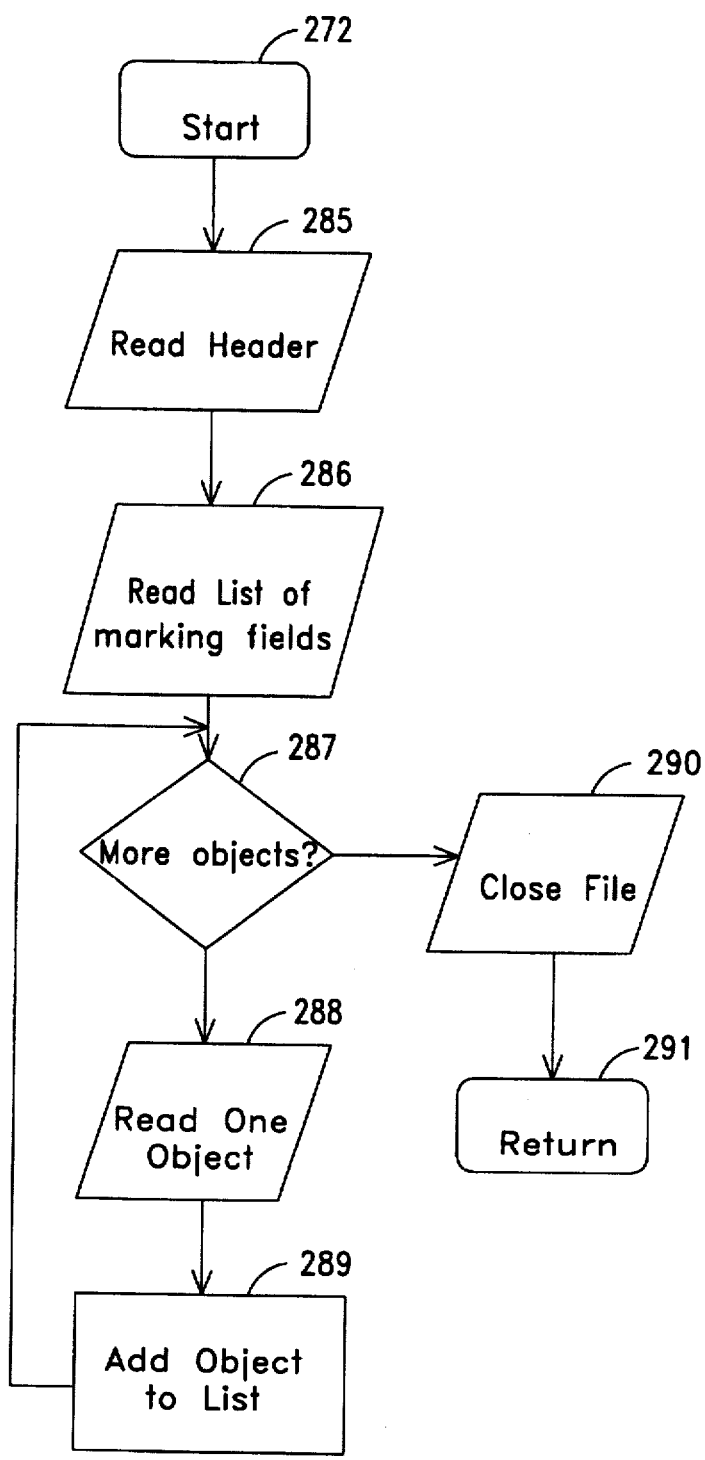
FIG. 9 is a flow diagram of the Read Form function as shown in FIG. 8.

Referring to FIG. 9, step 272 shown in FIG. 8 where the fax form 12 is read from form file F2 is now described in detail. First, the header is read at step 285 whereupon a list of marking fields is read at step 286. If more objects appear at step 287, one object is read at step 288 whereupon the object is added to the list at step 289 and step 287 is repeated. When no more objects remain present at step 287, the file is closed at step 290 and the function is returned to conclude the reading of fax form 12 at step 272.

Sending a Form

Figure 10:
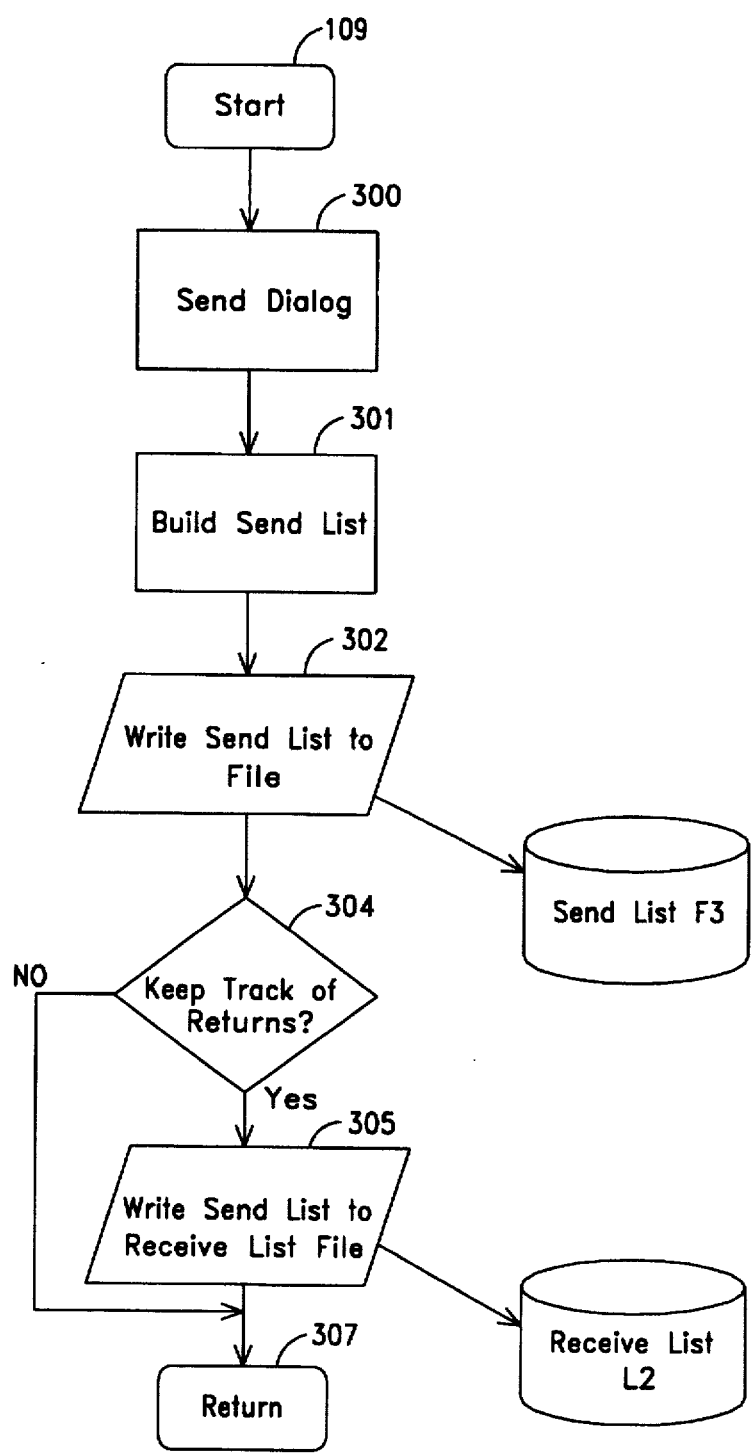
FIG. 10 is a flow diagram of the Send Form function as shown in FIG. 4.

Function 109 shown in FIG. 4 describing how recipients are chosen is now described in detail. Referring to FIG. 10, the user first chooses the recipients to receive a fax form 12 at step 300. The several recipients selected to be sent a selected fax form 12 are stored in memory at step 301 whereupon at step 302 the completed send list F3 is written to a file labelled 303 and the function exits to step 100.

Figure 11:
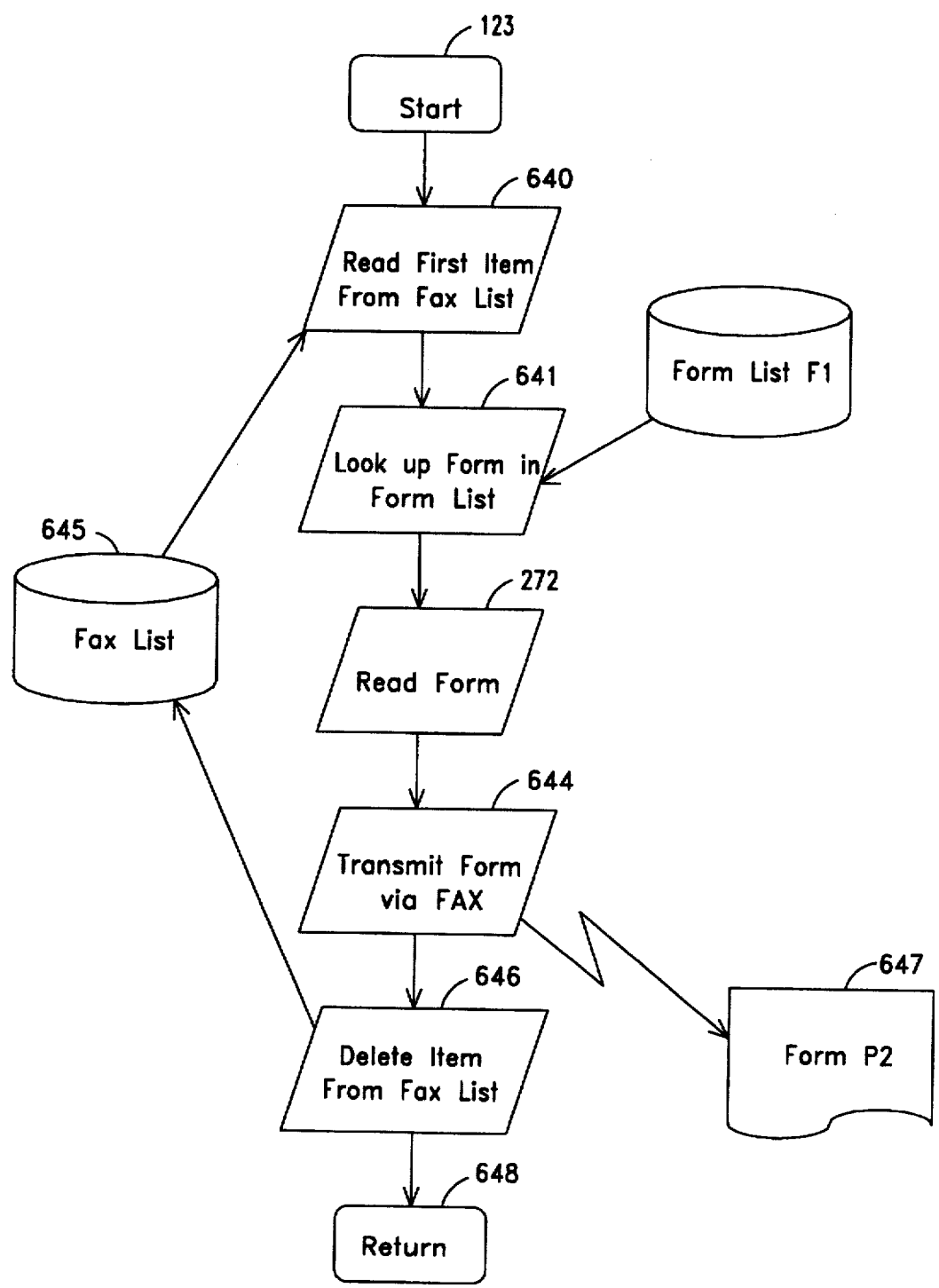
FIG. 11 is a flow diagram of the Send Fax function as shown in FIG. 5.

Function 123 shown in FIG. 5 which sends a selected fax form 12 is now described in detail. Referring to FIG. 11, the first item is read at step 640 from send list F3. The form is looked up in the form list F1. Next, the form is retrieved at step 272 from form file F2 (as previously described) and transmitted via fax machine at step 644 to remote branch location 11 (FIG. 1) to generate from 647. This queued item is then deleted from the fax list F3 at step 646 and the function returns to point 648 shown in FIG. 5.

Figure 12:
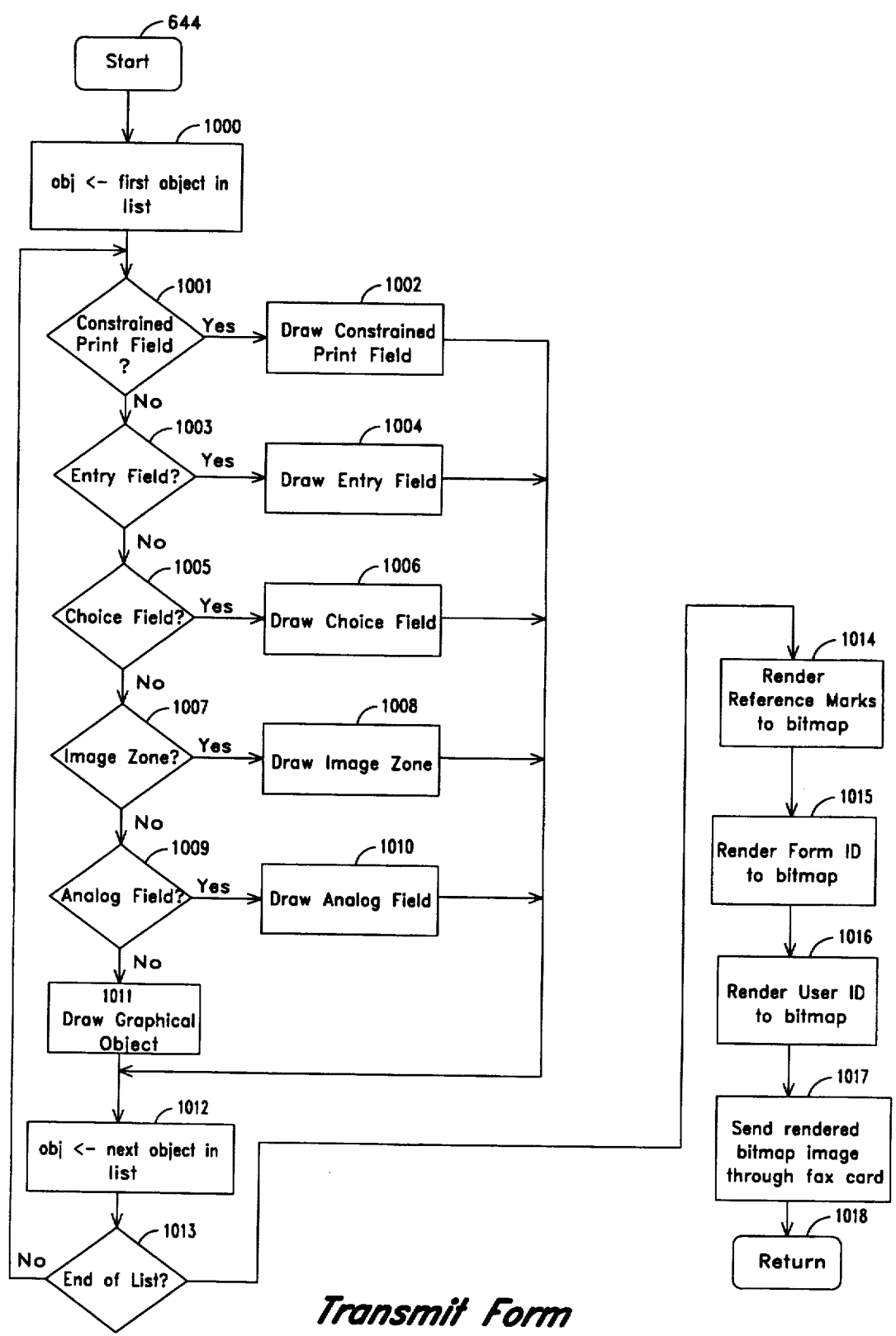
FIG. 12 is a flow diagram of the Transmit Form function as shown in FIG. 11.

Step 644 where a fax form 12 is transmitted will now be described in detail. Referring to FIG. 12, the first object in the list is retrieved at step 1000. If the retrieved object is a constrained print field at step 1001, then the function proceeds to function 1002 as will be described shortly. If not, if the object is an entry field labelled 1003, then the function proceeds to function 1004 as will be described shortly. If not, if the object is a choice field 1005, then the function proceeds to function 1006 as will be described shortly. If the retrieved object is none of the previous field types, then it must necessarily be a graphical object which is drawn at step 1011 using the GOBJ and respective structures listed previously, whereupon the next object in the list to be transmitted is retrieved at step 1012. If the end of the list is not detected at step 1013, the function loops back to step 1001. If at step 1013 the end of the list is detected, the function proceeds to step 1014 to render reference marks to a bit map which will be described shortly. Subsequently, the form ID will be rendered to the bit map at step 1015 whereupon the user ID will be rendered to the bit map at step 1016. Finally, the rendered bit map image will be sent through a fax card 47 integral to the standard desktop computer 42 of the forms system 43 at step 1017, whereupon this function is completed and proceeds back to step 646 as shown in FIG. 11.

Figure 13:
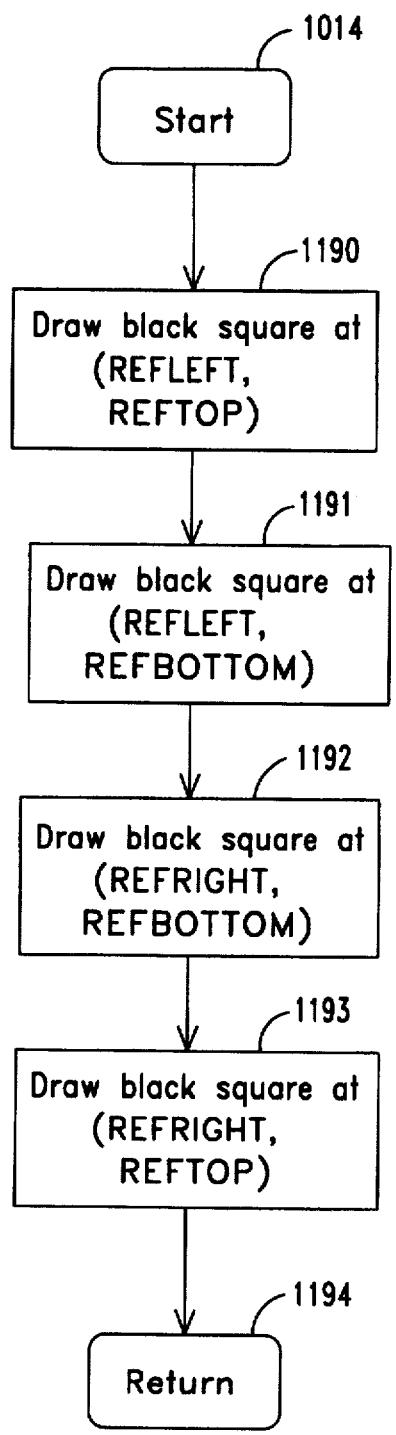
FIG. 13 is a flow diagram of the Render Reference Marks function as shown in FIG. 12.

Referring to FIG. 13, step 1014 as shown in FIG. 12 will be described in detail. To draw reference marks, a black square mark 182 is drawn at the upper left corner of fax form 12 at step 1190. Next, a black square mark 184 is drawn at the lower left corner of fax form 12 at step 1191. Next, a black square mark 186 is drawn at the upper right corner of fax form 12 at step 1192, and finally, a black square mark 188 is drawn at the lower right corner of fax form 12 at step 1193. These defined four marks render the bit map field.

Figure 14:
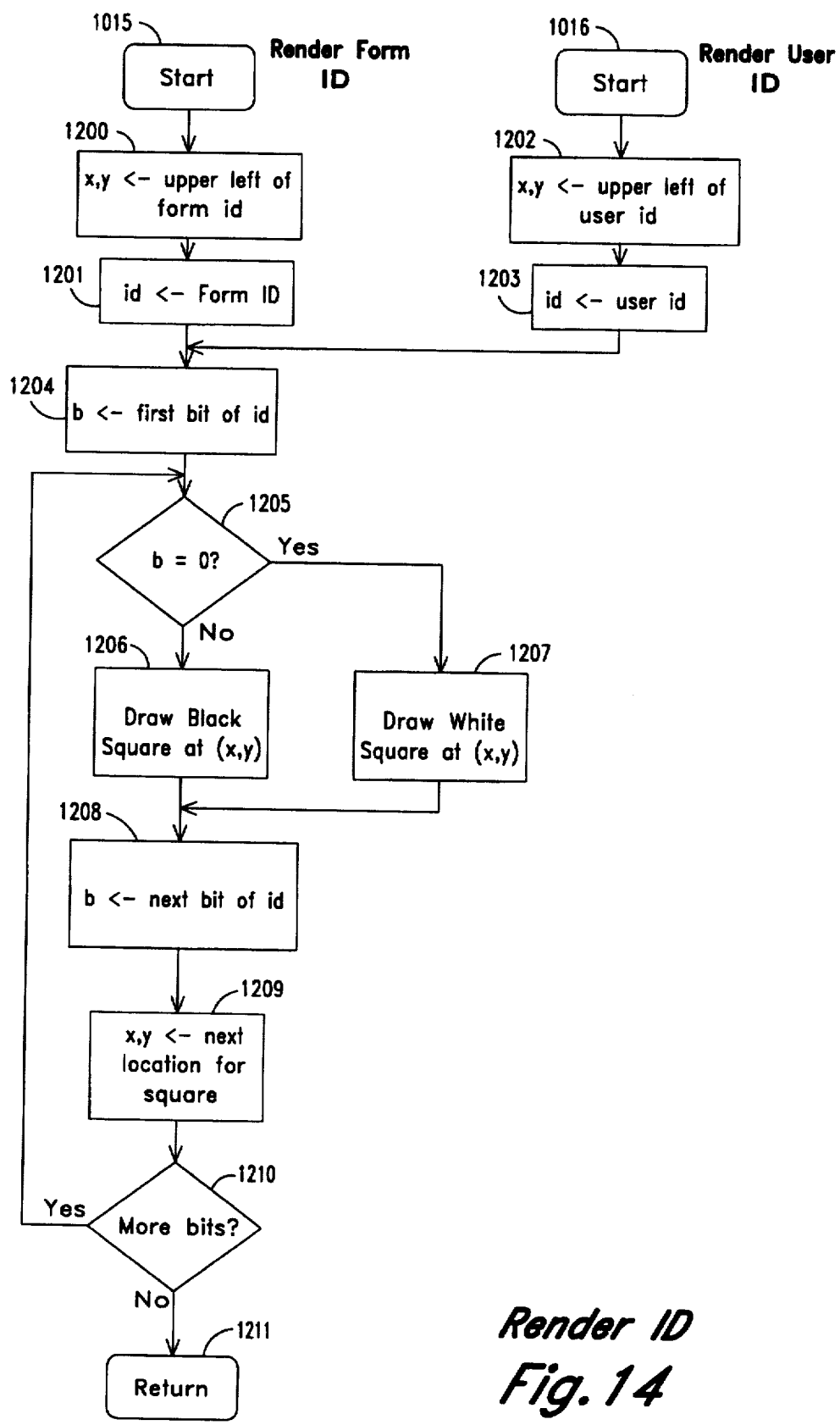
FIG. 14 is a flow diagram of the Render Form ID and Render User ID functions of FIG. 12.

Now referring to FIG. 14, the rendering of both a form ID 190 and a user ID 191 in steps 1015 and 1016, respectively, as machine readable markings 13 in a fixed location relative to the four reference marks as shown on FIG. 2, will be discussed in detail. To draw a form ID 190, the cursor proceeds to an x,y coordinate in the upper left corner of the form ID area 192 at step 1200. An integer representing the form ID 190 is retrieved from memory at step 1201. To draw user ID 191, the cursor also proceeds to an x,y coordinate in the upper left corner of user ID area 193 at step 1202 and an integer representing the user ID 191 is retrieved from memory at step 1203. Next, the first bit of the respective integer is processed as variable "B" whereupon if "B" is read as a digital 0 at step 1205, a white square is drawn at that particular coordinate x,y as shown at step 1207. If variable "B" is not equal to a digital 0 (i.e., it is a digital 1), at step 1205, a black square is drawn at that particular x,y coordinate at step 1206. The next bit of the respective character string of the ID is then read at step 1208 whereupon the cursor moves to the next preselected coordinate x,y in the respective ID area at step 1209. If there are more bits in the integer to be read at step 1210, the function returns to step 1205. If there are no more bits to be read at step 1210, the function exits.

Figure 15:
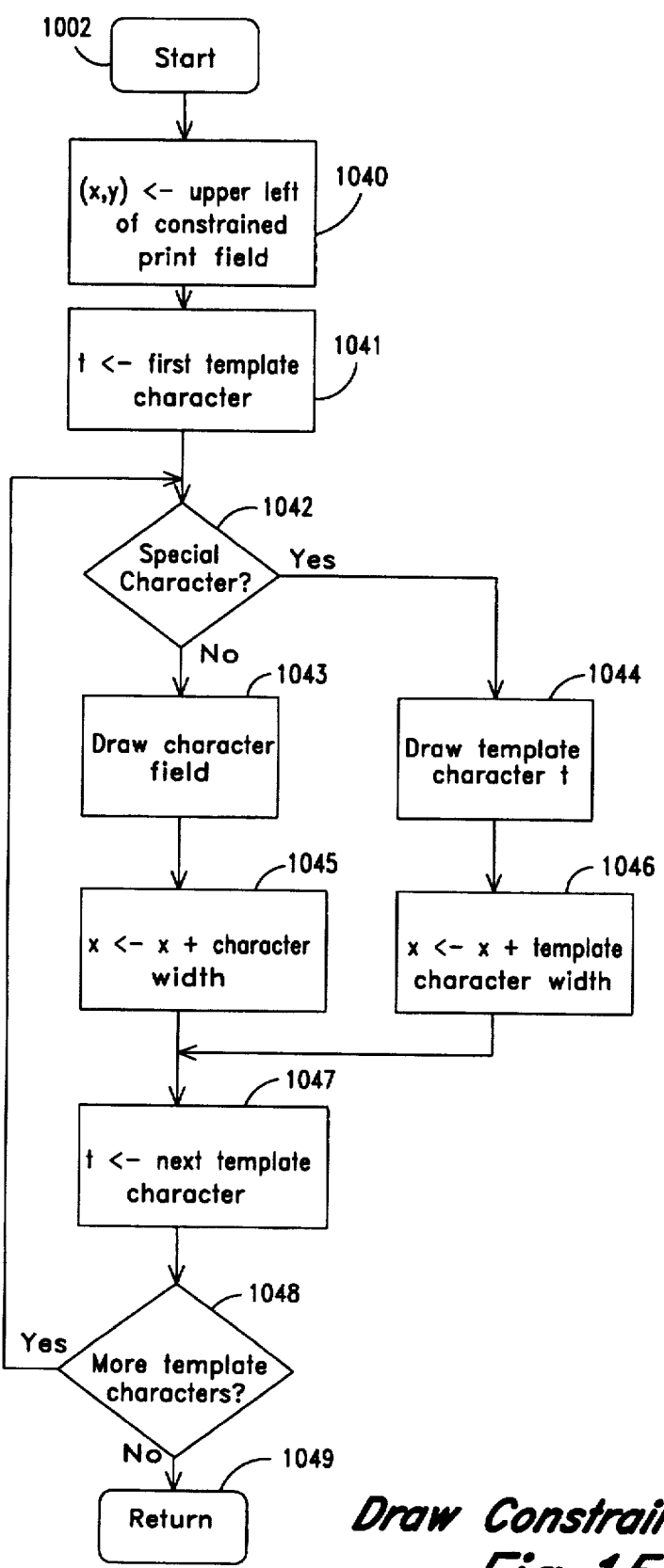
FIG. 15 is a flow diagram of the Draw Constrained Print function as shown in FIG. 12.

Now referring to FIG. 15, function 1002 shown in FIG. 12 which draws constrained print fields using structures GOBJ and CONSTR$_{13}$ OBJ will be described in some detail to explain how to draw constrained print fields. At step 1040, the cursor moves to the selected x,y coordinate where the upper left portion of the constrained print field will be drawn. The first of a string of template characters is retrieved from memory as variable T at step 1041 whereupon a determination is made whether variable T is a special character at step 1042. If T is a special character, that character is drawn at step 1044 wherein the x coordinate is incremented by a predetermined template character width at step 1046. If at step 1042 variable T is not a special character, a character field is drawn at step 1043 whereupon the x coordinate is incremented by a predetermined character width at step 1045. Upon completion of either step 1046 or 1045, the next template character T to be drawn is established as variable T at step 1047. If there are more template characters at step 1048, the function returns to step 1042; however, if there are no more template characters at step 1048, the function exits to point 1012 shown in FIG. 12.

Figure 16:
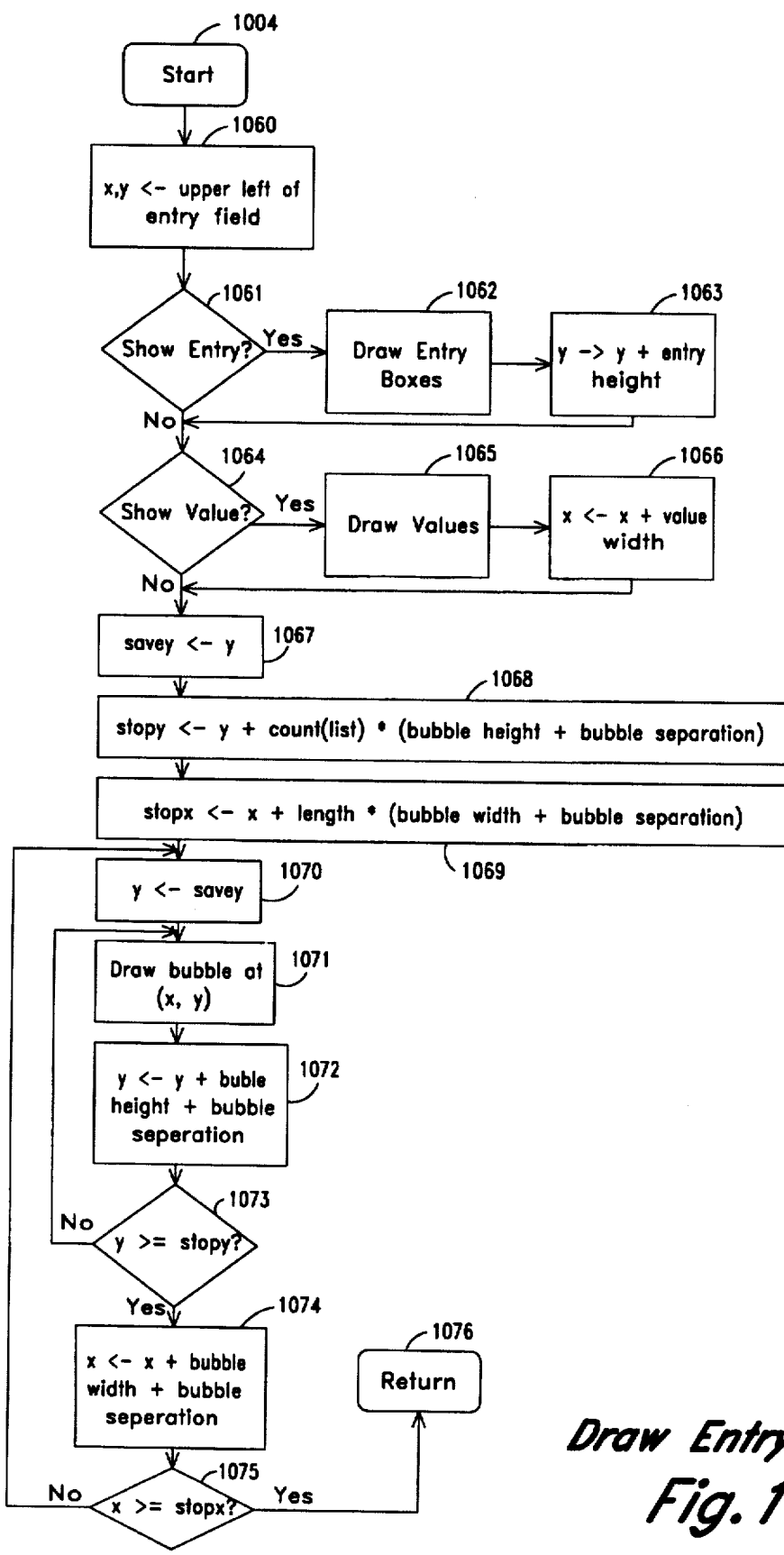
FIG. 16 is a flow diagram of the Draw Entry Field function as shown in FIG. 12.

Function 1004 shown in FIG. 12 which draws an Entry Field using GOBJ and ENTRY$_{13}$ OBJ structures will now be described in some detail as illustrated in FIG. 16. At step 1060, the cursor moves to the x,y coordinate in the upper left corner of where the entry field will be drawn. Next, if the entry area is desired to be shown at step 1061, the entry box is drawn at step 1062 whereupon the y coordinate is incremented by a predetermined entry height at step 1063. Upon incrementing the y coordinate at step 1063, or if the entry area is not desired to be shown in step 1061, step 1064 is executed to determine if the values are desired to be shown. If the values are desired to be shown in step 1064, the values are drawn at step 1065 whereupon the x coordinate is incremented a predetermined value width at step 1066. Upon completion of step 1066 or if no values are desired to be shown at step 1064, step 1067 is next performed wherein the y value is saved, the stop y value is incremented as shown at step 1068, and the stop x value incremented as shown at step 1069. Next, at step 1070 the y value is restored from save y. Next, a rectangle, or bubble is drawn at coordinates x,y as shown in step 1071 whereupon the y value is incremented at step 1072 by a predetermined rectangle, or bubble height plus a predetermined rectangle separation. Next, at step 1073, a determination is made if the y value is greater than or equal to the stop y value. If the y value is less than the stop y value, the function returns to step 1071. Else, at step 1074, the x value is incremented a predetermined standard rectangle width plus a predetermined rectangle separation. Next, at step 1075, if the x value is still less than the stop x value, the function returns to step 1070. If the x value is greater than or equal to the stop x value, the function exits to point 1012 shown in FIG. 12.

Figure 17:
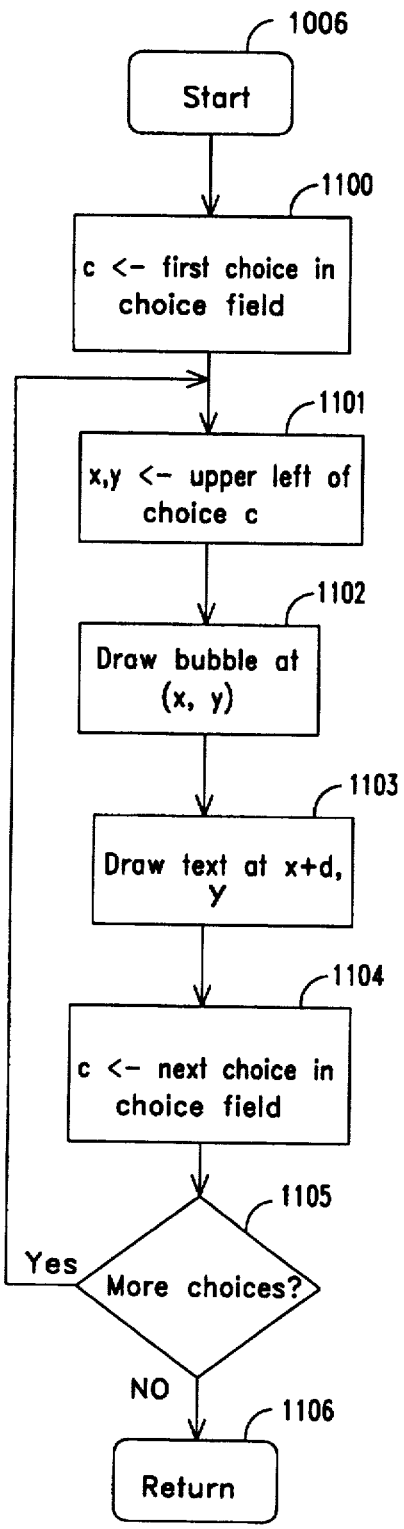
FIG. 17 is a flow diagram of the Draw Choice Field function as shown in FIG. 12.

Now referring to FIG. 17, function 1006 shown in FIG. 12 which draws a choice field using structures GOBJ and CHOICE$_{13}$ OBJ is described in some detail. At step 1100, the user determines a first choice represented as variable "C" to be drawn. The cursor moves to the x,y coordinate where the upper left portion of the choice represented by variable "C" is to be drawn at step 1101, whereupon a rectangle is drawn at that x,y coordinate in step 1102. Next, descriptive text is drawn a x plus a predetermined distance represented as Δ, y at step 1103. Next, at step 1104 the next choice "C" in the choice field represented as variable "C" is established. Next, if more choices "C" are to be drawn at step 1105, the function returns to step 1101, whereas, if no more choices are to be drawn, the function exits to point 1012 shown in FIG. 12.

Receiving a Completed Form

Figure 18:
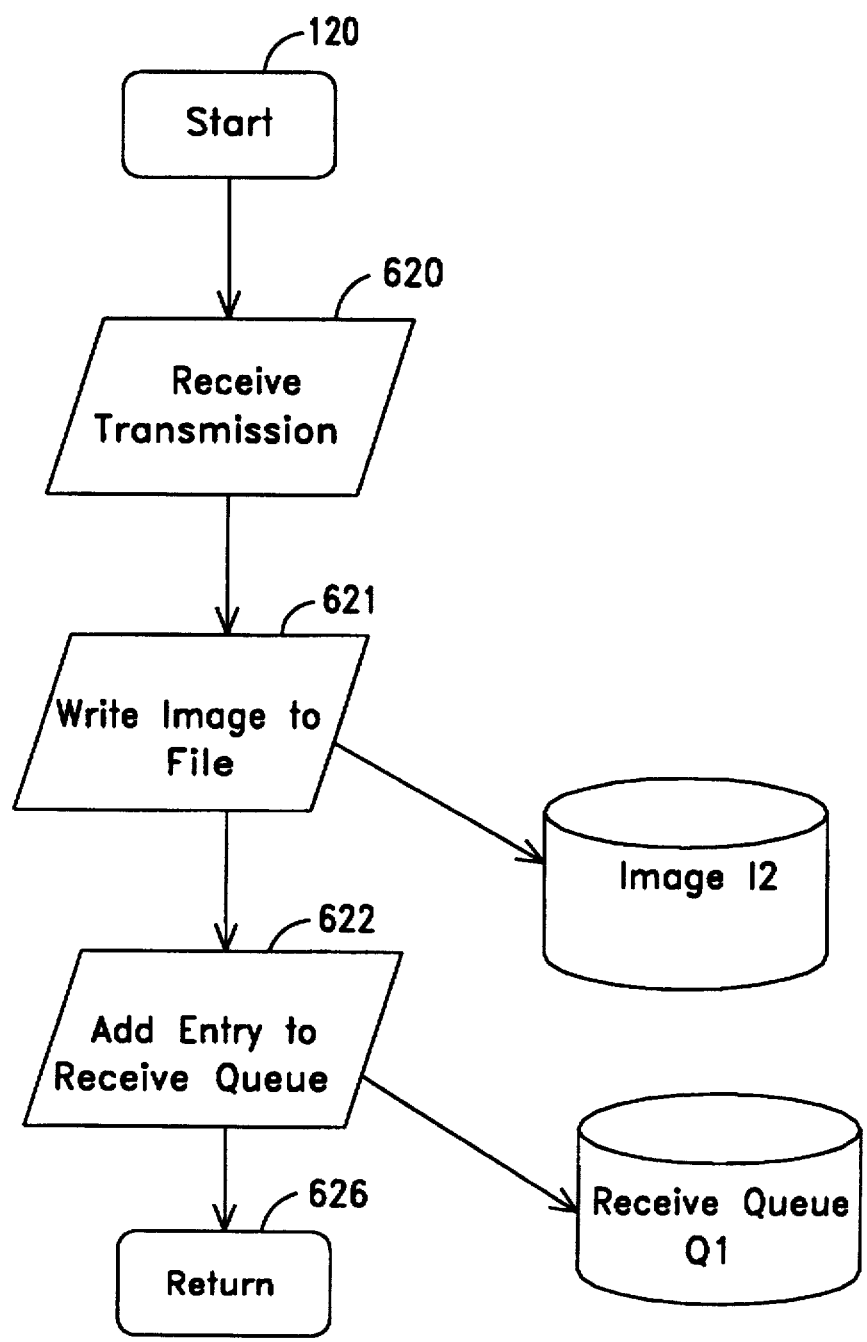
FIG. 18 is a flow diagram of the Receive Fax function as shown in FIG. 5.

Referring to FIG. 18, function 120 which processes received completed fax forms 12 as referred to previously in FIG. 5, is now described in detail. At step 620, upon reception of a fax transmission, the image of fax transmission is written at step 621 into an image file I2. This transmission is added at step 622 to the receive queue Q1 as an entry. Function 120 then exits to point 648 shown in FIG. 5.

Interpreting a Received Form

Figure 19A:
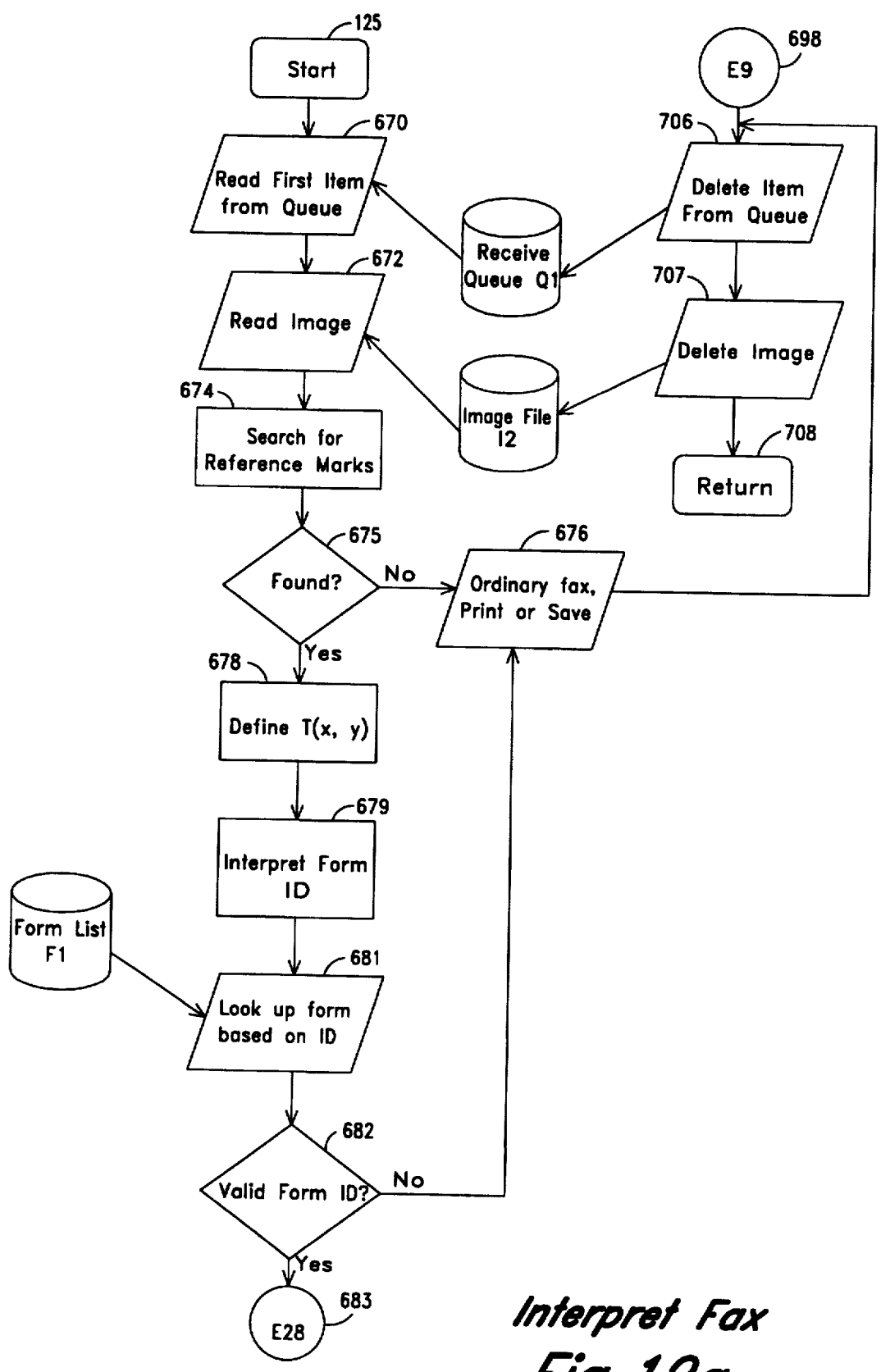
FIGS. 19a and 19b are a flow diagram of the Interpret Fax function as shown in FIG. 5.

Referring to FIG. 19a, function 125 which interprets received completed fax forms 12, referred to earlier in FIG. 5, will now be described in some detail. At step 670, the first entry from queue Q1 is read. Next, images are read at step 672 from corresponding image file 623, whereupon a search for reference marks 182, 184, 186 and 188 shown on FIG. 2 is conducted at step 674. If no reference marks are found at step 675, the retrieved images are considered an ordinary fax at step 676 and are printed or saved, and the function exits to point 677. If reference marks are found at step 675, T(x,y) is defined at step 678 whereupon the machine readable markings 13 are interpreted at step 679 to identify form ID 190 and user ID 191. Next, a respective identified ID is compared at step 681 to form list F1. A determination is made at step 682 if a valid form ID has been found. If a valid form ID has not been found, the function proceeds to step 676.

Figure 19B:
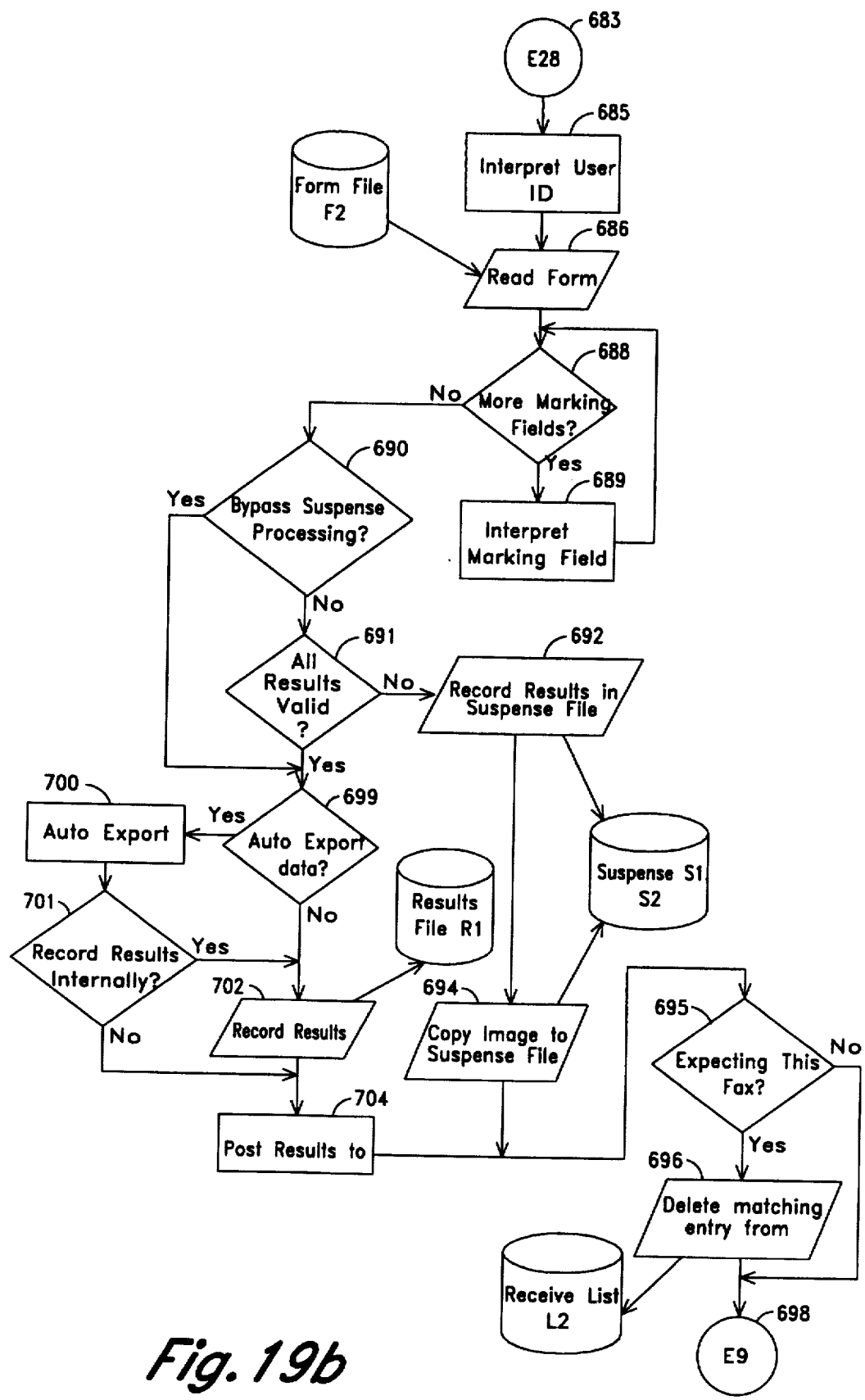

If a valid form ID has been identified at step 682 (FIG. 19a), the function proceeds to interpret the user ID at step 685, (now referring to FIG. 19b). Next a fax form corresponding to the identified form ID is retrieved from form file F2 and used as a template for interpreting the present form against. The function proceeds at step 688 to determine if marking fields are present for interpretation. If there are, step 689 interprets the marking fields as will be described shortly. After a marking field is interpreted, the function proceeds back to step 688 once again. This process repeats until all marking fields have been interpreted. When no more marking fields remain for interpretation at step 688, the function proceeds to step 691 to determine if all interpreted results are valid. If all results are valid at step 691, the results are recorded at step 702 into results file R1. Subsequently, the results are posted at step 704 to the user application software 40 (FIG. 1) via a DDE link. If at step 691 all results are not valid, the results are recorded in suspense file S1, whereupon the images are copied to suspense file S2 at step and the function proceeds to point 677 (FIG. 19a). From point 677, the first item in the queue having been read, is deleted at step 706 from receive queue Q1. The image of this queue is also deleted at step 707 from image file I2, whereupon the function proceeds to point 648.

Results File Format

The results file format for files R1 and S1 will now be described. The format comprises a sequence of records having the following structure:

---

Record 1 with three integers separated by spaces.

| | |
|---|---|
| n | Number of items in following record |
| len | Character length of following record. |
| err | Error Code |

Record 2 with n items separated by tabs possibly followed by an error mask.

| | |
|---|---|
| value[1] | value of interpreted field, item 1 |
| ... | ... ... ... |
| value[n] | "        "        , item n |
| errmask | Error mask |

Records 1 and 2 are repeated alternately until a record 1 is encountered with the value [EOR].

Record 2 with the field name

| | |
|---|---|
| objid | Object ID (field name) |

Record 4 with location information

| | |
|---|---|
| page | Page number of bitmap file where field can be located |
| rect.left | Coordinate for left side of rectangle defining the field |
| rect.top | Coordinate for top side of rectangle defining the field |
| rect.right | Coordinate for right side of rectangle defining the field |
| rect.bottom | Coordinate for bottom side of rectangle defining the field |
| flip | 1 if image is right side up, −1 if image is bottom first |

Records 3 and 4 are repeated alternately until the end of file is encountered.

The following is an example results file:

(note that the CR and LF are included in the record length)
120

1190
10/29/91 15:14:06
1 29 16
AB??EF??HIJ?LM    0099009000900
1 23 16
12345??890    0000099000
1 29 16
NOPQR?T?VWXYZ    0000090900000
[EOR]
Name
1    177    332    1096    423    1
Number
1    177    648    785    739    1
name1
    177    462    1095    553    1

---

Interpretation of Form ID

Figure 20:
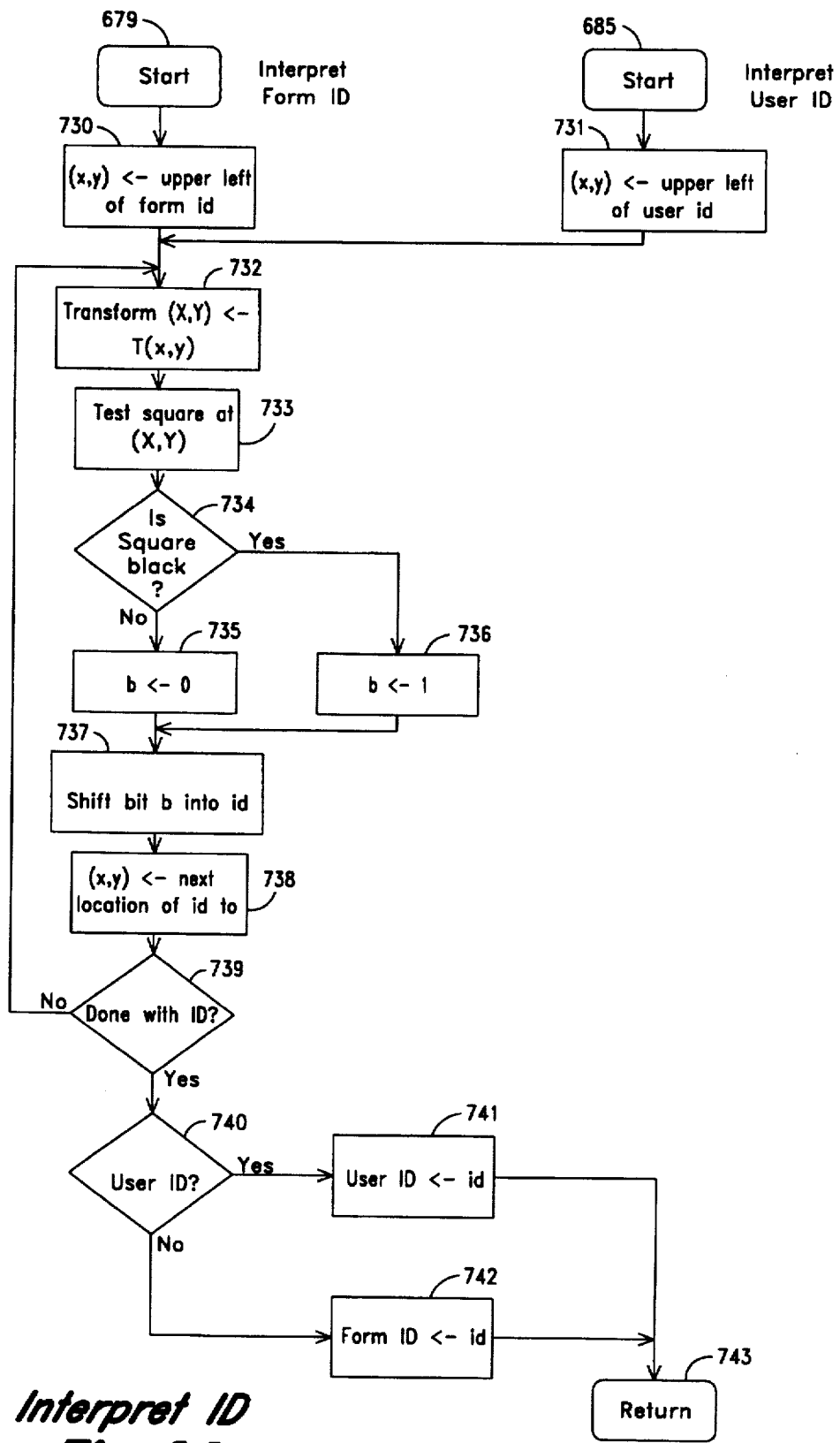
FIG. 20 is a flow diagram of the Interpret Form ID and Interpret User ID functions as shown in FIG. 19.

The interpretation of the form ID labelled step 679 in FIG. 19a is now described in some detail. Referring to FIG. 20, the cursor proceeds to coordinates x,y at the upper left portion of machine readable markings 13 at steps and 731 whereupon the following transformation from T(x,y) to (X,Y) is performed at step 732:

---

| | |
|---|---|
| (X,Y) = T(x,y) | |
| (x,y) | original coordinates to transform |
| (m.left, m.top) | coordinates of upper left reference mark on original form |
| (m.right, m.bot) | coordinates of lower right reference mark on original form |
| (plt.h, plt.v) | coordinates of upper left reference mark on fax image |
| (prt.h, prt.v) | coordinates of upper right reference mark on fax image |
| (plb.h, plb.v) | coordinates of lower left reference mark on fax image |
| (prb.h, prb.v) | coordinates of lower right reference mark on fax image |
| (X,Y) | Transformed coordinates on fax image |

$$p1 = \frac{(x - m.left) * (prt.h - plt.h)}{m.right - m.left} + plt.h$$

$$p2 = \frac{(x - m.left) * (prb.h - plb.h)}{m.right - m.left} + plb.h$$

$$X = \frac{(y - m.top) * p2 + (m.bot - y) * p1}{m.bot - m.top}$$

$$p3 = \frac{(y - m.top) * (plb.v - plt.v)}{m.bot - m.top} + plt.v$$

-continued $$(X,Y) = T(x,y)$$

$$p4 = \frac{(y - m.top) * (prb.v - prt.v)}{m.bot - m.top} + prt.v$$

$$Y = \frac{(x - m.left) * p4 + (m.right - x) * p3}{m.right - m.left}$$

Next, at step 733, a first selected square of the form ID 190 or user ID 191 at X,Y is tested to determine at step 734 if the square is black wherein a variable "B" presented as a digital 1 at step 736; wherein, if the square is white at step 734, variable "B" is represented as a digital "0" at step 735. This variable "B" is now shifted into a digitally represented identification at step 737 whereupon at step 738, the next selected location x,y to test an ID square is located. A determination is made at step 739 to determine if the ID is done being identified. If the interpreting process has not been completed, the function proceeds back to step 732, wherein if the ID has been digitally interpreted, the function proceeds to step 740. At step 740, if the interpreted region represents a user ID, the ID is recognized as a user ID labelled 741. If at step 740 the interpreted region does not represent a user ID, the digital identification is associated with a form ID labelled 742. Now, the function returns back to step 681 in FIG. 19a as previously discussed.

Interpretation of Marking Fields

Figure 21:
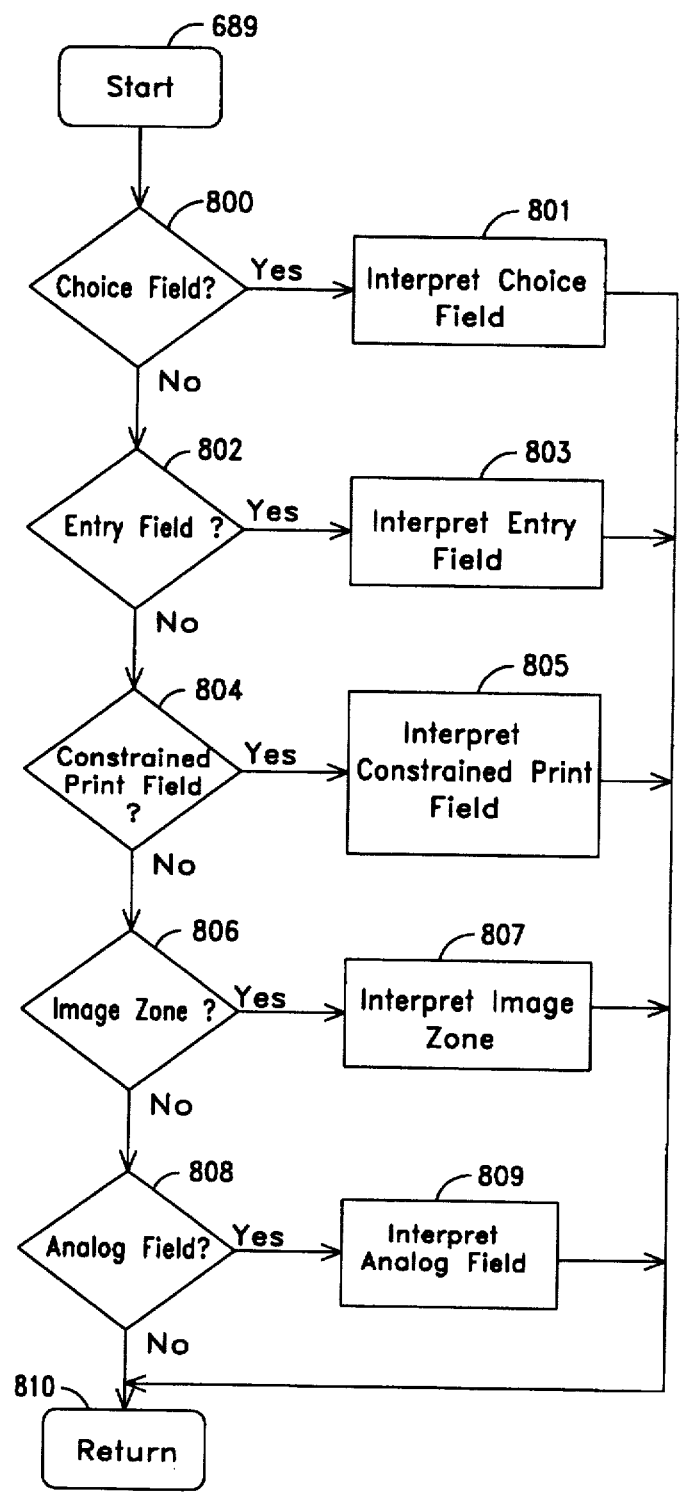
FIG. 21 is a flow diagram of the Interpret Marking Field function as shown in FIG. 19.

Next, the interpretation of marking fields labelled at step 689 in FIG. 19b is described in some detail. Referring to FIG. 21, the determination is made at step 800 if the marking field is a choice object, whereupon if it is, the function proceeds to function 801. If the marking field to be interpreted is not a choice object at step 800, the function proceeds to step 802 to determine if the marking field is an entry object. If it is an entry object, the function proceeds to function 803, whereupon if it is not, the function proceeds to step 804 to determine if the marking field is a constrained print object. If it is, the function proceeds to function 805, whereupon if it is not, the function returns and proceeds back to step 688 in FIG. 19b.

Interpretation of Choice Fields

Figure 22:
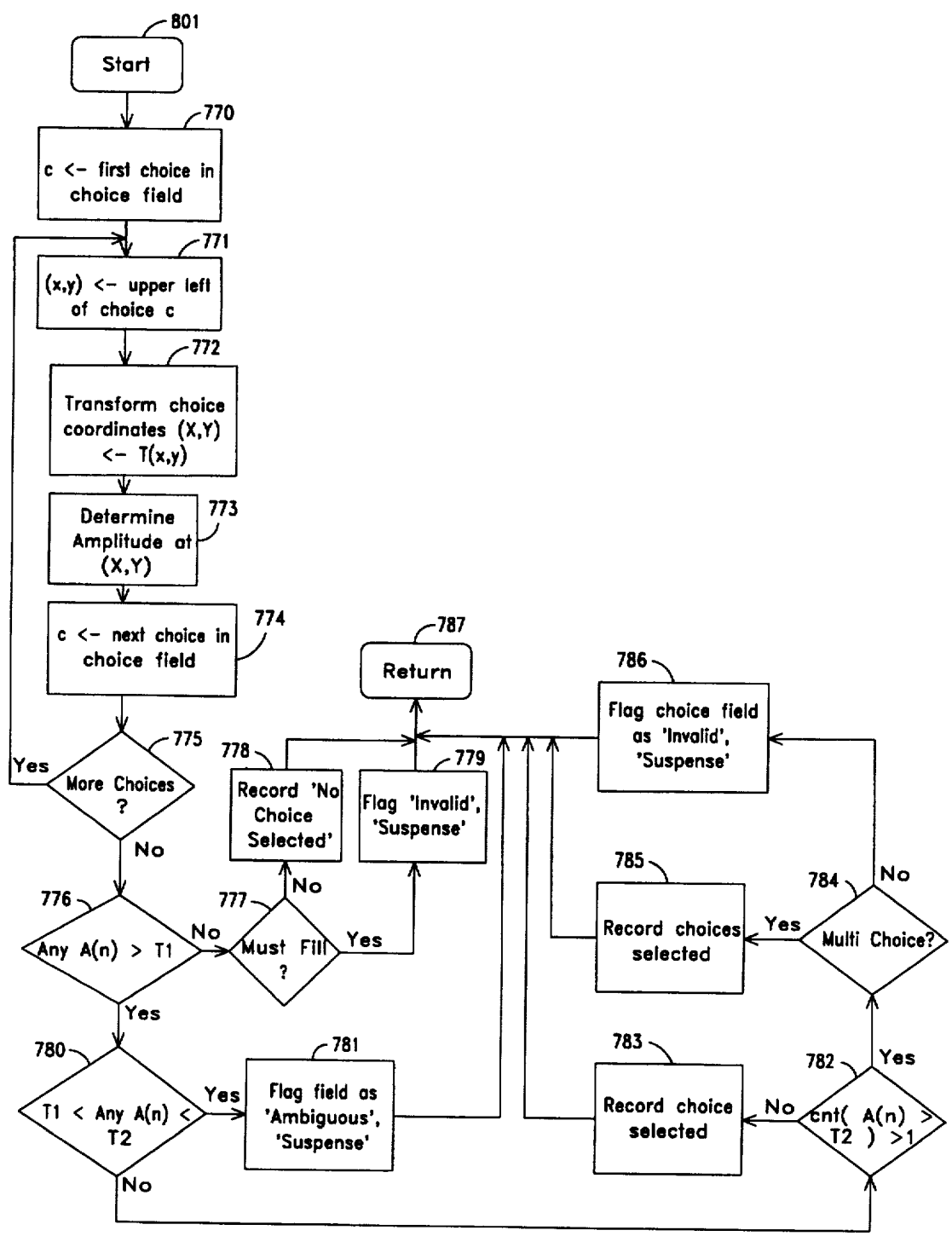
FIG. 22 is a flow diagram of the Interpret Choice Field as shown in FIG. 21.

Function 801 which interprets a choice field will now be described in some detail. Referring to FIG. 22, the first choice in the choice field is represented by variable "C" at step 770. Next, at step 771 the location of choice "C" is retained in the variables x and y where (x,y) is a coordinate pair in the original form template. The coordinates (x,y) which represent the location of the choice "C" in the template are then transformed at step 772 using the transformation T(x,y) defined in step 678 of FIG. 19a with the resulting location being represented by variables X and Y where (X,Y) is a coordinate pair in the image. Next, at step 773 the amplitude of the rectangle at location (X,Y) is determined and retained in the variable An where n represents the loop iteration number. The next choice in the choice field is then retrieved at step 774 followed by a test for completion of the choice field (i.e., no more choices) at step 775. If there are more choices in the choice field, the function proceeds to step 771; otherwise, the function proceeds to step 776 where the values $\{A_1, A_2, \ldots A_n\}$ are considered. If none of the recorded amplitudes are greater than a prespecified minimum threshold $T_1$, then no choice was selected and such fact is recorded in step 778. Otherwise, the function proceeds to step 780 where the amplitudes $\{A_1, A_2, \ldots A_n\}$ are evaluated to determine if any are in the range $T_1 < A_n < T_2$. Any amplitude in this range is considered ambiguous, i.e., the intended marking is not known. If any $A_n$ fall into this ambiguous range, the function proceeds to step 781 where the fact of ambiguity is recorded and the status of the form is set to "suspense". Otherwise, the number of choices having amplitude $A_n$ greater than the predetermined threshold value $T_2$ are counted at step 782. If only one of $\{A_1, A_2, \ldots A_n\}$ has amplitude greater than $T_2$ (i.e., only one choice selected), the function proceed step 783 where that choice is recorded. If at step 782, more than one of $\{A_1, A_2, \ldots A_n\}$ was found to have amplitudes greater than $T_2$, the function proceeds to step 784 where the determination is made as to whether or not this field is a multiple choice field. If it is a multiple choice field, the function continues to step 785 where the choices selected are recorded. If at step 784, the determination is made that the field is not multiple choice (i.e., single choice only), the function proceeds to step 786 where the field is flagged as invalid and the status of the form set to "suspense". After any of steps 778,781, 783,785 or 786, the function proceeds back to location 810 on FIG. 21.

Interpretation of Entry Fields

Figure 23:
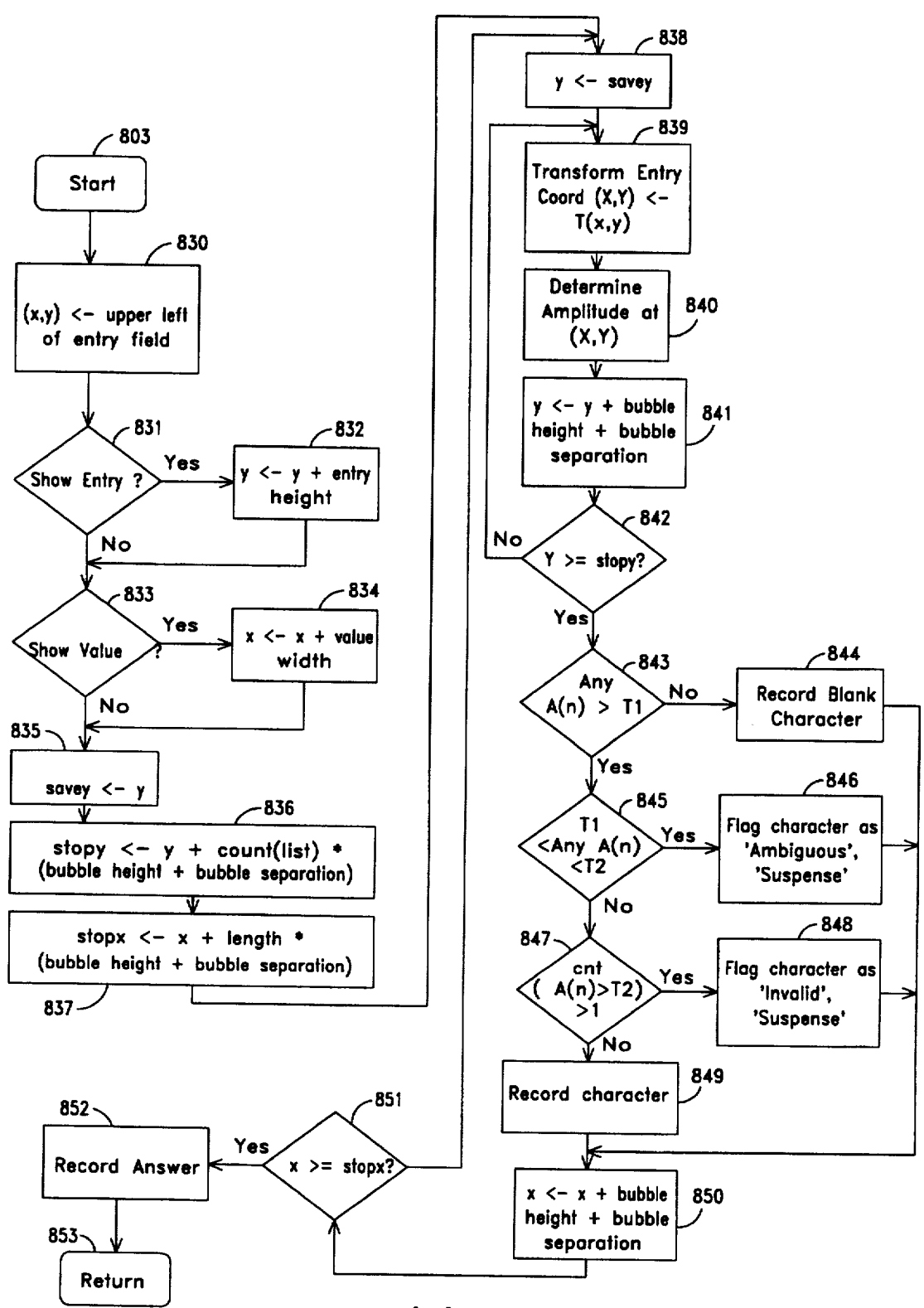
FIG. 23 is a flow diagram of the Interpret Entry Field function as shown in FIG. 21.

Function 803 which interprets an entry field will now be described in some detail. Referring to FIG. 23, the coordinates of the upper left of the entry field are recorded in the variables x and y at step 830 where (x,y) is a coordinate pair on the original form template. Next, at step 831 if the "show entry" attribute is true for this field, the function proceeds to step 832 where the entry region is skipped by adding a predetermined entry height to the y coordinate and then continuing on where step 831 proceeds if the "show entry" attribute is false. Next, at step 833 if the "show value" attribute is true for this field, the function proceeds to step 834 where the value region is skipped by adding a predetermined value width to the x coordinate and then continuing on where step 833 proceeds if the "show value" attribute is false. Next, at step 835 several loop control variables are initialized and the current y location is remembered in the variable "save y". "Stop y" is set to the current y value plus the number of characters to choose from in each digit or letter of the field times the rectangle height as shown at step 836. "Stop X" is set to the current x value plus the number of characters represented by this field times the rectangle width as shown at step 837. Next, at step 838 the y value is restored from save y. Next, at step 839 the transformation (X,Y) ←—T(x,y) defined at step 678 in FIG. 19a is carried out so that (X,Y) now represents the location of the rectangle in the bit map image. Next, at step 840 the amplitude of the rectangle at (X,Y) is determined and retained in the variable $A_n$ where n is the loop iteration. Next, at step 841 the rectangle's height and separation are added to the y coordinate so that the next rectangle considered will be the rectangle below the current one. At step 842, if the current rectangle is below the last rectangle, proceed to step 843. Otherwise, there are more rectangles to check by proceeding to step 839. At step 843, all of the rectangles in one column have had their amplitudes recorded and are now compared to the pre-defined threshold $T_1$. If none of $\{A_1, A_2, \ldots A_n\}$ are above threshold $T_1$, the function proceeds to step 844 where a blank character is recorded. If at step 843 there are amplitudes greater than $T_1$, the function proceeds to step 845 where each of $\{A_1, A_2, \ldots A_n\}$ is compared to see if $T_1 < A_n < T_2$. If any amplitudes are in this range, the function proceeds to step 846 where the character is flagged as "ambiguous" and the status of the form is set to "suspense". If at step 845, no amplitudes are found in the range greater than $T_1$ but less than $T_2$, the function proceeds to step 847 where each of $\{A_1, A_2, \ldots A_n\}$ is compared to $T_2$. If more than one of the amplitudes is greater than $T_2$, the character is flagged as "invalid" and the status of the form is set to "suspense". If at step 847 only one amplitude is found to exceed the $T_2$ threshold, the character corresponding to that threshold is recorded. Following any of steps 844, 846, 848 or 849 the function proceeds to step 850 where the x coordinate is adjusted to the next column which represents the next character in the field. The predetermined rectangle width and separation are added to the x coordinate to access the next column. Next, at step 851 if the x coordinate passes beyond the last column, there are no more columns and the function proceeds to step 852, otherwise the next column will be processed by proceeding to step 838. At step 852, the collection of characters recorded at steps 844, 846 and 848 are recorded and the function proceeds back to location 810 on FIG. 21.

Interpretation of Constrained Print Fields

Figure 24:
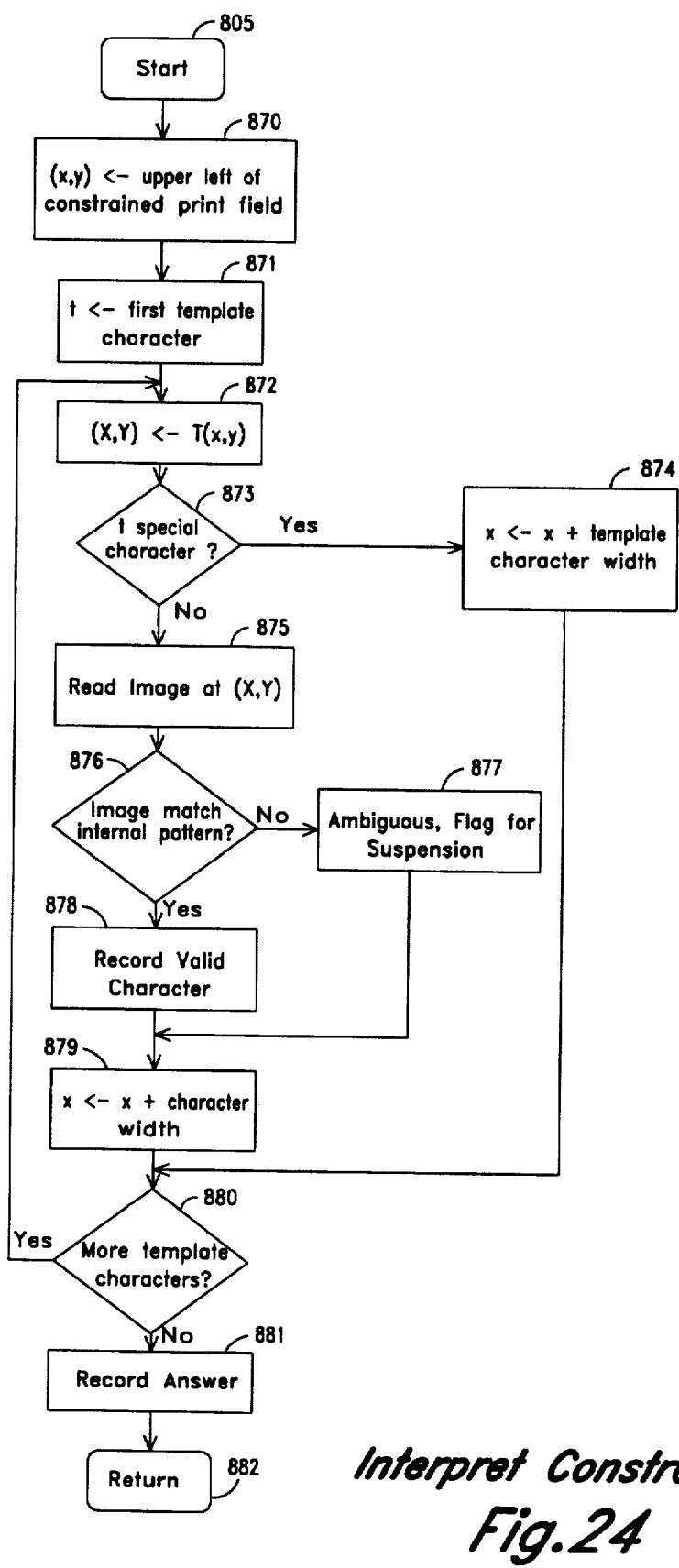
FIG. 24 is a flow diagram of the Interpret Constrained Print function as shown in FIG. 21.

Function 805 which interprets a constrained print field will now be described in some detail. Referring to Figure 24, the coordinates of the upper left of the constrained print field are recorded in the variables x and y at step 870 where (x,y) are a coordinate pair representing a location on the original form template. Next, at step 871 the first template character is represented by variable t. Next, at step 872 the transformation (X,Y) <—T(x,y) as defined at step 678 in FIG. 19a is performed to produce the location of the field in the bit map which is represented by (X,Y). Next, at step 873 a determination is made as to whether or not t is a special character. If it is, the function proceeds to step 874 where the x coordinate is adjusted by the template character width so as to effectively skip over the special character and subsequently proceed to step 880 which is described below. If at step 873, t is determined not be a special character, the image at location (X,Y) is read into memory at step 875. Next, at step 876 the image is compared to several internal patterns in a well-known manner to determine if the character matches any of the prespecified characters. If none of the patterns match, the function proceeds to step 877 where the character is flagged as ambiguous and the status of the form is set to "suspense" and the function proceeds to step 879 which is to be described shortly. If at step 876 the image does match one of the internal patterns, the character represented by that pattern is recorded at step 878 and the function proceeds to step 879. At step 879 the x coordinate is adjusted for the width of the character so that the next character in the field may be processed. If at step 880 there are more template characters, the function proceeds to process them at step 72. If at step 880 there are no more template characters, the function proceeds to step 881 where the collection of characters recorded in steps 877 and 878 are recorded and the function proceeds back to location 810 on FIG. 21.

Drawing and Interpretation of Image Zone and Analogue Field

Figure 25:
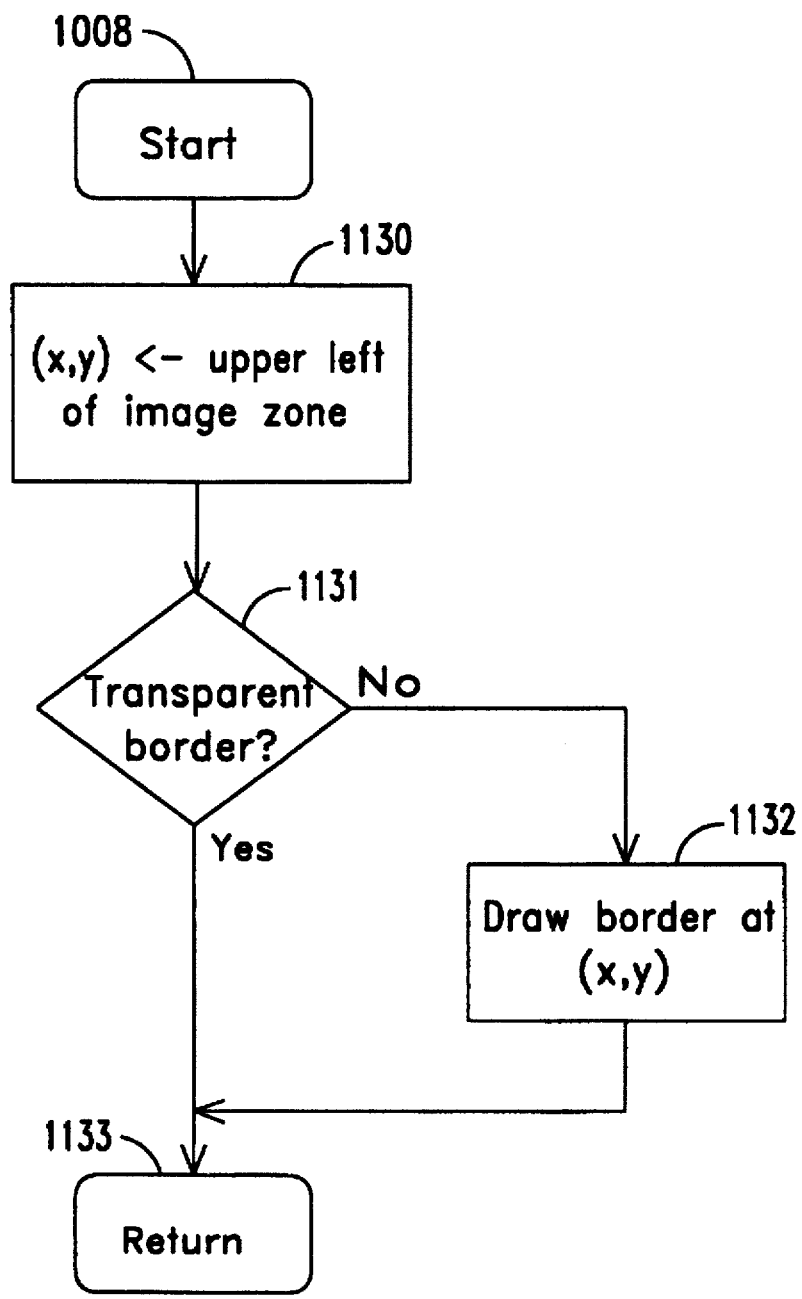
FIG. 25 is a flow diagram of the Draw Image Zone function as shown in FIG. 12.

Referring to FIG. 25, the Draw Image Zone function 1008 will now be described. The function 1008 uses the GOBJ and IMAGE_OBJ structures to draw image zones. The function begins at step 1008, as shown in FIG. 12, and moves to step 1130 wherein the cursor moves to the selected (x,y) coordinate where the upper left portion of the image zone may be drawn. At decision step 1131 a test is made to determine if the transparent border attribute is TRUE in the IMAGE_OBJ structure. If the transparent border attribute is not TRUE in step 1131, then at step 1132 a border is drawn beginning at the selected (x,y) coordinates. If the transparent border attribute is TRUE in step 1131, then the function will exit the function 1008 at step 1133 and return to FIG. 12.

Figure 26:
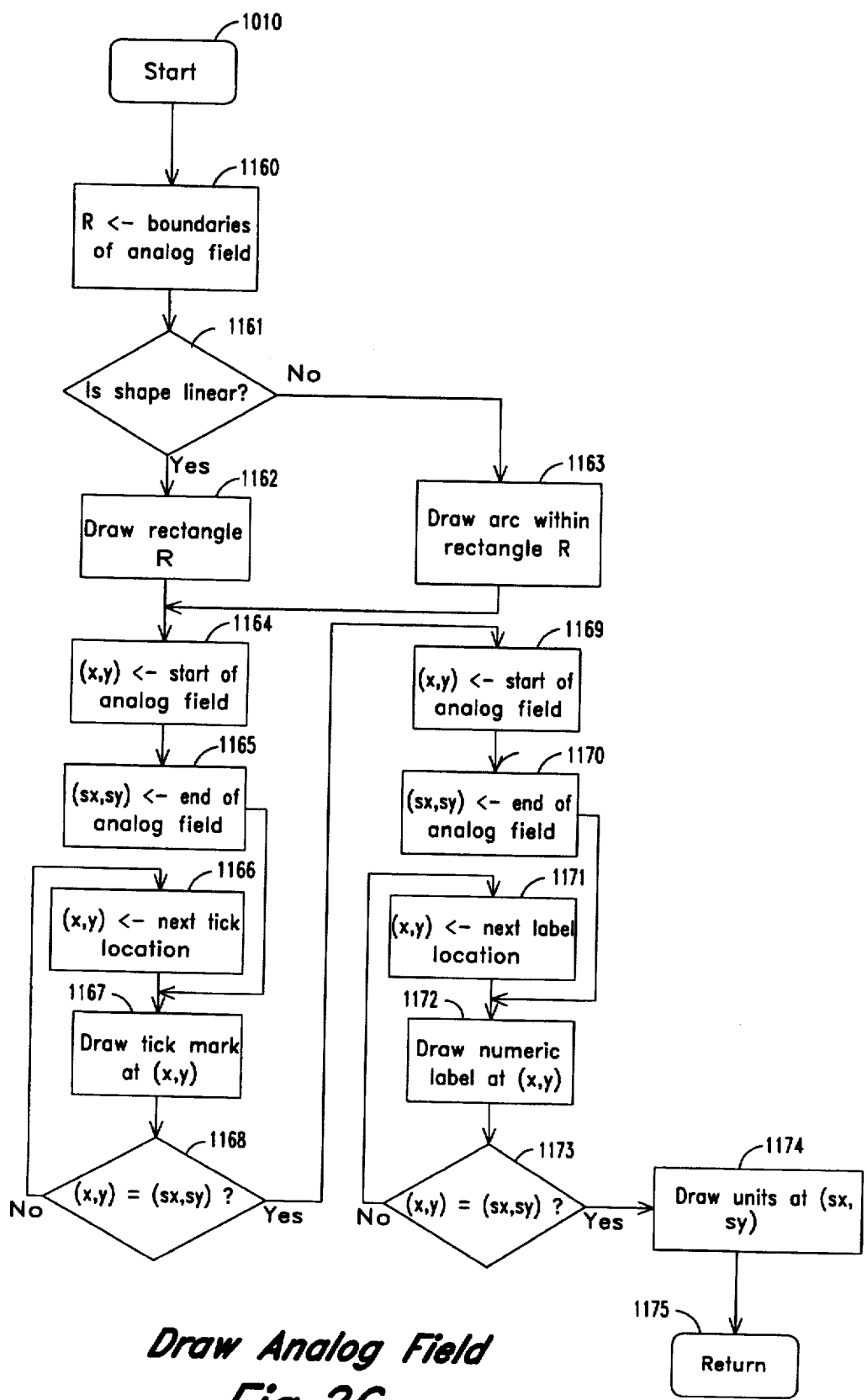
FIG. 26 is a flow diagram of the Draw Analog Field function as shown in FIG. 12.
Figure 41A:
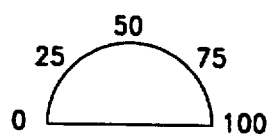
FIGS. 41a–41j is a sample set of analog representations which can be created and interpreted in accordance with the present invention.
Figure 41B:
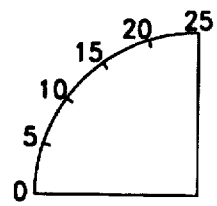
Figure 41C:
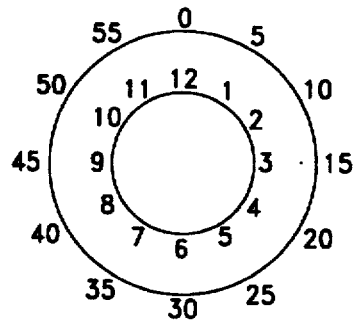
Figure 41D:
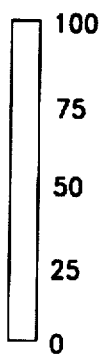

Referring to FIG. 26, the Draw Analog Field function 1010 will now be described. The function 1010 uses the GOBJ and ANALOG_OBJ structures to draw analog fields. The function begins at step 1010, as shown in FIG. 12, and moves to step 1160 wherein the boundaries of the analog field are retrieved from the GOBJ structure and assigned to a variable R in order to represent a rectangle. Moving to decision step 1161, a test is made on the ANALOG_OBJ structure to determine if the shape is linear. If the shape is linear in step 1161, then in step 1162 a rectangle is drawn as defined by the boundaries R. Example linear fields are shown in FIGS. 41d and e. If the shape is not linear in step 1161, then in step 1163 an arc, as defined in the ANALOG_OBJ structure, is drawn within the rectangle R boundaries.

Figure 41E:
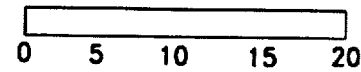
Figure 41F:
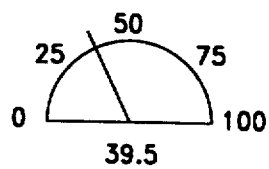
Figure 41G:
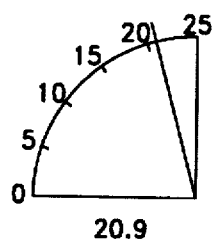
Figure 41H:
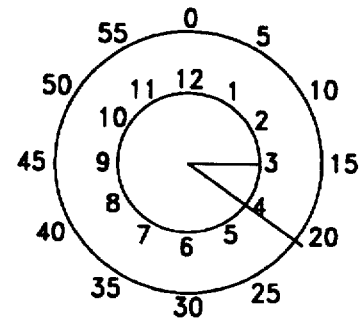
Figure 41I:
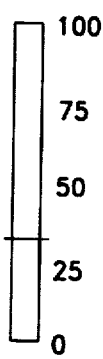

After completion of either step 1162 or 1163, step 1164 assigns the start of the analog field, as defined in the ANALOG_OBJ structure, to a (x,y) coordinate set. Moving to step 1165, the end of the analog field is assigned to (sx,sy) coordinates in a similar manner. In the example of a horizontal linear field (shown in FIG. 41e), the (x,y) coordinates are at the left, bottom corner of the field and the (sx,sy) coordinates are at the right, bottom corner of the field. Next, at step 1167 a tick mark is drawn at coordinates (x,y) to draw a scale on the analog field. The tick marks are drawn in proportion to the field size. Moving to decision step 1168, a test is performed to determine if the end of the field is reached by checking whether (x,y) equals (sx,sy). If the end of the field has not been reached in step 1168, at step 1166 the next tick mark location is assigned to coordinates (x,y). The next location is computed by using the length (for a linear field) or angle (for a circular field) and the number of tick marks, which are all stored in the ANALOG_OBJ structure. For example, a linear field that is one inch in length and having 5 total ticks marks has a tick mark at one-fourth inch intervals (1 divided by (5 minus 1)).

At the completion of step 1166, the next tick mark is drawn at step 1167 and subsequently, at step 1168 the test for end of field is done. The loop consisting of steps 1166, 1167 and 1168 is executed until the end of the field is reached, whereupon step 1169 assigns the start of the analog field to coordinates (x,y) in a similar way as done in step 1164. Step 1170 then similarly assigns the end of the analog field to coordinates (sx,sy). Moving next to step 1172, a numeric label is drawn at coordinates (x,y) and then at decision step 1173, a check is made to determine if the end of the field has been reached. If the end of the field has not been reached at step 1173, a next label location is computed at step 1171 and assigned to coordinates (x,y) using attributes of the ANALOG_OBJ structure. At the completion of step 1171, the next numeric label is drawn at step 1172 and subsequently, at decision step 1173 the test for end of field is done. The loop consisting of steps 1171, 1172 and 1173 is executed until the end of the field is reached, whereupon at step 1174, user defined units of measure, e.g., inches, ° Centigrade, are drawn after the last number at coordinates (sx,sy). Examples of numeric labels on the analog fields are shown in FIG. 41a–e. After the units are drawn in step 174, the function 1010 will exit at step 1175 and return to FIG. 12.

Figure 27:
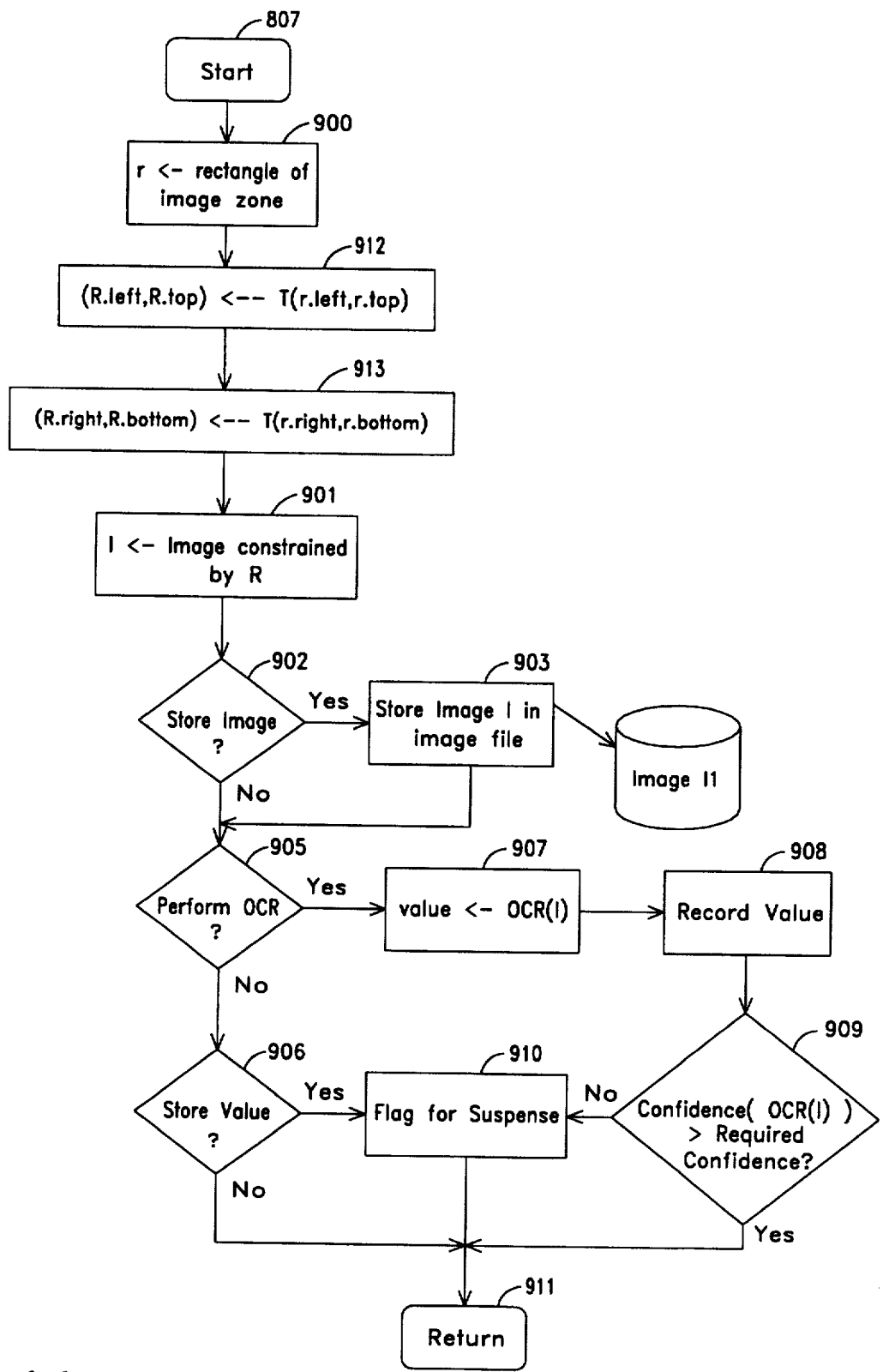
FIG. 27 is a flow diagram of the Interpret Image Zone function as shown in FIG. 21.

Referring to FIG. 27, the Interpret Image Zone function 807 will now be described. The function begins at step 807, as shown in FIG. 21, and moves to a step 900 wherein the rectangle of the image zone is assigned to the variable "r". The variable r comprises a set of components r.left, r.right, r.top and r.bottom which represent the coordinates of the rectangle in the original form template. Next, at step 912 the transformation T defined at step 678 of FIG. 19a is used to transform (r.left, r.top) to a resultant (R.left, R.top). Similarly, at step 913 the transformation T is used to transform (r.right r.bottom) to a resultant (R.right, R.bottom). The set of R.left, R.right, R. top and R.bottom are coordinates in the image. Moving from step 913 to step 901 wherein the variable I is defined to be the bitmapped image within the rectangle R. At decision step 902 a test is performed on the IMAGE_OBJ structure to determine if the image is to be stored. If the image is to be stored as determined at decision step 902, step 903 stores the image I in a file labelled Image I1.

After the image is stored at step 903 or if the image is not to be stored at determined at decision step 902, the function advances to a decision step 905. At decision step 905 the IMAGE_OBJ structure is checked to determine if Optical Character Recognition (OCR) is to be done. If OCR is not to be done at step 905, a decision step 906 checks the IMAGE OBJ structure to determine if the ASCII value the user types in is to be stored. If the ASCII value is not to be stored, the function 807 exits at step 911 and returns to FIG. 21. If the ASCII value is to be stored at step 906, step 910 sets a flag of "suspense" on the image zone and subsequently the function 807 will exit at step 911 and return to FIG. 21.

If the decision at step 905 is True, at step 907 OCR is performed on image I and assigned to the variable 'value'. Moving to step 908, the 'value' is recorded in memory and may subsequently be recorded in file S2 at step 692 or in file R1 at step 702 as shown in FIG. 19b. At decision step 909, a result of the OCR operation is a confidence level. The worst of the OCR confidence levels is compared against a variable set by the user in an initialization file containing a threshold or required confidence level. If the OCR confidence level is better than the threshold confidence, the function exits at step 911 and returns to FIG. 21. If the confidence level as determined at step 909 is not better than the required confidence, step 910 sets a flag of "suspense" on the image zone and the function 807 exits at step 911.

Figure 28:
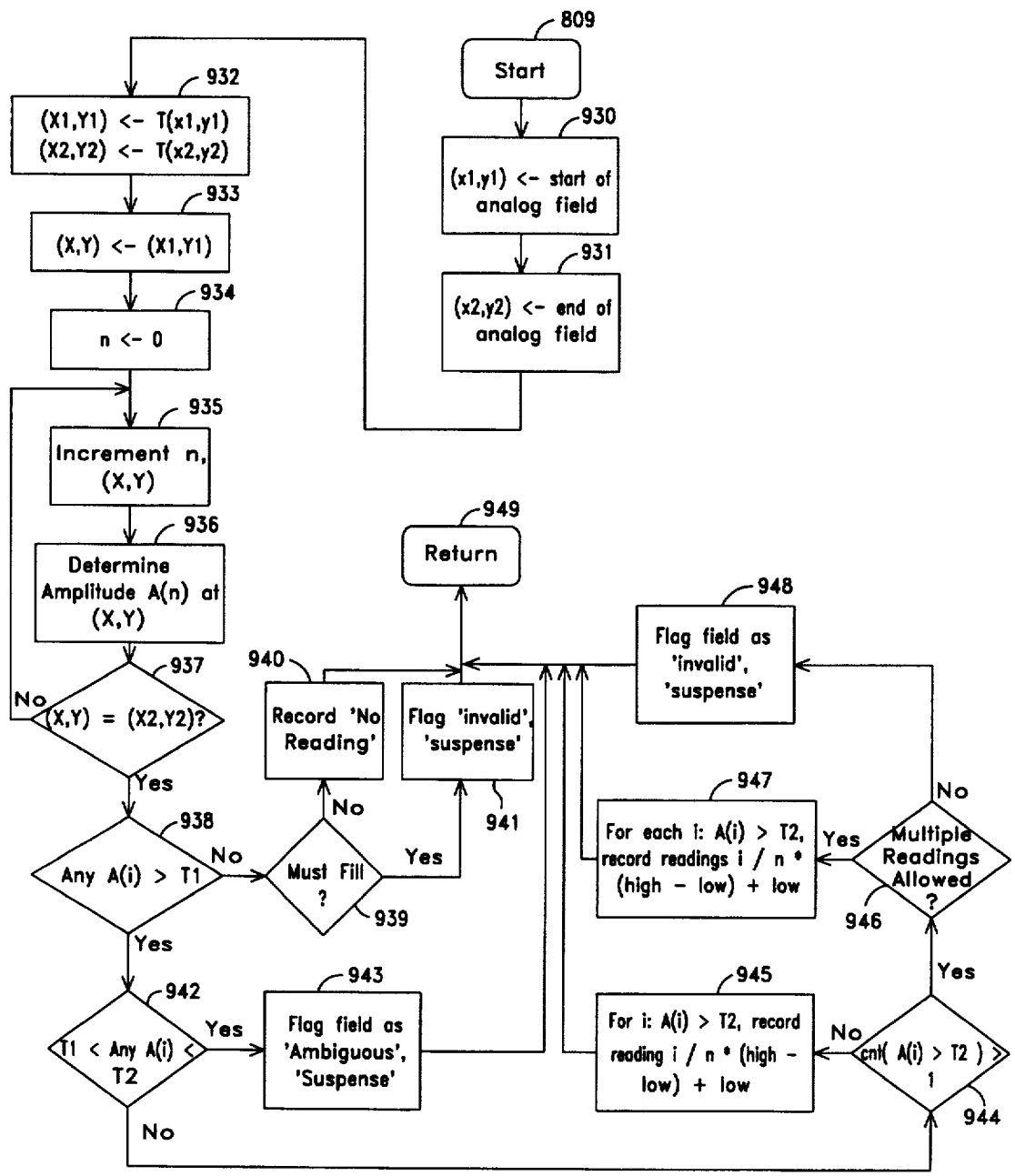
FIG. 28 is a flow diagram of the Interpret Analog Field function as shown in FIG. 21.

Referring to FIG. 28, the Interpret Analog Field function will now be described. The function begins at step 809, as shown in FIG. 21, and moves to a step 930 wherein the start location of the analog field is assigned to coordinates (x1,y1) and at step 931 the end location of the analog field is assigned to coordinates (x2,y2). The set (x1,y1) and (x2,y2) represents the coordinates of the analog field in the original form template. As an example, on the horizontal linear field shown in FIG. 41e, the top left corner represents the coordinates (x1,y1) and the bottom right corner represents the coordinates (x2,y2). Moving to step 932, the transformation T defined at step 678 of FIG. 19a is used to transform (x1,y1) to (X1, Y1) and similarly to transform (x2,y2) to (X2,Y2).

At step 933, the transformed start of the analog field is assigned to a variable set of coordinates (X,Y) and at step 934 a variable 'n' is set to zero. The variable 'n' represents the nth pixel as interpretation proceeds along the analog field. Moving to step 936, the variables 'n' and (X,Y) are incremented to proceed along the analog field. At step 936, a determination is made of the amplitude of any reading on the field at coordinates (X,Y) and the amplitude $A_n$ is recorded in memory. Next, at decision step 937, a test is done to determine if the end of the field is reached. If the end of the field is not reached as determined in step 937, the function loops back to repeat steps 935, 936 and 937 until the end of the field is reached, whereupon the function moves to decision step 938. The variable 'n' remains set to the count reached at the end of the field and is used as a limit for a variable 'i' which is used in subsequent steps of this function.

At step 938, the values $\{A_1, A_2, \ldots A_n\}$ are considered. If none of the recorded amplitudes are greater than a prespecified minimum threshold $T_1$, then no reading was made and the routine moves to a decision step 939 where the 'Must Fill' attribute, which was recorded in the ANALOG_OBJ structure at step 212 in FIG. 6, is checked. If the 'Must Fill' attribute is not TRUE, then 'No Reading' is recorded at step 940. Otherwise, the routine moves to step 941 where the field is flagged as 'invalid' and 'suspense'. This flagging causes a 'suspense' status to be held by the form being interpreted so that upon completion at step 691 in FIG. 19b, the flow proceeds to step 692 resulting in the image and status of the field to be recorded in the suspense file.

Figure 41J:
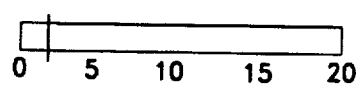

Referring back to step 938, if the recorded amplitude is greater than the minimum threshold $T_1$, the routine proceeds to a decision step 942 where the amplitudes $\{A_1, A_2, \ldots A_n\}$ are evaluated to determine if any are in the range $T1 < A_n$ $T_2$. Any amplitude in this range is considered ambiguous, i.e., the intended reading is not known. If any $A_n$ fall into this ambiguous range, the routine proceeds to step 943 where the fact of 'ambiguity' is recorded and the status of the form is set to 'suspense'. Otherwise, the number of choices having amplitude $A_n$ greater than the predetermined threshold value $T_2$ are counted at step 944. If only one of $\{A_1, A_2, \ldots A_n\}$ has amplitude greater than $T_2$ (i.e., only one reading made), the routine proceeds to step 945 where that reading is recorded For the value 'i', where 'i' is from 1 to 'n' at which the amplitude is greater than $T_2$, the following equation is used to compute the reading: reading= i / n * (high—low) + low. High and low denote high numeric label value and low numeric label value, respectively. As illustrated in FIG. 41j, example values could be i=44, n=400, low=0 and high=20, and the resultant reading is 44/400 * (20-0) + 0=2.2

If at step 944, more than one of $\{A_1, A_2, \ldots A_n\}$ was found to have amplitudes greater than $T_2$, the routine proceeds to a decision step 946 where the determination is made as to whether or not multiple readings are allowed for this field. If multiple readings are allowed, the routine continues to step 947 where the readings are recorded. For each of the values 'i' at which the amplitude is greater than T2, the following equation is used to compute the readings: reading = i / n , (high—low) + low. The variables are all as given in the previous paragraph. If at step 946, the determination is made that the field does not allow multiple readings (i.e., single reading only), the routine proceeds to step 948 where the field is flagged as 'invalid' and the status of the form set to 'suspense'. After any of steps 940, 941, 943,945, 947 or 948, the routine exits at step 949 and returns to FIG. 21.

Suspense Processing

Suspense processing is a procedure directed by the user for the correction of ambiguous or invalid form entries. For example, if an entry field for a zip code has the numeral "5" that was written so as it could be misinterpreted as an "8", the position of the ambiguity is saved in the results file S1, along with the bit-mapped or form image file S2. Such file creation is shown in FIG. 19, steps 692 and 694. If the user selects the form attribute "Bypass Suspense Processing" in the main event loop of FIG. 4, the decision box 691 (FIG. 19) testing for invalid results will be bypassed and thus the invalid results will go directly to the export and/or results R1 data files for the form.

At a time after the suspense files S1 and S2 have been created, the user can specify, in the main event loop (FIG. 4), the Suspended Faxes function 115. In the suspense function 115, correct values may be entered for each field that is not correctly scored. The form image file S2 is presented on the video display of the computer 42 and thus, human pattern recognition can be applied to either disambiguate the unrecognized entry or entries or note that the entry is invalid, e.g., a filled in box for an entry field. Notably, if the error is in an entry or choice field, the method of selecting the correct choice is to simply move the pointer via the mouse (connected to the computer 42) and click on the correct marks displayed in the image S2.

Figure 29:
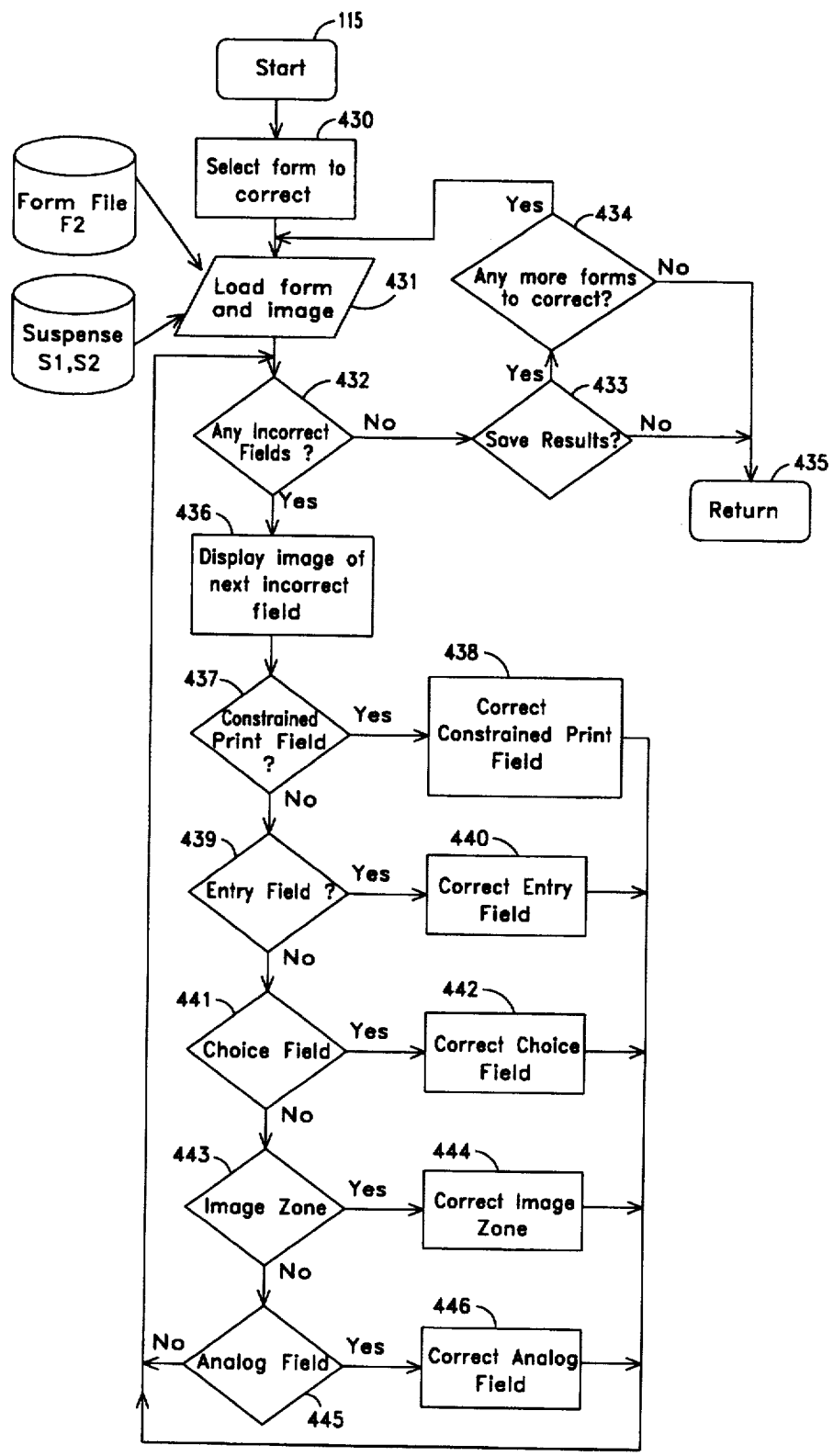
FIG. 29 is a flow diagram of the Suspended Faxes Correction function as shown in FIG. 4.

The control flow for the suspended fax function 115 is illustrated in FIG. 29, wherein the user can select a suspended form to be corrected. That is, the user is provided with a list of forms, typically indicating the sender and time stamped, which are indexed in the computer 36 as suspended results and form image files S1, S2. Continuing to step 431, the correction dialog opens, and loads into the memory of the computer 42, the suspended files S1, S2, and their corresponding form file F2, for example, the template structure for IRS Form 1040EZ as shown in FIG. 2a.

Proceeding to decision state 432, the correction procedure decides whether there are any incorrect or invalid fields in the selected form and, if affirmative, moves to step 436 to display the image, from form image file S2, of the next incorrect field. Depending on the field type of constrained print (step 437), entry (step 439), choice (step 441), image (step 443) or analog (step 445), the correction procedure proceeds, respectively, to the appropriate correct field function of either step 438, 440, 442, 444 or 446. After a field has been corrected, or if an unknown field type has been identified by a final negative test result at decision step 445, the correction procedure loops back to decision step 432 to test for more incorrect fields.

At step 432, if the no more fields need correction, the user is queried at step 433 as to whether the corrected results should be saved in the results file R1. If the results are saved then control continues to decision step 434 to decide whether there are any more forms to correct, and the form interpreter moves to step 431 to load the next suspense files S1, S2 and form file F2, accordingly. On the other hand, if results are not saved, or no more forms need be corrected, the function terminates at step 435. After all the fields have been corrected and the automatic "save" dialog pops up, if the user selects "save" the results are written to the appropriate file(s) as with step 699 in FIG. 19b. The suspense files S1 and S2 are deleted. If on the other hand the user selects the save button on the correction dialog, the user gets an opportunity to retain S1 and S2 in suspense as with faxes that are properly interpreted. They can be deleted at some other time.

Figure 30:
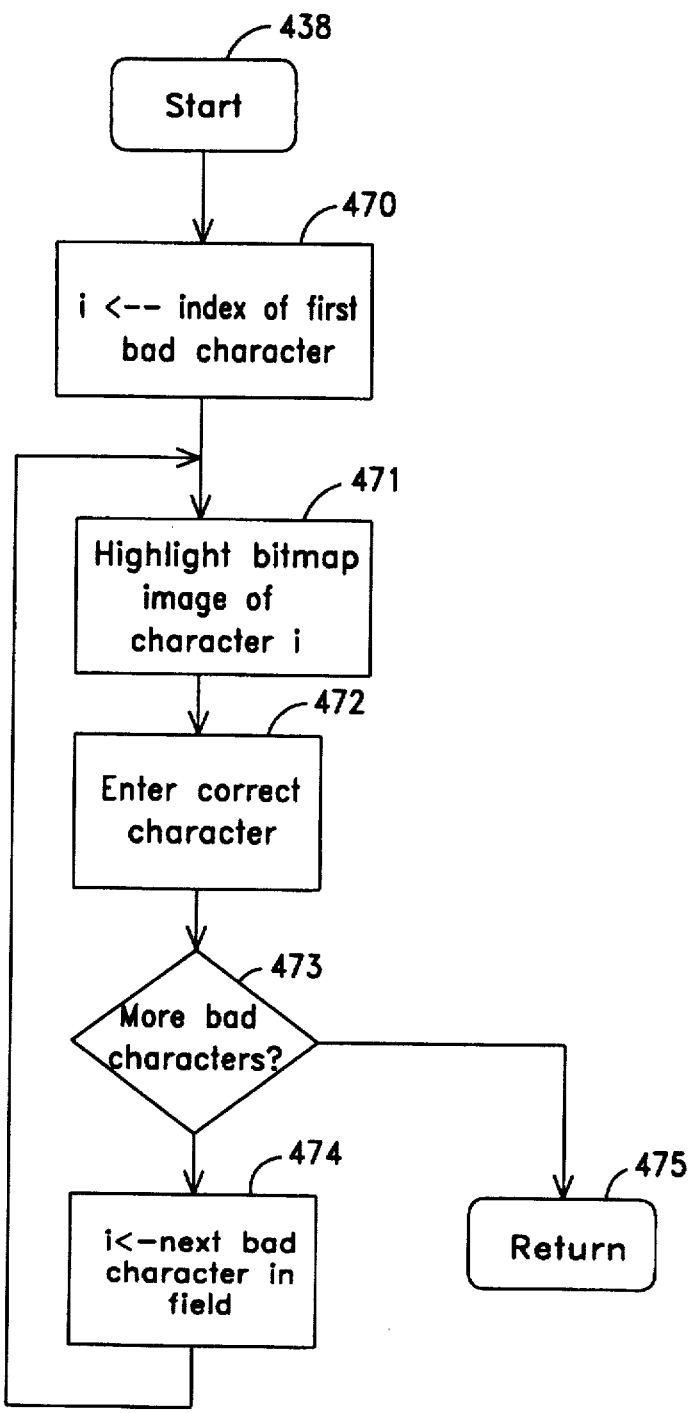
FIG. 30 is a flow diagram of the Correct Constrained Print Field function as shown in FIG. 29.

FIG. 30 illustrates the control flow for the Correct Constrained Print Field function 438 which is entered by the form interpreter at a start step and continues at step 470. At step 470, the temporary variable i is set to the index of the first invalid alphanumeric character. Recall that this index, along with the indexes of other invalid characters, was stored in the suspended results file S1 at step 692 in the interpret fax function of FIG. 19. Moving to step 471, the correction procedure highlights the ith character in the bit-mapped form image S2. The bit-map coordinates are stored in the suspended results file S1 for each object. The user now types in the correct character at step 471 and the results file S1 is examined for more invalid characters at step 473. If more invalid characters exist, the new character index is stored in i, and the control flow loops back to step 471. Otherwise, the correct constrained print field function 438 terminates at step 475.

Figure 31:
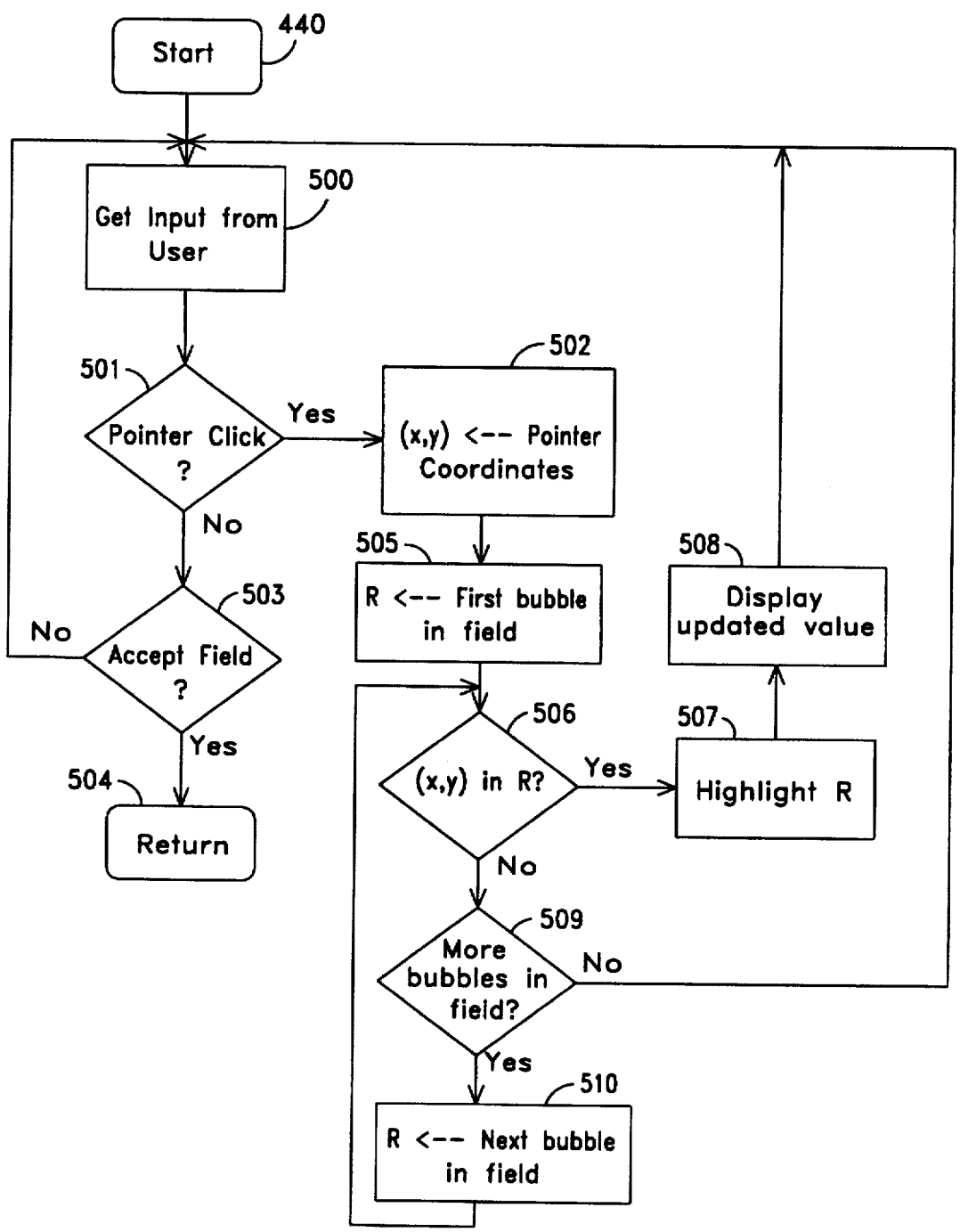
FIG. 31 is a flow diagram of the Correct Entry Field function as shown in FIG. 29.

Referring now to FIG. 31, the correction procedure enters the Correct Entry Field function 440 (entered from the suspended faxes function as shown in FIG. 29) to correct an invalid or ambiguous "fill-in" box) at a start state and proceeds to step 500 to get a user event from the event queue. Proceeding to decision step 501, if the event is a pointer click, the correction procedure moves to step 502 to set local Cartesian coordinates variable (x,y) to the pointer coordinates. Continuing to step 505, the rectangular region R of the first bubble is calculated from the rectangular coordinates RCT stored in the GOBJ structure, the number of bubbles and the vertical and horizontal separation between bubbles in the ENTRY_OBJ structure.

Then, at decision step 506, the correction procedure calculates whether the clicked location (x,y) is inside the first bubble region defined by R. If so, the bubble region R is highlighted, preferably by color, at step 507 and the updated value is provided to the user in a dialog box at step 508. From step 508, control loops back to step 500 to obtain another user event.

Shifting the discussion back to decision step 506, if the clicked location (x,y) is not in R, the correction procedure continues to decision step 509 to test whether there are more bubbles in the field. If there are no more bubbles, control loops to step 500, otherwise the next bubble field region R is calculated as previously discussed and the test, at step 506, is made as to whether the clicked location is in the next bubble region R.

Assuming that a correction has been made, the next user event is to click on a screen button, thus causing the correction procedure to fall through decision step 501 and accept the value by pressing the "enter" key or select the "next" button (step 503).

Figure 32:
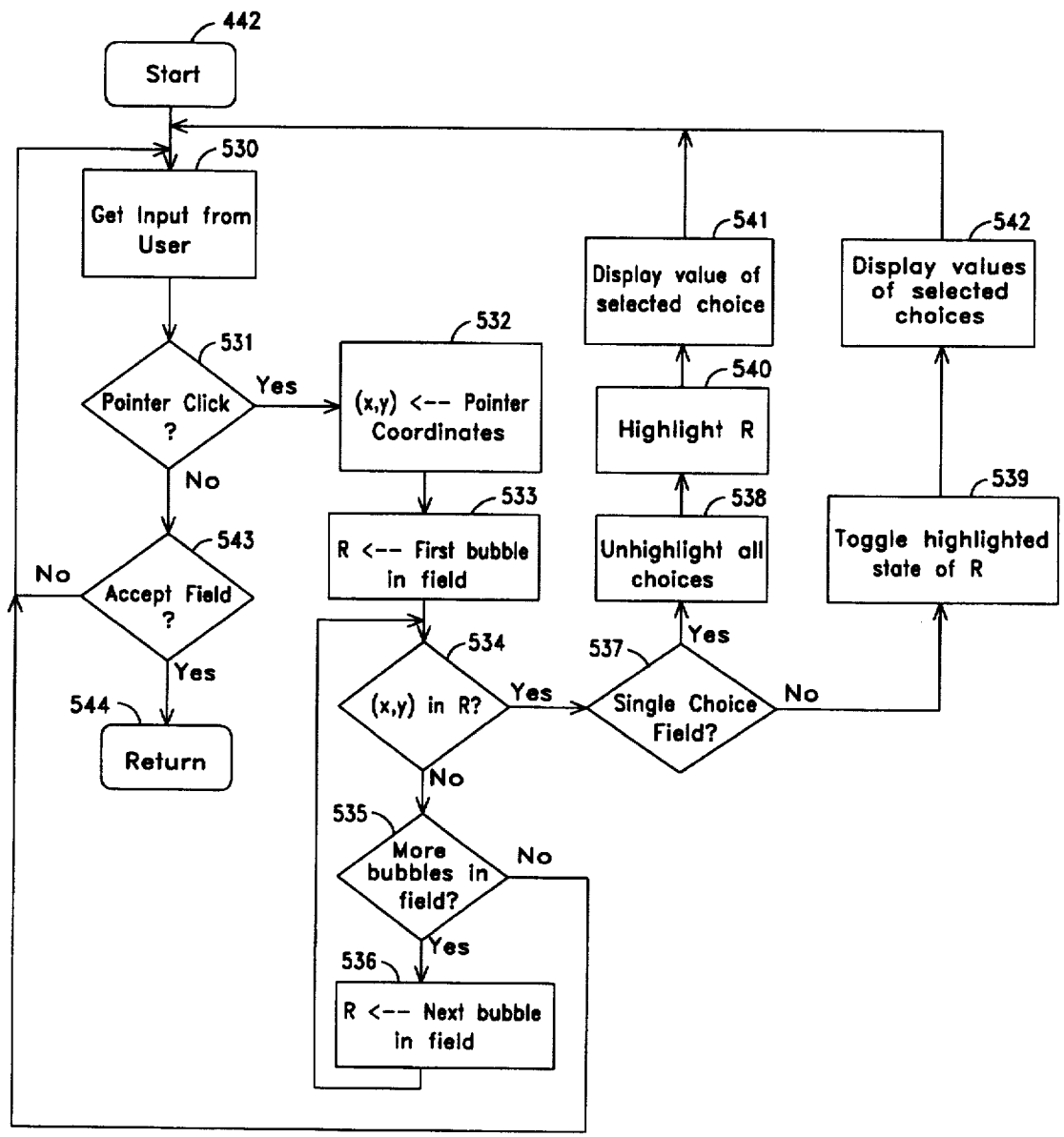
FIG. 32 is a flow diagram of the Correct Choice Field function as shown in FIG. 29.

The control flow for the Correct Choice Field function 442 is illustrated in FIG. 32 and is initiated by the suspended faxes function 115 of FIG. 29. The function is entered if an ambiguous or invalid choice, e.g., a choice between payment by Visa, Mastercard or American Express, (see FIG. 2b), is marked on the subject suspended form. Many steps of the correct choice field function 442, namely, steps 530–536, 543 and 544 closely parallel similar steps already discussed with respect to the correct entry field function of FIG. 31 and, so, shall not be discussed here.

With specific regard to the principal difference in flow between FIGS. 31 and 32, in FIG. 32 the correction procedure, upon a positive test result (at step 534) that the clicked location is in a bubble region, moves to decision step 537 to query whether the field is single or multiple choice as indicated in the TYPE portion of the CHOICE_OBJ structure. If only a single choice is allowed, as in the method of payment example, all current markings are unhighlighted, i.e., preferably a contrasting color is changed to the present background color, at step 538, and the selected bubble region R is highlighted (step 540). Then, at step 541, the value of the selected choice is presented to the user in a dialog box, e.g., American Express.

On the hand, if the field has been defined as multiple choice as indicated at step 537, such as marking all computer products used by a computer trade show applicant, the highlighted state of the bubble region R is toggled at step 539. The correction procedure then proceeds to step 542 to display the values of the new set of selected choices. In the example, a marked choice for Database Management could be questionable, although the Work Stations choice may be fine. Thus, after unhighlighting Database Management, only Work Stations would be presented to the user. From either of the display steps 541 or 542, the control loops back to step 530 to continue, and the function 442 is eventually exited at step 544.

Figure 33:
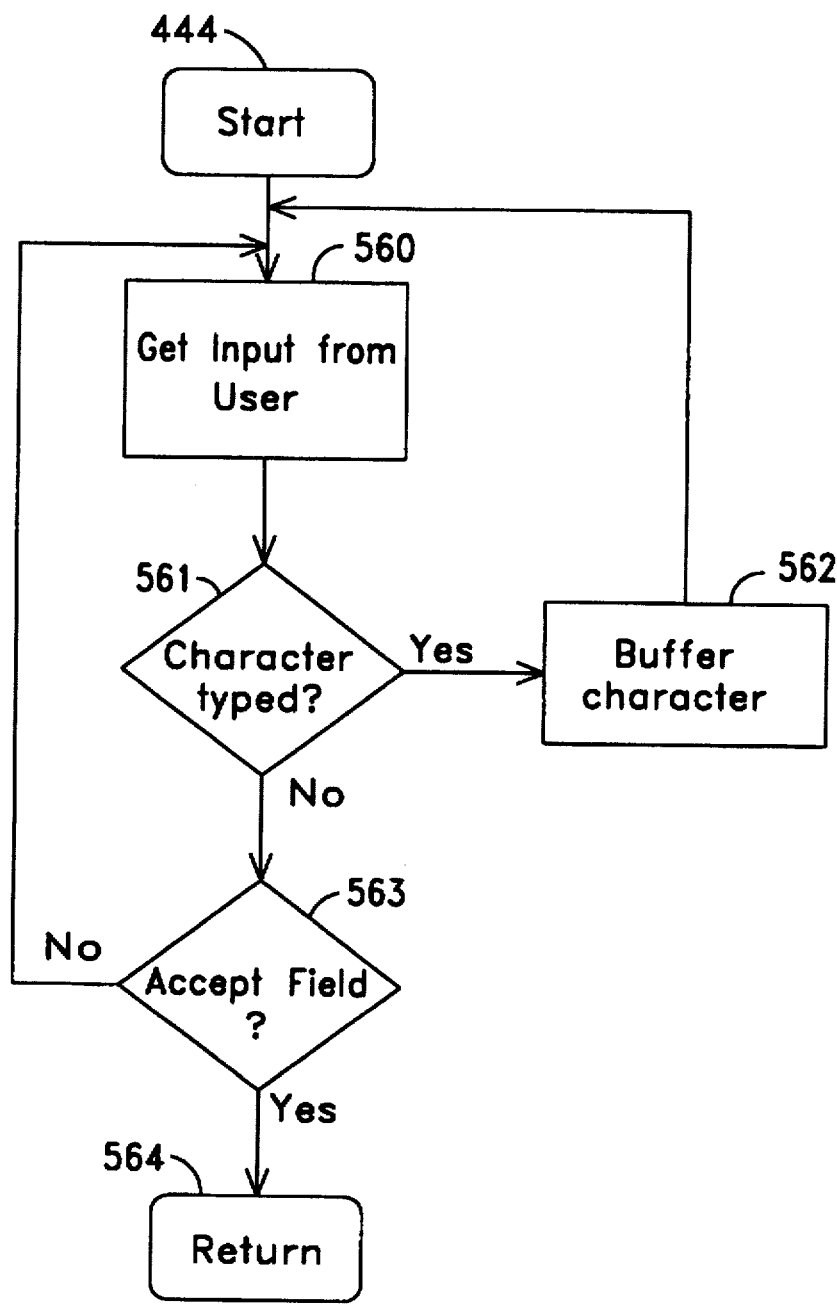
FIG. 33 is a flow diagram of the Correct Image Zone function as shown in FIG. 29.

FIG. 33 is a flow diagram showing the control flow for the Correct Image Zone function 444 which is entered from the suspended faxes function of FIG. 29. If the image zone was defined to be an alphanumeric character type, for instance, typewritten information that will be recognized by OCR techniques, and there was an error in interpretation, then the user may attempt to correct the error in this function. From the start state, the correction procedure moves to step 560 to get a user event from the event queue. At state 561, if the user typed a character so as to correct a letter or number the character is temporarily stored to build up a character string and control loops to step 560 to get another user event. Assuming no character was typed, the correction procedure falls through the test at 561 and moves to decision step 563. Here, if the user has clicked on a screen save button, the modified character string is stored in the DOCument structure to be later saved in the results file R1, or the change is canceled and, in either event, the function 444 is terminated at step 564.

Figure 34:
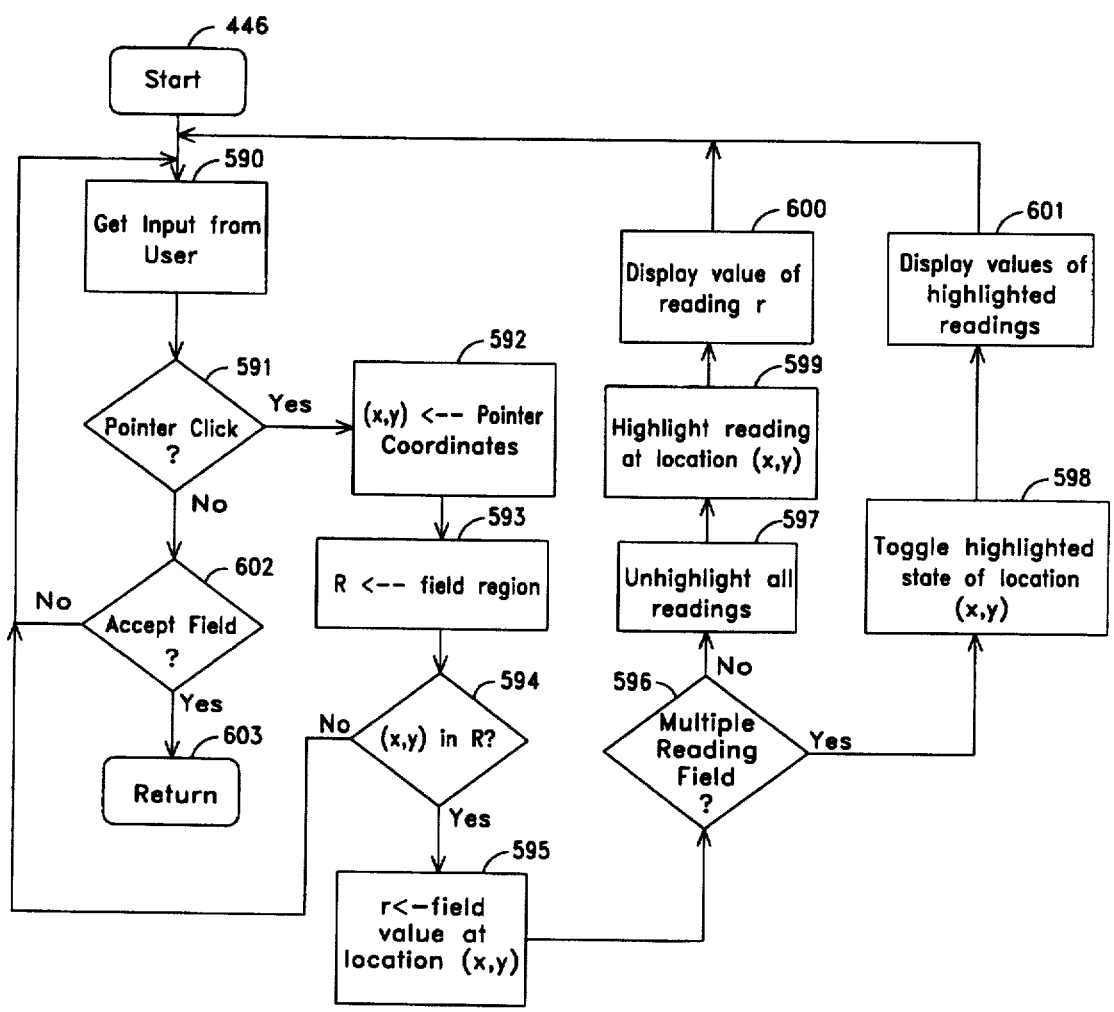
FIG. 34 is a flow diagram of the Correct Analog Field function as shown in FIG. 29.

FIG. 34 illustrates the control flow for the function to Correct Analog Field 446 (FIG. 29) which is entered at the start step 446. Proceeding to step 590, the correction procedure (FIG. 1) reads the next event in the event queue. At the decision step 591 the event is tested for whether the event corresponds to a mouse click. If the test is successful, the correction procedure saves the location, or Cartesian coordinates, of the pointer position where the click occurred in a temporary variable denoted (x,y) (step 592).

Moving to step 593, the form interpreter saves the "field region" in a variable denoted R. The field region is obtained from the results file S1 where it is saved along with the form image S2, and the field region represents the rectangle (stored as the Cartesian coordinates of two corner points) surrounding the field in the form image S2 where an error occurred. At the next step, step 594, the correction procedure queries whether the click location (x,y) is inside the field region R. (Note that if the form image S2 contains more than one error, the user may select another field in the suspended fax function shown in FIG. 29.) If the user did not click inside of the selected field region having an error, control returns to step 590 to get another user event.

Assuming that the user did click on an invalid field region at step 594, the correction procedure transitions to step 595. At this step, the forms interpreter 36 calculates the field value at the clicked location (x,y). The field value is calculated, and saved as r, from the store low and store_high values in the ANALOG_OBJ data structure. These values represent the extreme values on the analog scale. For instance, if the representation is a horizontal thermometer from 0 to 100 degrees Celsius, the store_low value is 0 and the store_high value is 100. However, the click location will be a location on the scale from which a proportional value needs to be calculated. In the example, if the user has clicked half_way on the scale, the value r will be set to 50 degrees.

Continuing from step 595 to decision step 596, the correction procedure tests whether multiple analog readings, e.g., two temperatures on the thermometer, are allowed in the subject field. If multiple analog readings are not allowed, the correction procedure moves to step 597 to unhighlight all readings (or markings) on the meter. As an example, a stray marking at 35 degrees and a valid marking at 50 degrees may have their colors changed to be the same as the background color. Subsequently, at step 599, a marking at the user specified location (x,y) is highlighted. Lastly, the correction procedure displays the field value, r, in a dialog box on the video display of the computer 42, and returns to step 590 to get another user event.

In the alternative at decision state 596, where it is determined that multiple analog readings are permitted, the correction procedure moves to step 598 to toggle the highlighted state at the clicked location (x,y). In other words, if a marking is already highlighted, e.g., red marking on a blue background, the marking is unhighlighted, or removed, and, if the location does not have a marking, the clicked location is highlighted so as to create a marking. Then, at step 601, the correction procedure displays all of the readings, which are now highlighted, in the dialog box and continues to step 590 to pursue another user request.

Assuming that an invalid marking has been corrected, the correction procedure accepts the next user input event which will likely be a button click to save or cancel the changes. Therefore, the test at state 591 is not satisfied and decision state 602 is entered to test whether the field changes should be accepted. The changes are temporarily saved in the memory of the computer 42 in the DOCument structure which is provided hereinabove (they are later saved in the results file 38, FIG. 1).

Automatic Export

Figure 35:
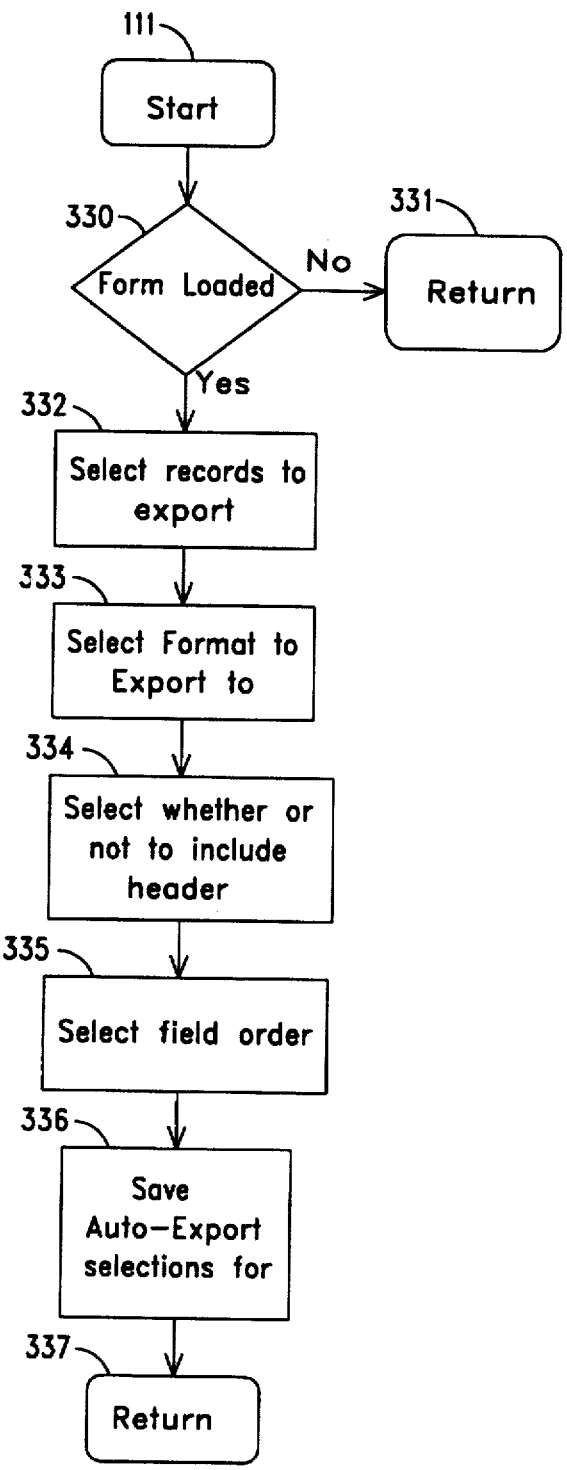
FIG. 35 is a flow diagram of the Auto Export Setup function as shown in FIG. 4.

Referring to FIG. 35, the Auto Export Setup function 111 will now be described. The function begins at step 811, as shown in FIG. 4, and moves to a decision step 330 wherein a check is made to determine if a form is loaded. An open form is necessary to continue in this function. If a form is not loaded at step 330, the function 111 exits at step 331 and returns to FIG. 4. Otherwise, the function proceeds to step 332 where the records to be exported are selected from a list, followed by step 333 where the format of the export is selected, e.g., Data Interchange Format, Comma Separated Values or Delimited Values. Next, at step 34 a selection is made as to whether or not the header information, such as the names of the fields, is to be included. Step 335 allows the user to select the order in which the fields will appear. Although shown in a particular order, steps 332, 333, 334 and 335 can be done in whatever order the user desires. After the completion of steps 332–335, step 336 saves the autoexport selections for reference in the THRU_ATTR structure and then the function exits at step 337 and returns to FIG. 4.

Figure 36:
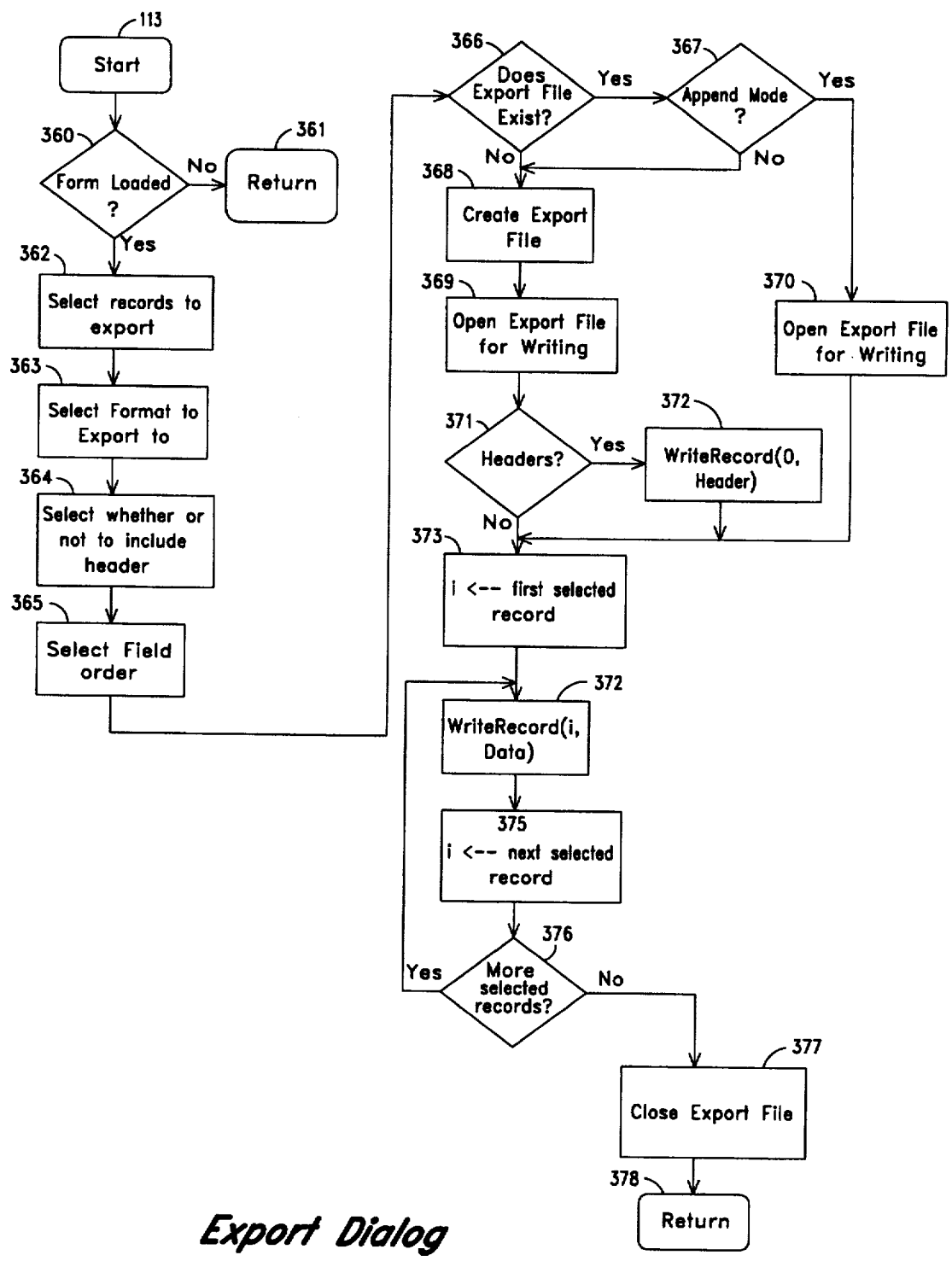
FIG. 36 is a flow diagram of the Export Dialog function as shown in FIG. 4.

Referring to FIG. 36, the Export Dialog function 113 will now be described. The function begins at step 113, as shown in FIG. 4, and moves to a step 360 wherein a check is made to determine if the form is loaded. If the form is not loaded, the function exits at step 361 and returns to FIG. 4. Otherwise, the function proceeds to step 362 where the records to be exported are selected from a list, followed by step 363 where the format of the export is selected, e.g., Data Interchange Format, Comma Separated Values or Delimited Values. Next, at step 364 a selection is made as to whether or not the header information, such as the names of the fields, is to be included. Step 365 allows the user to select the order in which the fields will appear. Although shown in a particular order, steps 362, 363, 364 and 365 can be done in whatever order the user desires. After the completion of steps 362-365, decision step 366 determines if an export file exists. Steps 367 through 378 are as shown in FIG. 36.

Figure 37:
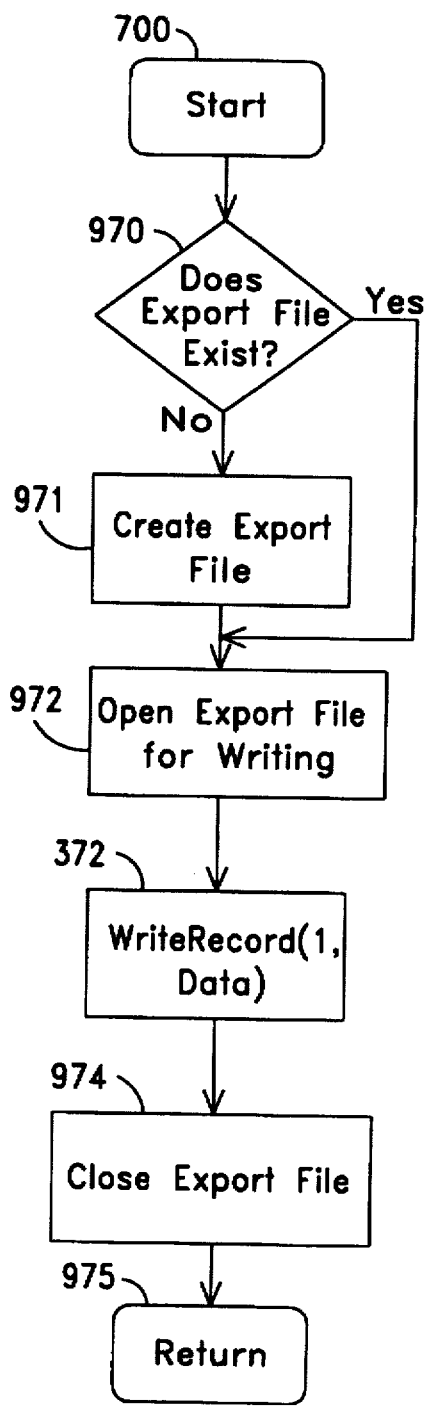
FIG. 37 is a flow diagram of the Auto Export function as shown in FIG. 19.

Referring to FIG. 37, the Auto Export function 700 will now be described. The function begins at step 700, as shown in FIG. 19b, and moves to a decision step 970 wherein a check is done to determine if the export file exists. If the export file exists, the function moves to step 972, or if the export file does not exist, at step 971 the export file is created and then the function proceeds to step 972. At step 972 the export file is opened for writing and at step 973 the function WriteRecord is called. The parameters in the call for WriteRecord denote that record 1, which is a data record, is to be written. Upon return from the function WriteRecord, step 974 closes the export file, and then the function 700 exits at step 975 and returns to FIG. 19b.

Figure 38:
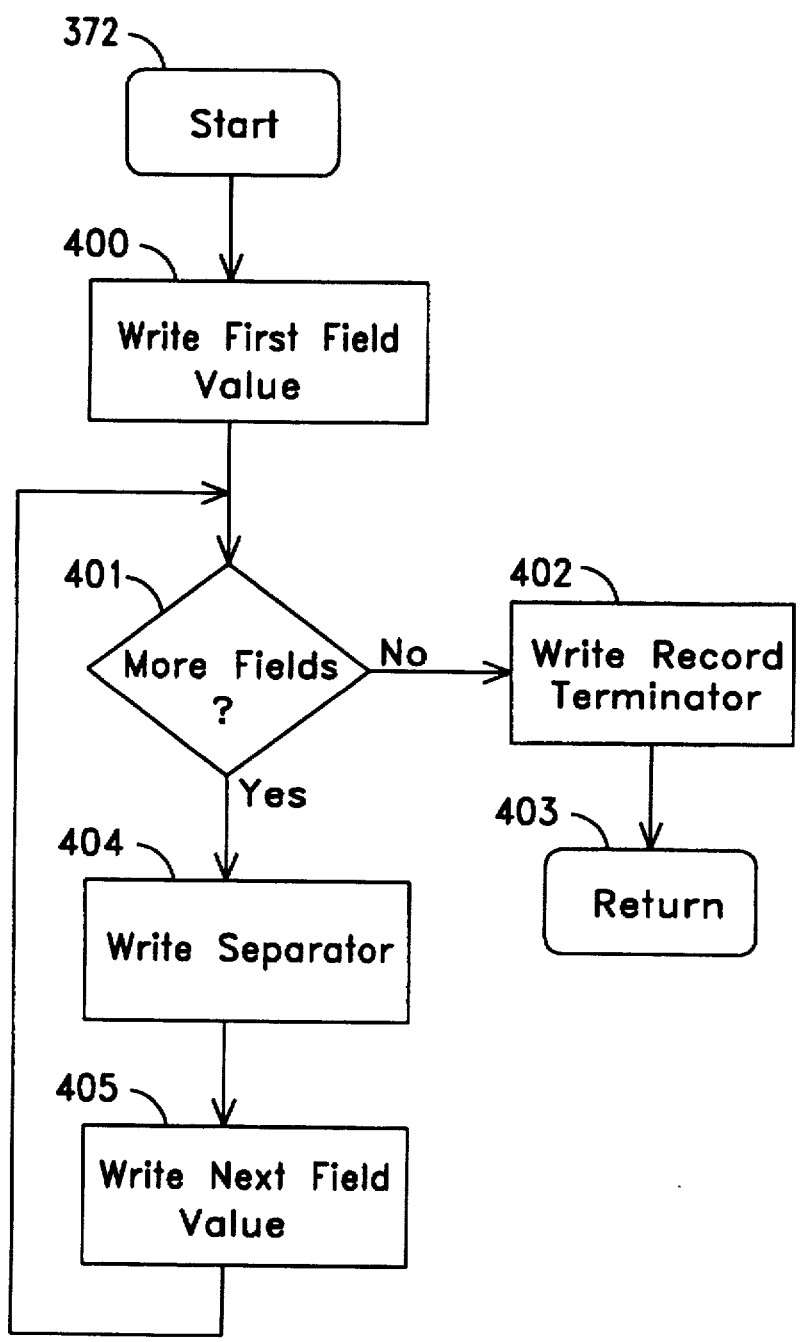
FIG. 38 is a flow diagram of the Write Record function shown in FIG. 37.

Referring to FIG. 38, the WriteRecord function 372 will now be described. The function begins at step 372, as shown in FIGS. 36 and 37, and moves to a step 400 wherein the first field value is written to the export file. Moving to a decision step 401, a check is made to determine if more fields need to be written. If no more fields are to be written, the function proceeds to step 402 wherein the record terminator is written and the function 372 exits at step 403 and returns to the calling function. If more fields are to be written as determined at step 401, the function moves to step 404 where a field separator is written, followed by step 405 where the next field value is written. The function then loops from step 405 back to decision step 401 to test if more fields are to be written.

Automatic Confirmation

A system is now described wherein the person who fills out a form and faxes in the information to the form interpreter 36 can also immediately receive confirmation. The example is that of placing an order for books. The form shown in FIG. 39 is the original form filled out by the buyer. This form is then faxed to the forms system at location 10 (FIG. 1). The form interpreter 36 processes the form and sends the information on to a Visual Basic Application via DDE. When the data arrives, the following functions are performed:

```
The following variables are set by the DDE event:
BuyName          Name of person buying the books
BuyFaxNumber     Fax number of person buying the books
BuyShipTo        Name of file that contains a bitmap
                 image of the name and address of the
                 person to ship the books to.
BuyBookItem      Item number of the book being ordered.
BuyBookPrice     Unit price of the book being ordered.
BuyQty           Quantity of books ordered
BuyOrderTotal    Extended Price (Unit Price * Quantity)
BuyCardType      Type of credit card buyer is using
BuyCardNumber    Credit card number buyer is using
BuyExpireData    Expiration date of credit card
     Verify the price of the book and the total on the
     order.
     WrongTotal= FALSE
     If RefBookPrice [BuyBookItem]! = BuyBookPrice
     Begin
     WrongTotal = TRUE
     BuyBookPrice = RefBookPrice [BuyBookItem]
     End
     RefOrderTotal = BuyBookPrice*BuyQty
     if RefOrderTotal!= BuyOrderTotal
     Begin
     WrongTotal = TRUE
     BuyOrderTotal = RefOrderTotal
     End
2.   Initiate call to verify credit card number and wait
     for response.
     CreditVerify = FALSE
     If VerifyCreditCard (BuyCardType, BuyCard Number,
     BuyExpireDate, BuyOrderTotal)
     Begin
     CreditVerify = TRUE
     End
3.   If sufficient inventory, Post the order and
```

-continued

```
     prepare to notify the buyer that the book will
     arrive in approximately one week. If not
     sufficient inventory, Post a backorder and prepare
     to notify the buyer that the book will arrive in
     approximately two weeks.
     If CreditVerify = TRUE
     Begin
     RefBookInv [BuyBookItem]
     RefBookInv[BuyBookItem] - BuyQty BookAvail
     TRUE
     If RefBookInv[BuyBookItem] < 0
     Begin
     BookAvail = FAISE
     End
     End
4.   Write the following information in a file for
     TeleForm to read (including status of credit card
     and time till book received).
     WriteToFile
     (BuyName, BuyFaxNumber, BuyShipto,
     BuyCardType, BuyCardNumber,
     BuyCardExpire, BuyBookItem,
     RefBookTitle[BuyBookItem], BuyQty,
     BuyBookPrice, BuyOrderTotal,
     CreditVerify, WrongTotal,
     BookAvail)
The form interpreter 36 will then read this information from
the file and fill out the return form shown in FIG. 40.
The form is then sent to the buyer and is the confirmation or
denial of his order. For the example given, the data file
written to by 'WriteToFile'contains the following
information:
BuyName, BuyFaxNumber, BuyShipto, BuyCardType,
BuyCardNumber, BuyCardExpire, BuyBookItem, BuyBookName,
BuyQty, BuyBookPrice, BuyORderTotal, TextAccept,
TextTurnaround, TextChange
JOHN DOE, 123 456-7890, SHIP PCX, VISA,
0000123456789012, 12/92, 23, SOFTWARE DEVELOPMENT, 2,
43.95, 87.90, Your order has been accepted, Shipping via
UPS Ground. You should receive your books in one week.
Note Price Change.
```

Conversion of Screen Definitions

Many applications allow the collection of information on a computer terminal or workstation. There is usually a definition for the form that appears on the screen expressed in some language or format that can be stored in a file. A counterpart to this screen form can be produced that is a form used by the forms system of the present invention. This paper form will correspond field for field to the screen form so that the meaning of each field is the same but the locations of the fields may be somewhat different because of differing space constrains between the two environments. For instance, more space will be required on paper to enter a hand-printed number than was required on the screen to type in a number. The enlarged field then may displace other fields, yet each field will be named so that the location is not particularly important.

Figure 48:
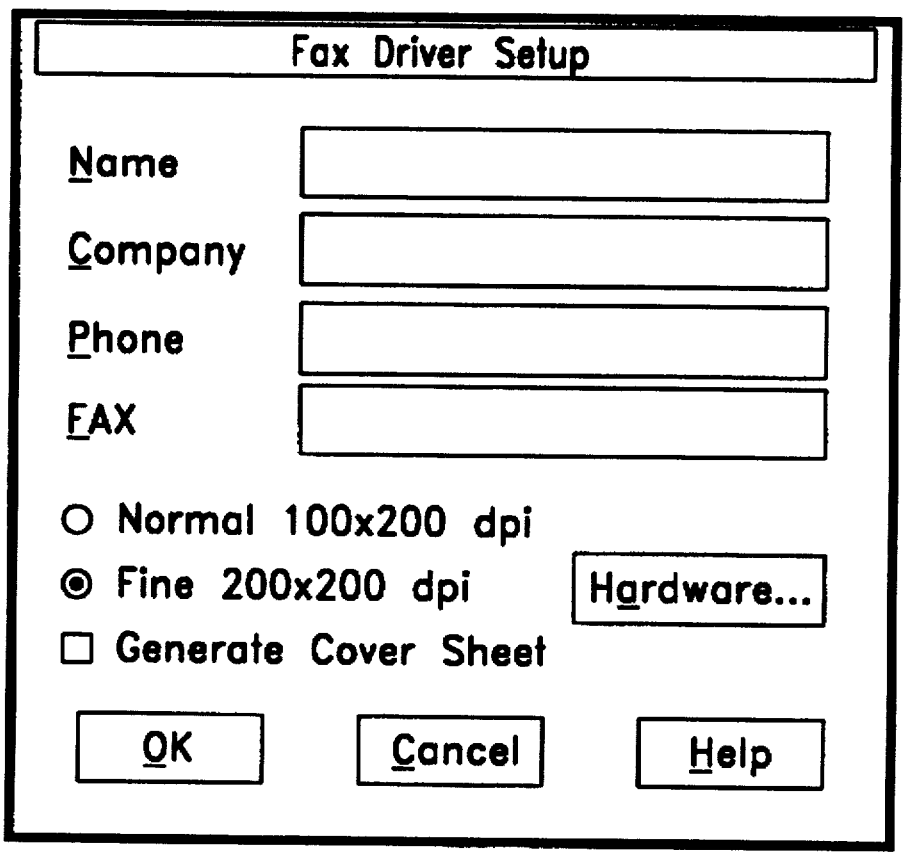
FIG. 48 is a sample screen which is input to the Screen Conversion module of FIG. 42.

Herein follows the above-mentioned process for the sample screen display shown in FIG. 48. The screen has four fields where names and phone numbers can be entered as well as choice fields for selecting parameters. The definition for the Fax Driver Setup screen is given as follows:

| | | | |
|---|---|---|---|
| DIALOG | SETUP_MORE_DLG, Setup"MODAL | 16, 36, 144, 128, | "Fax Driver |
| BUTTON | DLG_OK, | 6, 108, 32, 12 | "OK" |
| BUTTON | DW_CANCEL, | 56, 108, 32, 12 | "Cancel" |
| BUTTON | SUM_HELP, | 104, 108, 32, 12, | "Help" |
| TEXT | SUM_NAME_TX, | 6, 10, 32, 8 | "Name" |
| EDIT | SUM_NAME, | 46, 8, 90, 12 | "" |
| TEXT | SUM_COMP_Tx, | 6, 24, 32, 8 | "Company |
| EDIT | SUM_COMP, | 46, 22, 90, 12 | "" |
| TEXT | SUM_PHONE_TX, | 6, 38, 32, 8 | "Phone" |
| EDIT | SUM_PHONE | 46, 36, 90, 12 | "" |
| TEXT | SUM_FAX_TX | 6, 52, 32, 8 | "FAX" |
| EDIT | SUM_FAX | 46, 50, 90, 12 | "" |
| RADIOBUTTON | SUM-_FINE | 6, 80, 76, 8 | "Fine 200x200 dpi begin |
| RADIOBUTTON | SUM_NORMAL | 6, 70, 76, 8 | "Normal 100 x200 dpi" end |
| BUTTON | SUM_HARDWARE | 92, 80, 44, 12 | "Hardware..." |
| CHECKBOX | SUM_COVER, | 6, 92, 84, 10 | "Generate Cover Sheet" |

Figure 49:
FIG. 49 is a sample form which is output by the Screen Conversion module of FIG. 42, and which corresponds to the sample screen of FIG. 48.

The resulting form generated by the process given in FIGS. 42 to 47 is shown in FIG. 49.

Figure 42:
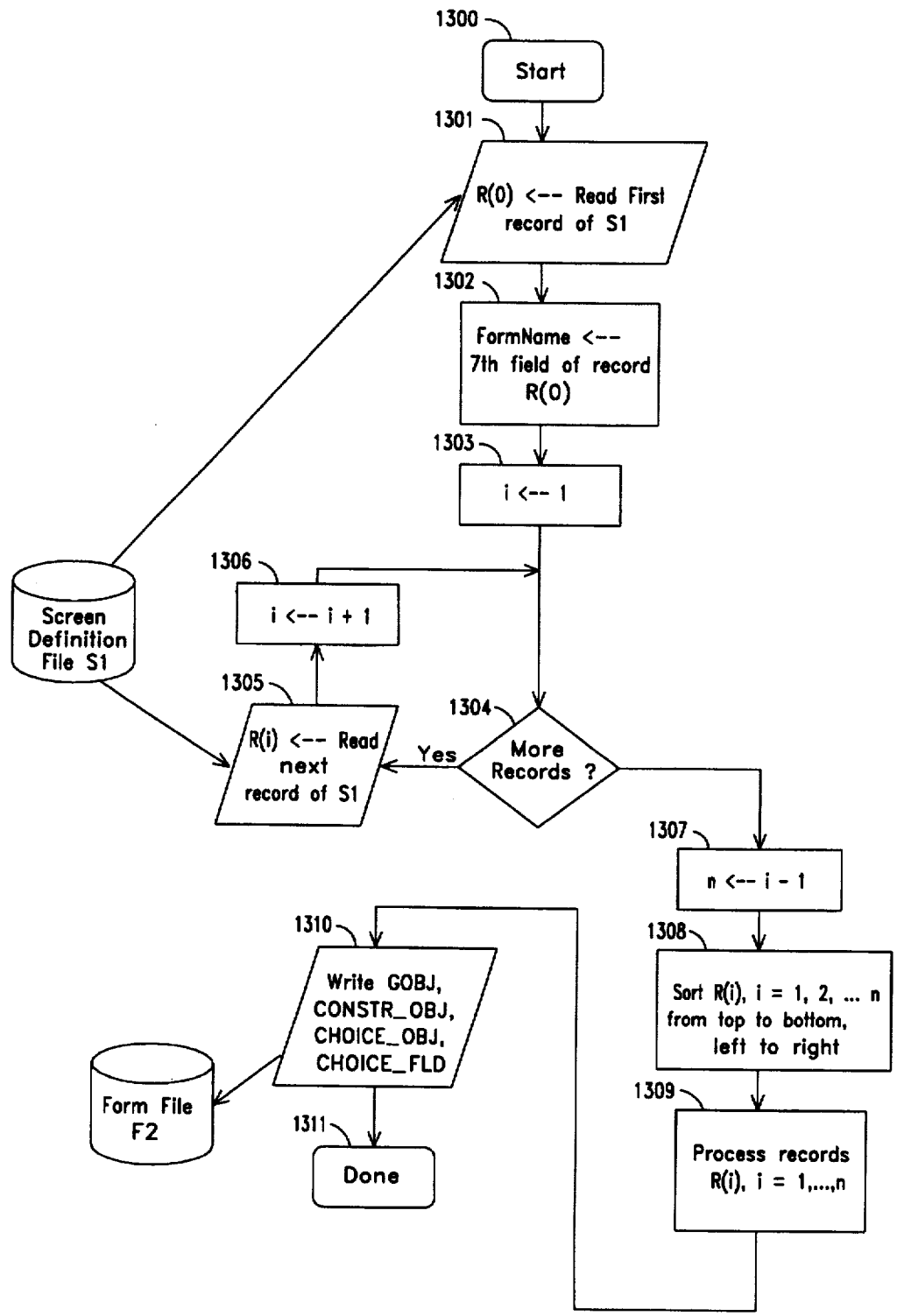
FIG. 42 is the Screen Conversion module in accordance with the present invention.

The Screen Conversion module 1300 is more fully understood by reference to FIG. 42. In particular, the function 1300 converts a screen definition file S1, written in the Extensible Virtual Toolkit (XVT) format (similar to the Windows Software Development Kit format), to a form file F2 suitable to be faxed and interpreted, according to the present invention. However, it will be understood that many other screen definitions could be translated by the present invention including definitions such as those followed by the Delrena PerformPro and the Borland Paradox programs. Furthermore, although presently conceived as a program independent of the Form Creation and Form Interpretation modules 14, 36, the converted forms output by the screen conversion function 1300 may be transmitted, received and interpreted by the Form Interpretation module 36 as indicated by form file F2.

Moving from the start step to step 1301, the screen converter 1300 reads the first record of a user selected screen definition file S1 and stores the record in R(0), the first element of a record array. Continuing to step 1301, the FormName, or filename for the form, is assigned the text of the dialog box, in the example, "Fax Driver Setup". Then, in a loop defined by steps 1303–1306, the remaining records of the file S1 are read and stored in the record structure R(i), wherein i is incremented for each subsequent record. Next, at step 1307, the screen converter 1300 sets a temporary variable n to equal the total number of records in the screen definition file S1.

The record array R is sorted at step 1308 according to the locations of objects that will be placed on the form, from top to bottom and left to right using the Cartesian coordinates (third and fourth element) for each record. After sorting, each record is processed by the process records function 1309, wherein the actual conversion takes place, which will be described more fully with respect to FIG. 43. After conversion of a screen definition record into a form object, i.e., OBJ data structure, each OBJ structure forming a portion of the form template is written out to the form file F2, and then the screen converter 1300 terminates at step 1311.

Figure 43:
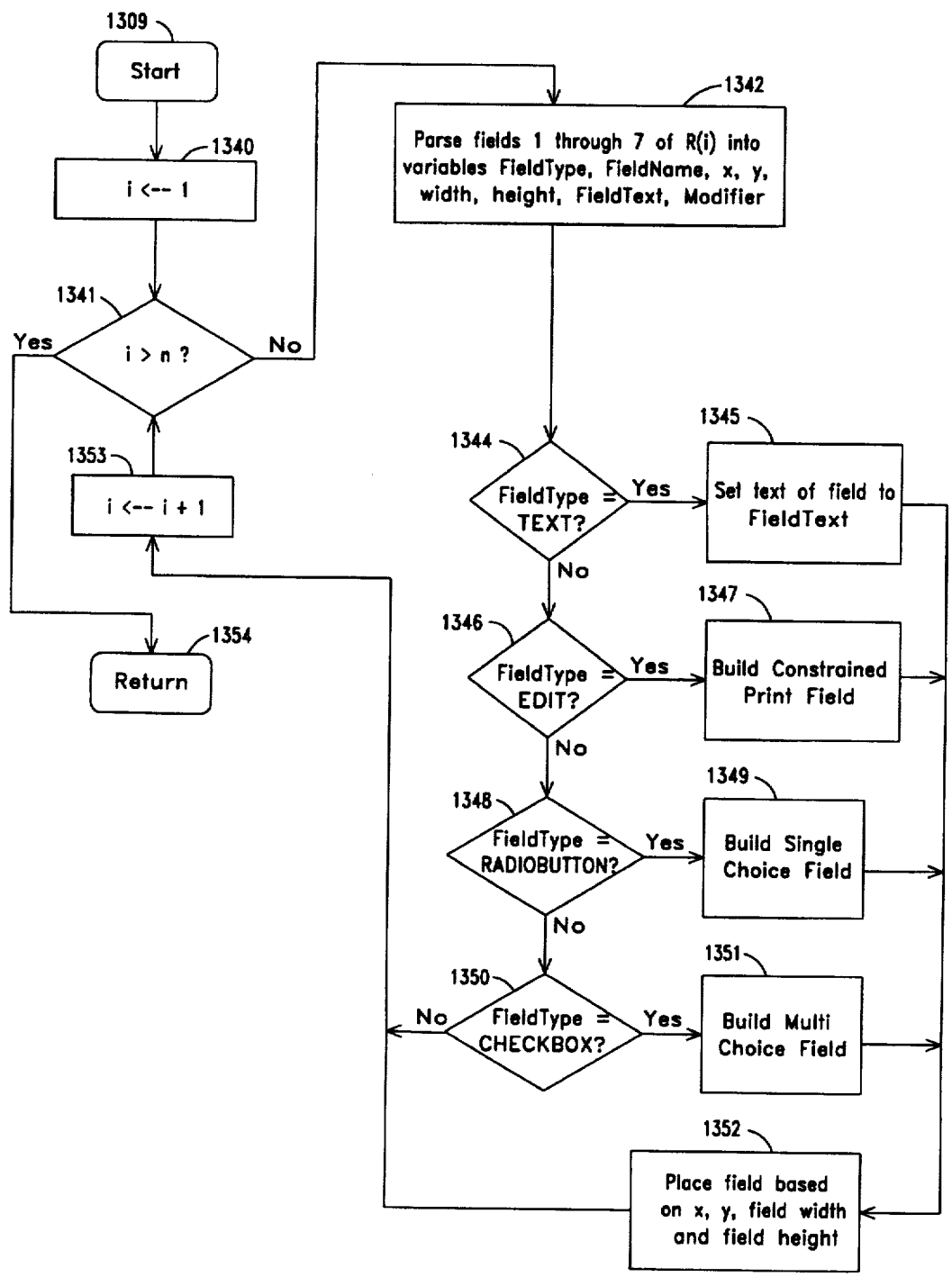
FIG. 43 is the Process Records function as shown in FIG. 42.

FIG. 43 illustrates the steps of the Process Records function 1309. From the start state, the screen converter 1300 moves to step 1340 to initialize the temporary variable i to equal 1. If further screen definition records need to be handled, as indicated by a negative test for i> n at step 1341, control flow proceeds to step 1342 to parse fields, or items, of the currently indexed (ith) record of the record array R. For example, the first record corresponding to an object (the dialog record at R(0) is not an object) is parsed as follows: FieldType=BUTTON; FieldName=DLG_OK; x=6; y= 108; width=32; height=12; FieldText="OK"; and Modifier= None.

Proceeding to decision step 1344, if the FieldType in the record R(i) is TEXT, e.g., the sixth record, R(5), the field text is set to the text string in FieldText, e.g., "Name" at step 1345. Otherwise, from step 1344, a decision step 1346 tests whether the FieldType of R(i) is EDIT and, if so, moves to the build constrained print field function 1347 (to be further described below). Otherwise, from step 1346, a decision step 1348 tests whether the FieldType is RADIOBUTTON and, if so, moves to the build single choice field function 1349 (to be further discussed below). Otherwise, from step 1348, a decision step 1350 tests whether the FieldType is CHECKBOX and, if so, moves to the build multiple choice field function 1351 (to be further discussed below). If the test fails at step 1350, e.g., the FieldType is a BUTTON, then the field is unrecognized and the record array index variable i is incremented at step 1353 so that the next record can be parsed. Alternatively, from either of the build functions 1347, 1349 or 1351, or the set text step 1345, the field is placed on the form via the function 1352 (to be further discussed below). Once all records are processed as decided at the decision step 1341, the function terminates at step 1354.

Figure 44:
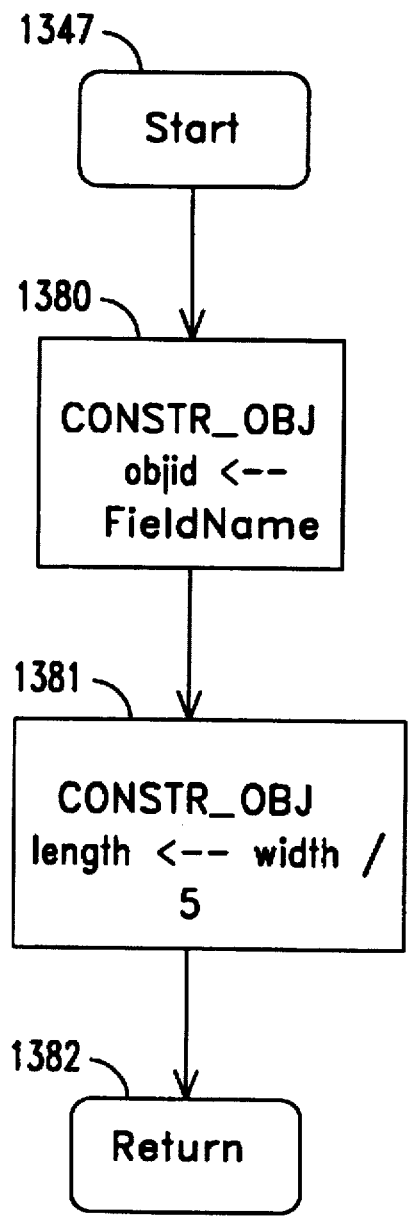
FIG. 44 is the Build Constrained Print Field function as shown in FIG. 43.

The steps of the Build Constrained Print Field function 1347 are illustrated in FIG. 44. From the start state, the screen converter 1300 moves to step 1380 to assign the object ID (CONSTR_OBJ.objid) to be the FieldName item in the screen definition R(i) record, e.g., SUM_NAME in R(5). Then, at step 1381, the length of the constrained print field (CONSTR_OBJ.length) is set to the width item of the record divided by the number of pixels per character which is predefined as 5, e.g., 90/5=18. Lastly, the function 1347 terminates at step 1382.

Figure 45:
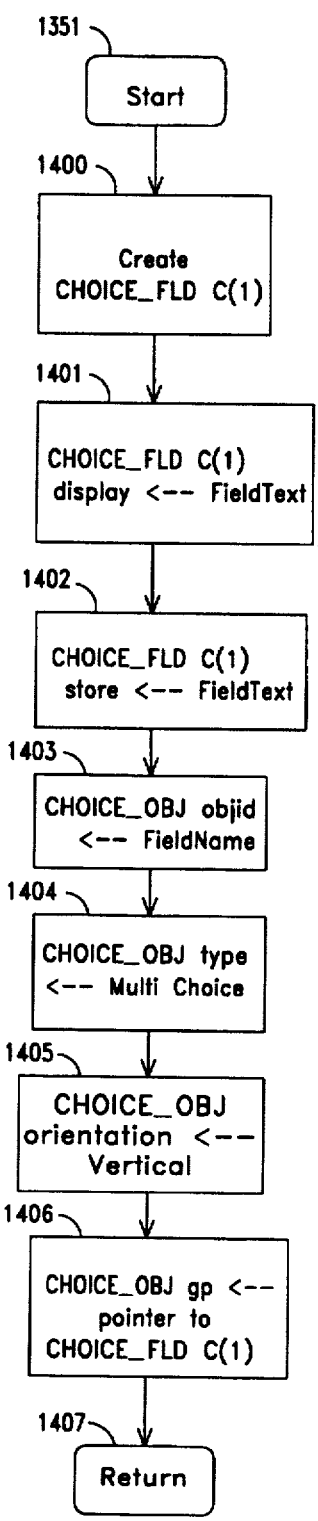
FIG. 45 is the Build Multiple Choice Field function as shown in FIG. 43.

The control flow for the Build Multiple Choice Field function 1351 is shown in FIG. 45. From the start state, the control moves to step 1400 to create a new CHOICE_FLD.C(1) data structure in memory. The items in CHOICE FLD and CHOICE OBJ are then assigned as indicated in steps 1401–1406, e.g., CHOICE_FLD.C(1).display and store="Generate Cover Sheet" for screen definition record R(15), and CHOICE_OBJ.objid=SUM_COVER, etc., and the function is exited at step 1407.

Figure 46:
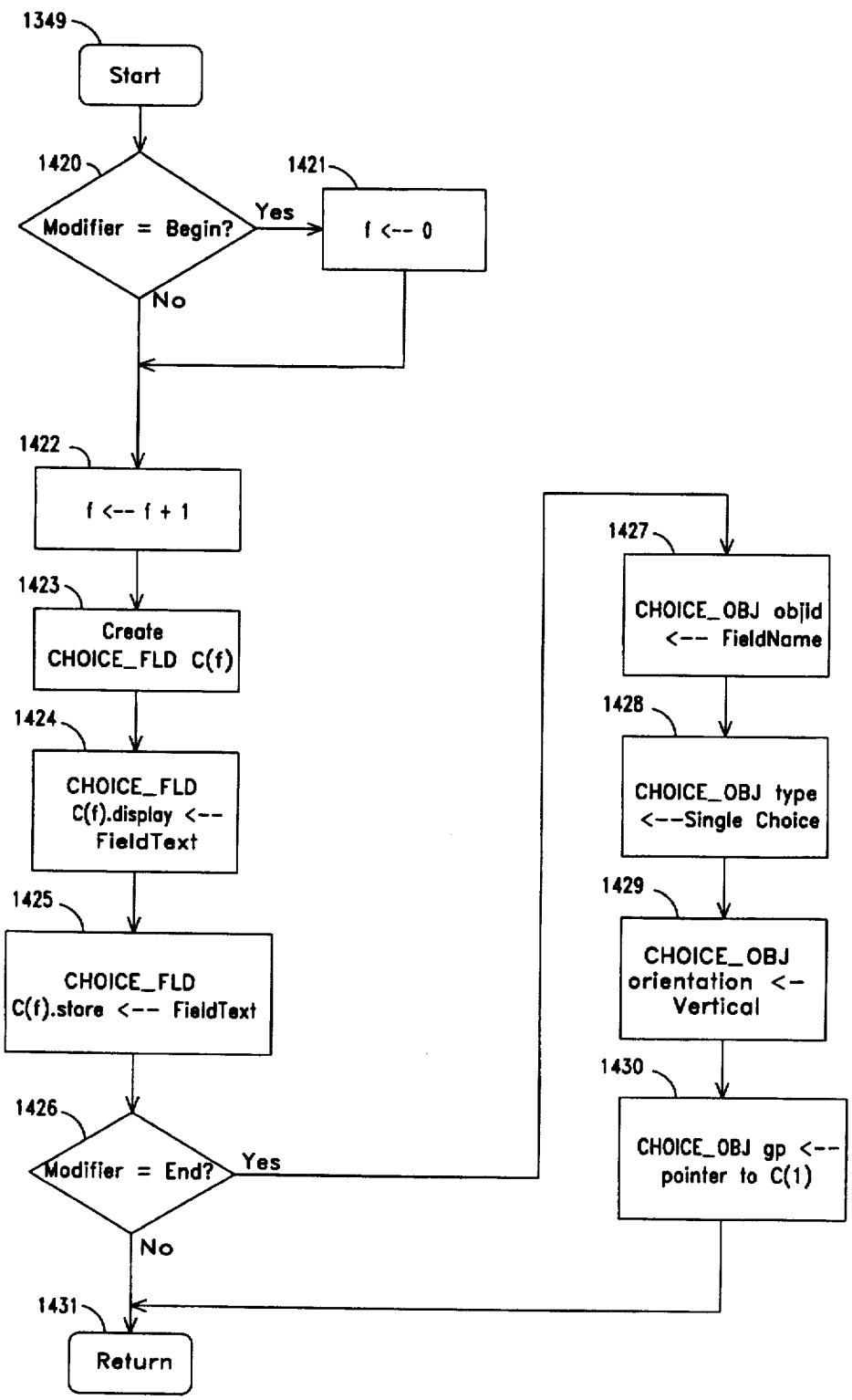
FIG. 46 is the Build Single Choice Field function as shown in FIG. 43.

FIG. 46 illustrates the steps of the Build Single Choice Field function 1349. The steps 1423–1425 and 1427–1430 of the Single Choice function 1349 are similar to the steps of the Multiple Choice function 1351 already discussed. Steps 1420–1422 and 1426 simply control the assignment of the multiple choices, e.g., CHOICE_FLD.C(1).display=FINE and CHOICE_FLD.C(2).display=NORMAL for the screen definition records R(12) and R(13), thus requiring two times through the function to complete the RADIOBUTTON records. The flow through the function 1349 also depends on the modifiers: BEGIN and END. The function 1349 ends at step 1432.

Figure 47:
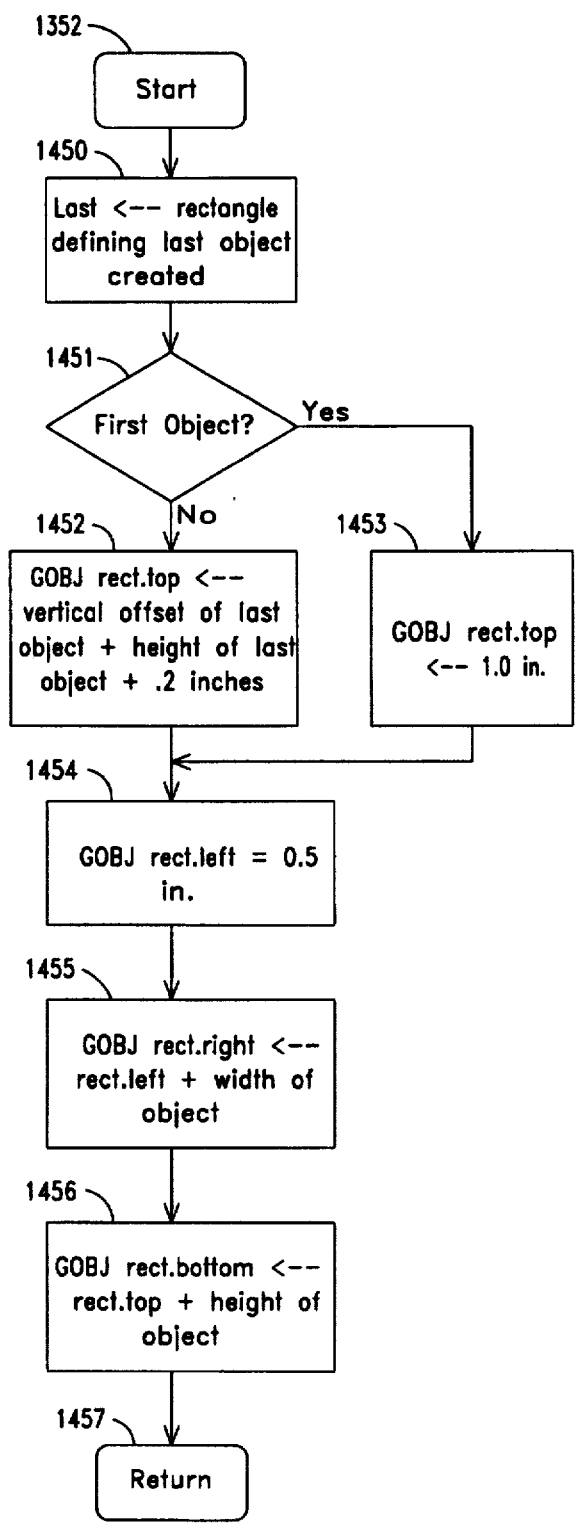
FIG. 47 is the Place Field function as shown in FIG. 43.

FIG. 47 illustrates the Place Field function 1352 of the screen converter 1300. Since the screen to be converted will not fit in a form using the coordinates specified in the screen definition file S1, the combination of sorting at step 1308 in FIG. 42 and the place field function 1352 translate the screen coordinates into the coordinate system of the form. The GOBJ offset dimensions for each side of the rectangular field region are specified by steps 1452–1456. If it is the first object being placed on the form, the rectangular top offset is 1.0 inch at step 1453 and, otherwise, the rectangular top offset is the vertical offset of the last object plus the height of the last object plus 0.2 inches. The function 1352 terminates at step 1457.

Summary

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. In a computer, a method of converting a screen definition file having a plurality of records with data fields for use in a fax form, said form including template information comprising a plurality of template fields, the method comprising the steps of:

reading one or more records in a screen definition file;

processing a selected record so that the fields are converted into a template field;

computer generating machine readable identification markings on the fax form, wherein the machine readable identification markings identify the fax form and the corresponding template information;

storing the template fields and machine readable identification markings in the computer;

receiving a completed fax form into the computer from a remote location;

automatically identifying the completed fax form, wherein the computer interprets the machine readable identification markings on the completed fax form;

locating in the computer the template information corresponding to the identified completed fax form; and selectively interpreting information entered on the completed fax form with the template information of the fax form stored in the computer.

2. The method of claim 1, wherein each of the template fields has a field type selected from one of the following field types: text field, constrained print field, single choice field, multi-choice field.

3. The method of claim 1, wherein the processing step includes the steps of:

parsing the data fields of each record;

building a template field corresponding to the record; and placing the template field in the fax form.

4. The method of claim 3, wherein the processing step further includes the step of translating coordinates of the screen definition file to coordinates of the fax form.

5. The method of claim 3, wherein the placing step includes the step of determining a top, bottom, left, and right coordinate pair for the template field.

6. The method of claim 1, wherein the machine readable identification markings comprise a user identification and a form identification.

7. The method of claim 1 wherein said machine readable identification markings uniquely identify one of a plurality of fax forms.

8. The method of claim 1, wherein the interpreting step further comprises automatically exporting the entered information 9. The method of claim 8, additionally comprising the step of electronically processing the exported information in an application program.

10. The method of claim 9, wherein the application program comprises a spreadsheet program.

11. The method of claim 1 additionally comprising the step of performing a transformation of a coordinates pair (x,y) on the completed fax form to account for aberrations, the transformation T(x,y) to (X,Y) comprising the steps of: calculating variables p1, p2, p3, p4, X, Y as:

$$p1 = \frac{(x - m.\text{left}) * (prt.h - plt.h)}{m.\text{right} - m.\text{left}} + plt.h$$

$$p2 = \frac{(x - m.\text{left}) * (prb.h - plb.h)}{m.\text{right} - m.\text{left}} + plb.h$$

$$p3 = \frac{(y - m.\text{top}) * (plb.v - plt.v)}{m.\text{bot} - m.\text{top}} + prt.v$$

$$p4 = \frac{(y - m.\text{top}) * (prb.v - prt.v)}{m.\text{bot} - m.\text{top}} + prt.v$$

$$X = \frac{(y - m.\text{top}) * p2 + (m.\text{bot} - y) * p1}{m.\text{bot} - m.\text{top}}$$

$$Y = \frac{(x - m.\text{left}) * p4 + (m.\text{right} - x) * p3}{m.\text{right} - m.\text{left}}$$

where (x,y) are the original coordinates to transform, (m.left, m.top) are the coordinates of an upper left reference mark on the fax form, (m.right, m.bot) are the coordinates of a lower right reference mark on the fax form, (plt.h, plt.v) are the coordinates of an upper left reference mark on the completed fax form, (prt.h, prt.v) are the coordinates of an upper right reference mark on the completed fax form, (plb.h, plb.v) are the coordinates of a lower left reference mark on the completed fax form, (prb.h, prb.v) are the coordinates of a lower right reference mark on the completed fax form, and (X,Y) are the transformed coordinates on the completed fax form.

12. The method of claim 1, wherein the machine readable identification markings on the fax form comprise a selectable pattern of black and white polygons.

13. The method of claim 1, wherein each template field has a field type selected from one of the following field types: choice field, entry field, constrained print field, analog field, image zone.

14. The method of claim 1, additionally comprising the steps of:

testing the interpreted information in one of the fields of the completed fax form for an error;

identifying the position of the error on the completed fax form;

saving the position of the error in the computer memory; and presenting an image of a portion of the form surrounding the position of the error to a user of the computer.

15. The method of claim 14, wherein the error is of one of the following: incompleteness, invalidity, or ambiguity.

16. The method of claim 14, additionally comprising the step of correcting the field that is in error.

17. The method of claim 16, wherein the correcting step includes the step of selecting a correct choice with a pointing device connected to the computer on the image presented to the user.

18. The method of claim 1, additionally comprising the steps of:

testing the interpreted information in a selected one of the template fields of the completed fax form for an error;

identifying the position of the error on the completed fax form;

saving the position of the error in the computer memory;

presenting an image of a portion of the form surrounding the position of the error to a user of the computer; and selecting a correct choice with a pointing device connected to the computer on the image presented to the user so as to correct the error.

19. The method of claim 1, additionally comprising the step of automatically exporting the interpreted information to one of a plurality of formats.

20. The method of claim 13, wherein, for an analog field, the interpreting step includes the steps of:

locating the analog field using the template information;

scanning across a scale associated with the analog field;

locating a mark indicating a value on the scale for the analog field; and p1 determining the value indicative of the relative location of the mark to the end points of the scale.

21. The method of claim 1, additionally comprising the step of automatically providing confirmation to the remote location in response to the completed fax form.

22. The method of claim 21, wherein the providing confirmation step includes the steps of:

verifying interpreted information from the fax form;

verifying inventory of an item identified by the interpreted information;

generating confirmation information based on the inventory and the interpreted information;

storing the confirmation information in the computer memory;

automatically generating a completed fax confirmation form based on the stored confirmation information; and sending the completed fax confirmation form to the remote location.

23. A method of interpreting an analog field having an associated scale on a form having template information, the method comprising the steps of:

locating the field using the template information;

scanning across the scale of the field;

locating a mark indicating a value on the scale for the field; and determining the value indicative of the relative location of the mark to the end points of the scale.

24. The method of claim 23, wherein the locating step produces coordinate values for a start of the analog field and an end of the analog field.

25. The method of claim 24, additionally comprising the step of performing a transformation of coordinates on the form to account for aberrations of the form.

26. The method of claim 24, wherein the scanning step includes the step of incrementing a set of variables to traverse the field between the start of the analog field and the end of the analog field.

27. The method of claim 23, wherein the locating step includes the step of determining an amplitude of the located mark.

28. The method of claim 27, wherein the locating step includes the step of comparing the amplitude of the located mark to a reference so as to determine if the mark is valid.

29. The method of claim 28, wherein the locating step includes the step of determining if multiple marks are allowed if a plurality of marks are determined to be valid.

30. The method of claim 28, wherein the determining the value of the mark step includes the step of calculating the value as $$((i/n)*(high-low))+low$$

where n is the maximum number of discrete points in the analog field, i is one of the discrete points in the analog field at which the mark is valid, high is a numeric label at the high end of the scale, and low is a numeric label at the low end of the scale.

31. A system for creating and interpreting fax forms comprising:

a computer having a memory;

a screen definition file, stored in the memory, having a plurality of records with data fields;

a record reader operating in the computer to read each record of the screen definition file;

a record processor to convert the data fields read by the record reader of the screen definition file into a template field, wherein the fax form includes a plurality of template fields;

a machine readable identification markings generator to generate unique form identification in the fax form;

a save form function for storing the fax form in the memory;

a receive fax function for receiving a completed fax form into the computer from a remote location;

an interpret identification function for automatically identifying the completed fax form using the computer by interpreting machine readable identification markings on the received completed fax form; and an interpret field function for interpreting the completed fax form using the computer and the template information of the fax form stored in the computer so as to selectively interpret information entered on the form at the remote location.

* * * * *

UNITED STATES PATENT AND TRADEMARK OFFICE
CERTIFICATE OF CORRECTION

PATENT NO. : 5,555,101
DATED : 09/10/96
INVENTOR(S) : Larson, et al.

It is certified that error appears in the above-indentified patent and that said Letters Patent is hereby corrected as shown below:

Claim 8, Column 34, Line 13: "information" should read: "information of the fax form";

Claim 20, Column 34, Line 37: "and pl determining" should read: "and determining"; and Claim 23, Column 35, Line 58: "on a form having" should read: "on a facsimile form having".

Signed and Sealed this

Eighth Day of July, 1997

Attest:

BRUCE LEHMAN

Attesting Officer

Commissioner of Patents and Trademarks